United States Patent
Creachbaum et al.

(10) Patent No.: US 12,246,442 B2
(45) Date of Patent: Mar. 11, 2025

(54) ARTICULATED ARM COORDINATE MEASURING MACHINE

(71) Applicant: FARO Technologies, Inc., Lake Mary, FL (US)

(72) Inventors: John Lucas Creachbaum, Deltona, FL (US); Brent Bailey, Winter Springs, FL (US); William E. Schoenfeldt, Oviedo, FL (US); Fabiano Kovalski, Sanford, FL (US); Eduardo Laranjeira, Lake Mary, FL (US); Chad Crisostomo, Lake Mary, FL (US); Michael Bartel, Ormond Beach, FL (US); Kishore Lankalapalli, Sanford, FL (US); Christopher M. Riehl, Orlando, FL (US); Matthew Mogensen, Longwood, FL (US)

(73) Assignee: FARO Technologies, Inc., Lake Mary, FL (US)

( * ) Notice: Subject to any disclaimer, the term of this patent is extended or adjusted under 35 U.S.C. 154(b) by 585 days.

(21) Appl. No.: 17/452,587

(22) Filed: Oct. 28, 2021

(65) Prior Publication Data
US 2022/0143812 A1    May 12, 2022

Related U.S. Application Data

(60) Provisional application No. 63/112,319, filed on Nov. 11, 2020.

(51) Int. Cl.
*G01B 5/008* (2006.01)
*B25J 9/04* (2006.01)
(Continued)

(52) U.S. Cl.
CPC ............ *B25J 9/042* (2013.01); *B25J 9/1664* (2013.01); *B25J 9/1697* (2013.01); *B25J 19/022* (2013.01); *G01B 5/008* (2013.01); *G01B 21/047* (2013.01)

(58) Field of Classification Search
CPC ........ B25J 9/042; B25J 9/1664; B25J 9/1697; B25J 19/022; G01B 5/008; G01B 21/047
See application file for complete search history.

(56) References Cited

U.S. PATENT DOCUMENTS

| | | | |
|---|---|---|---|
| 7,624,510 B2* | 12/2009 | Ferrari | G01B 21/04 33/503 |
| 8,533,967 B2* | 9/2013 | Bailey | G01B 21/047 33/503 |

(Continued)

FOREIGN PATENT DOCUMENTS

| | | | | |
|---|---|---|---|---|
| JP | 2016055370 A | * | 4/2016 | .......... B23Q 3/1554 |
| WO | WO-2020007996 A1 | * | 1/2020 | ................ B25J 1/02 |

OTHER PUBLICATIONS

European Search Report for Application No. 21206729.2 dated Apr. 5, 2022; 7 pgs.

*Primary Examiner* — Yaritza Guadalupe-McCall
(74) *Attorney, Agent, or Firm* — McCarter & English, LLP; Dave S. Christensen

(57) ABSTRACT

An articulated arm coordinate measuring machine includes an arm having multiple segments and an end assembly. The end assembly has multiple accessory interfaces that allow multiple accessories to be coupled to the end assembly. The accessory interfaces are configured to allow the accessories to be repeatably interchanged between the accessory interfaces.

19 Claims, 76 Drawing Sheets

(51) Int. Cl.
  *B25J 9/16*  (2006.01)
  *B25J 19/02* (2006.01)
  *G01B 21/04* (2006.01)

(56) References Cited

U.S. PATENT DOCUMENTS

| | | |
|---|---|---|
| 8,601,702 B2 | 10/2013 | Bailey et al. |
| 8,677,643 B2 | 3/2014 | Bridges et al. |
| 8,832,954 B2 | 9/2014 | Atwell et al. |
| 8,875,409 B2 | 11/2014 | Kretschmer et al. |
| 9,168,654 B2 | 10/2015 | Briggs et al. |
| 9,628,775 B2 | 4/2017 | Bridges et al. |
| 9,903,701 B2 | 2/2018 | Gong |
| 10,060,722 B2 | 8/2018 | Bridges et al. |
| 10,168,134 B2 | 1/2019 | Raab et al. |
| 10,254,102 B2 | 4/2019 | York et al. |
| 10,281,259 B2 | 5/2019 | Bridges et al. |
| 10,378,878 B2 | 8/2019 | York et al. |
| 10,415,950 B2 | 9/2019 | Gong |
| 10,634,478 B2 * | 4/2020 | Sajedi ............ G01B 5/0004 |
| 10,699,442 B2 | 6/2020 | Mares et al. |
| 10,895,445 B2 | 1/2021 | Lankalapalli et al. |
| 11,045,944 B2 | 6/2021 | Phipps |
| 2009/0013548 A1 * | 1/2009 | Ferrari ............... G01B 21/04 |
| | | 33/503 |
| 2014/0192187 A1 | 7/2014 | Atwell et al. |
| 2015/0176972 A1 * | 6/2015 | Tait ................. G01B 11/005 |
| | | 33/503 |
| 2015/0355310 A1 | 12/2015 | Gong et al. |
| 2015/0362305 A1 * | 12/2015 | Ferrari ................. G01D 5/34 |
| | | 33/503 |
| 2017/0234669 A1 | 8/2017 | Grau et al. |
| 2018/0023935 A1 | 1/2018 | Atwell et al. |
| 2018/0216923 A1 | 8/2018 | Creachbaum et al. |
| 2019/0204058 A1 * | 7/2019 | Sajedi ................. G01B 1/00 |
| 2020/0049477 A1 | 2/2020 | Lankalapalli et al. |
| 2020/0249004 A1 | 8/2020 | Phipps et al. |
| 2021/0116239 A1 | 4/2021 | Tohme et al. |
| 2021/0165389 A1 | 6/2021 | Lankalapalli et al. |
| 2022/0143812 A1 * | 5/2022 | Creachbaum ........ G01B 21/047 |

* cited by examiner

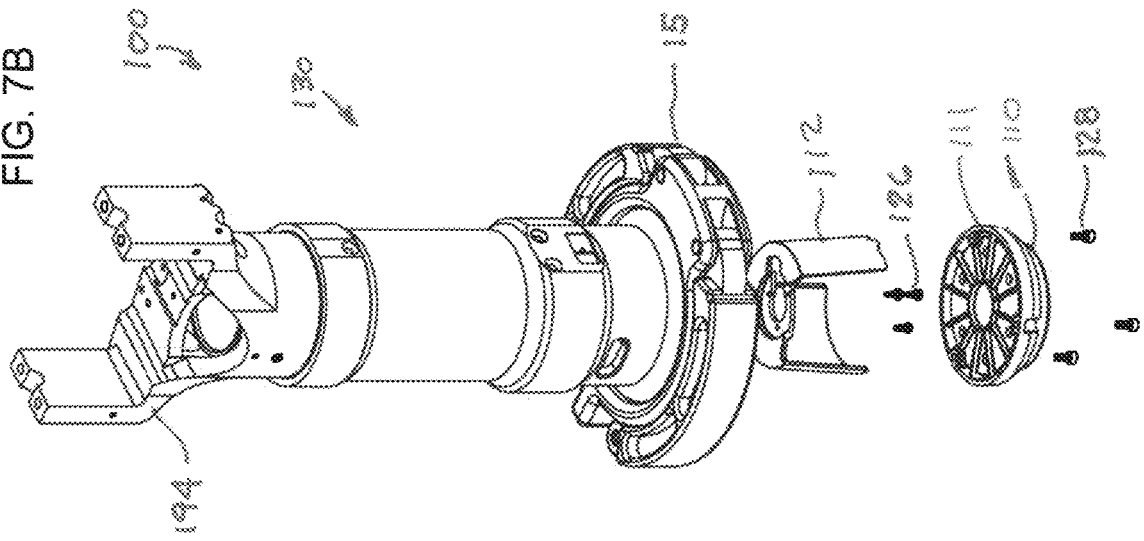
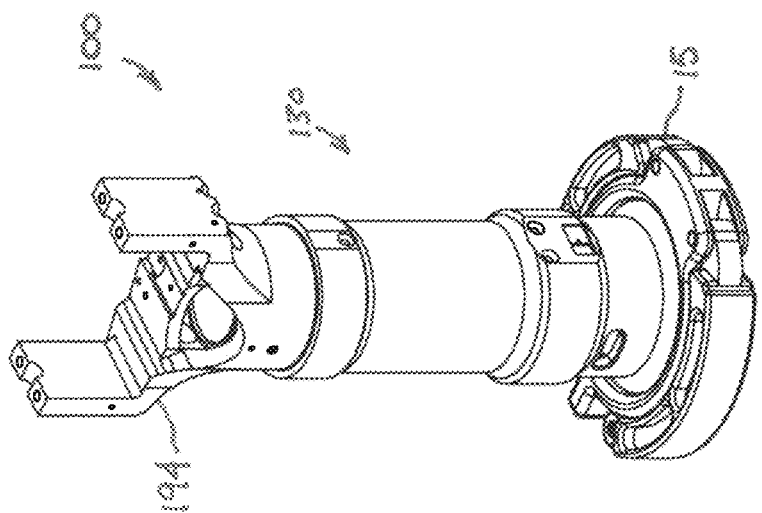

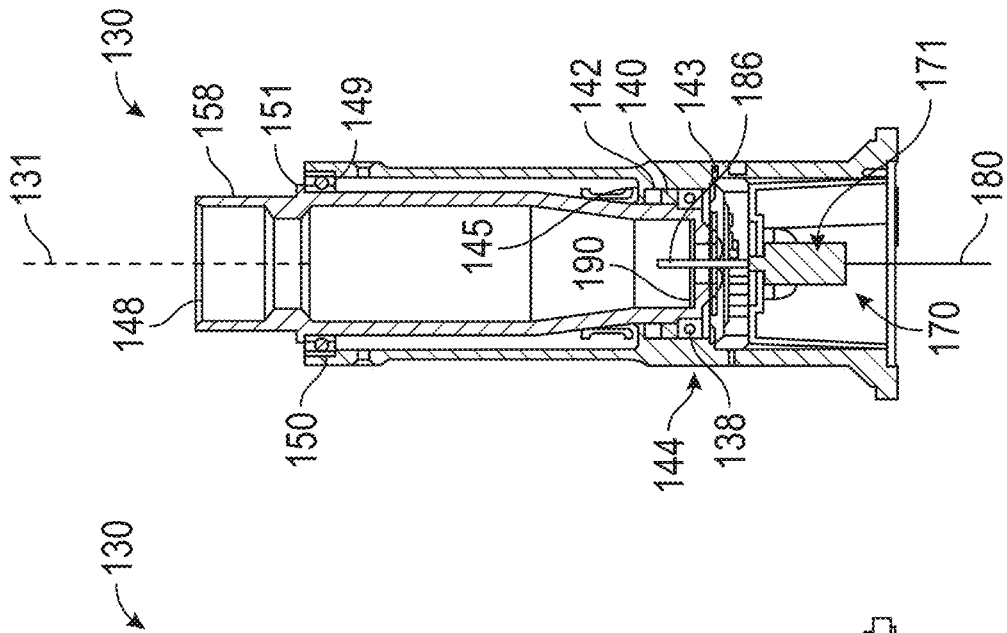
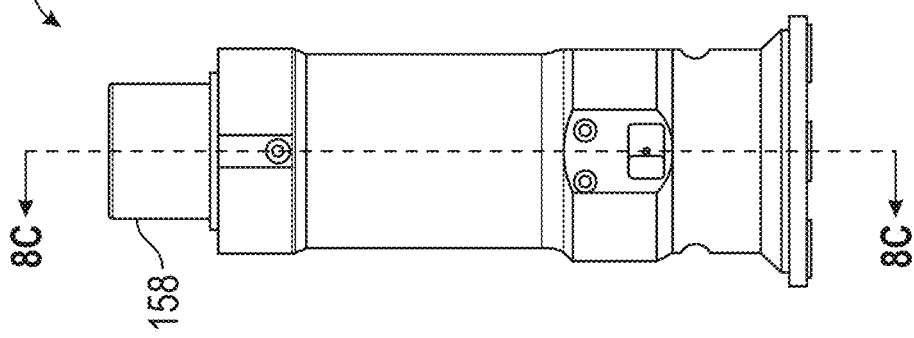
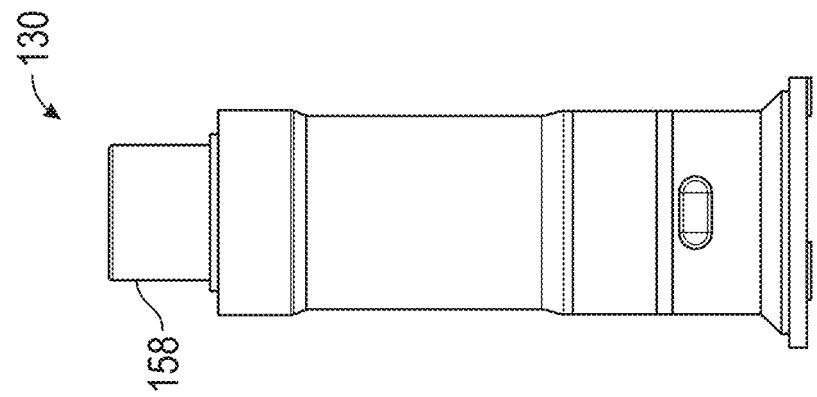
FIG. 8C
FIG. 8B
FIG. 8A

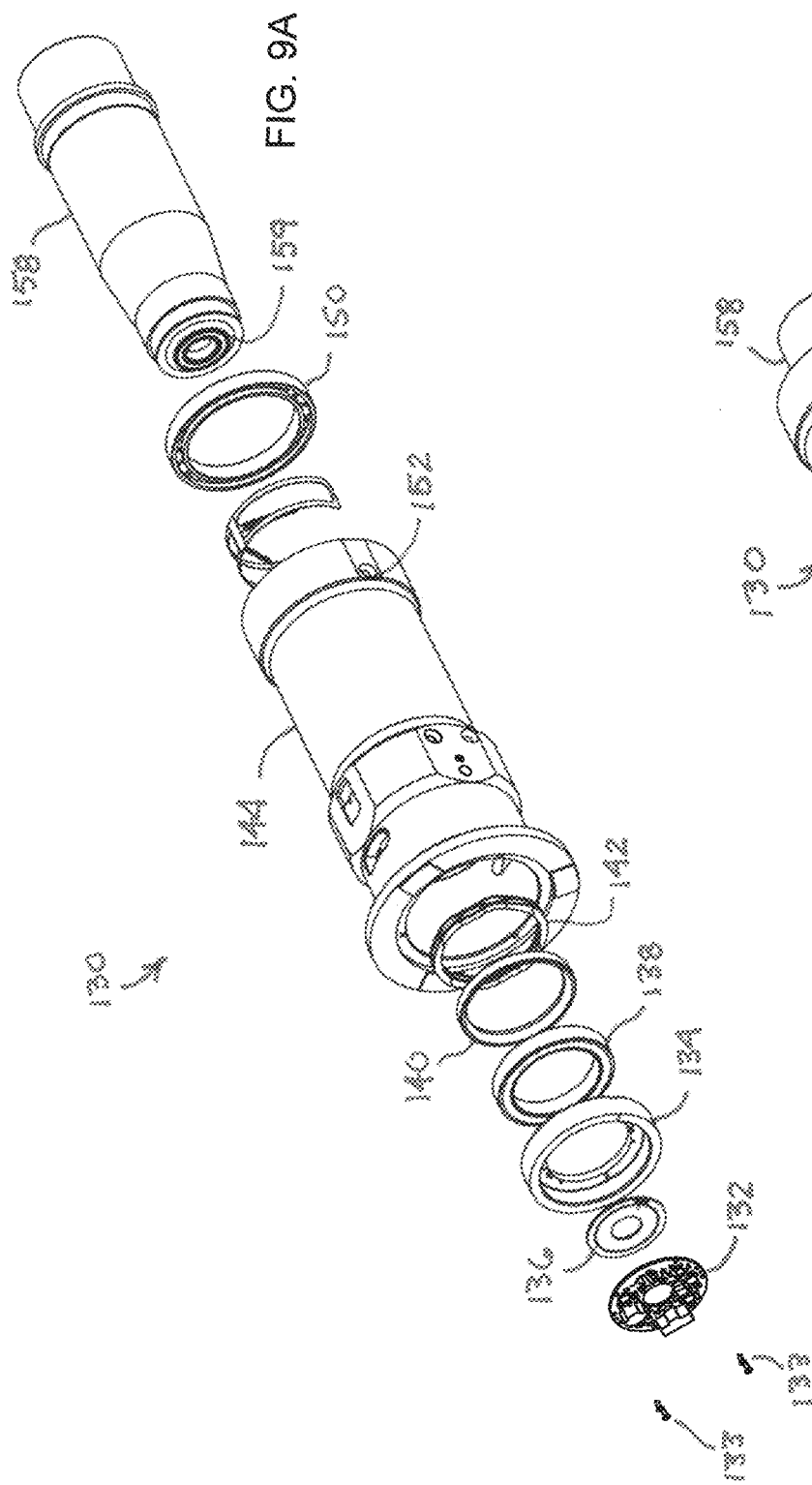
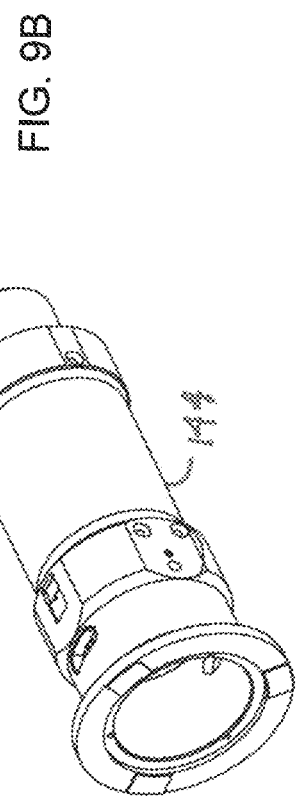

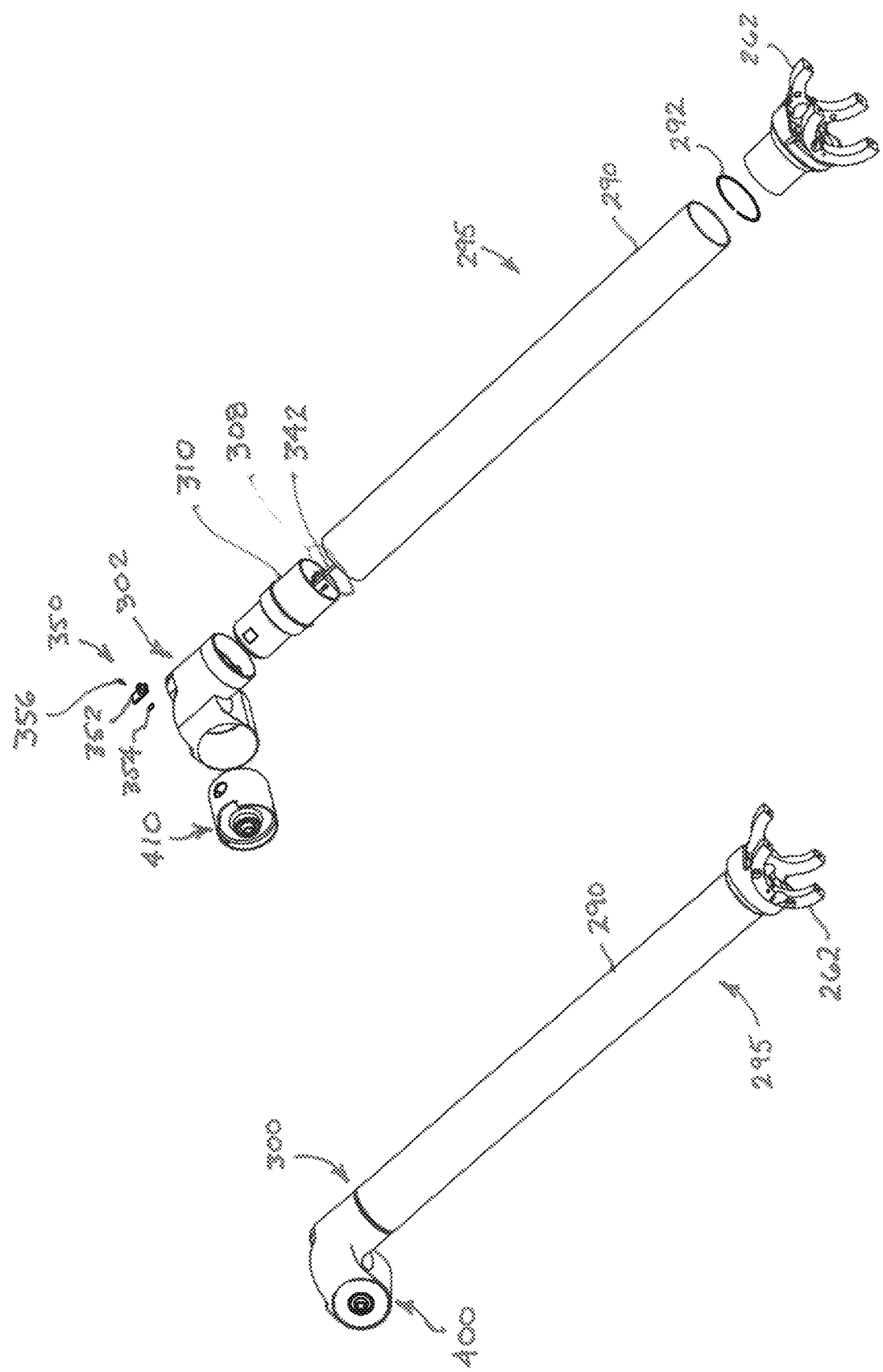

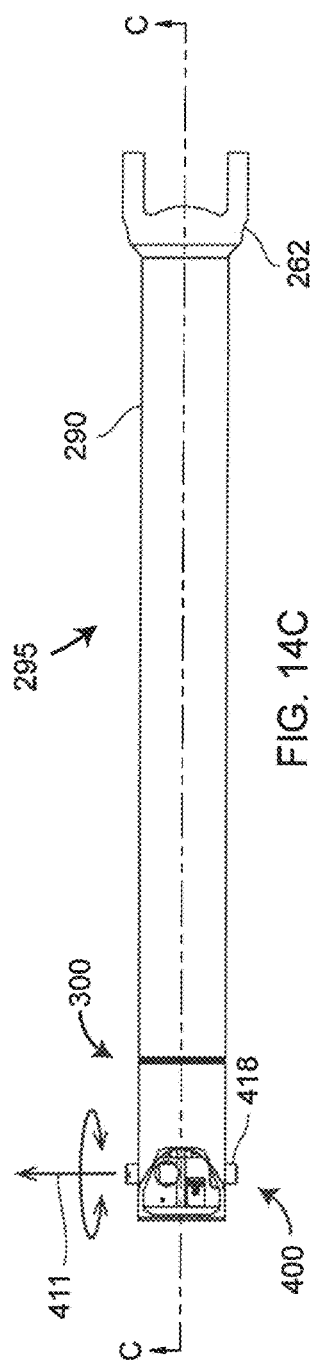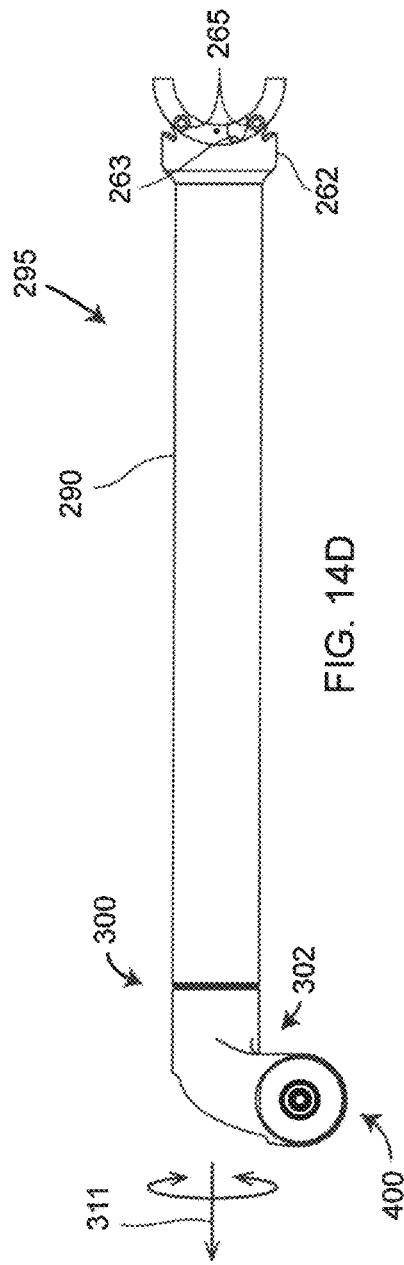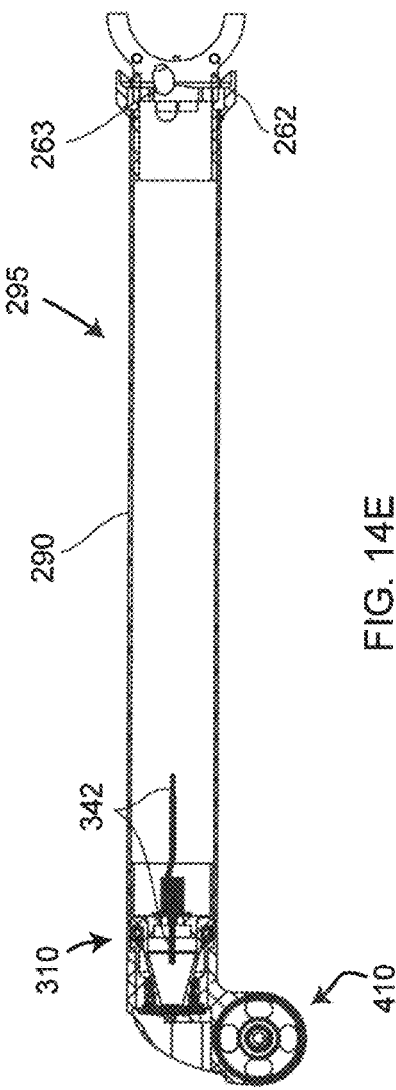

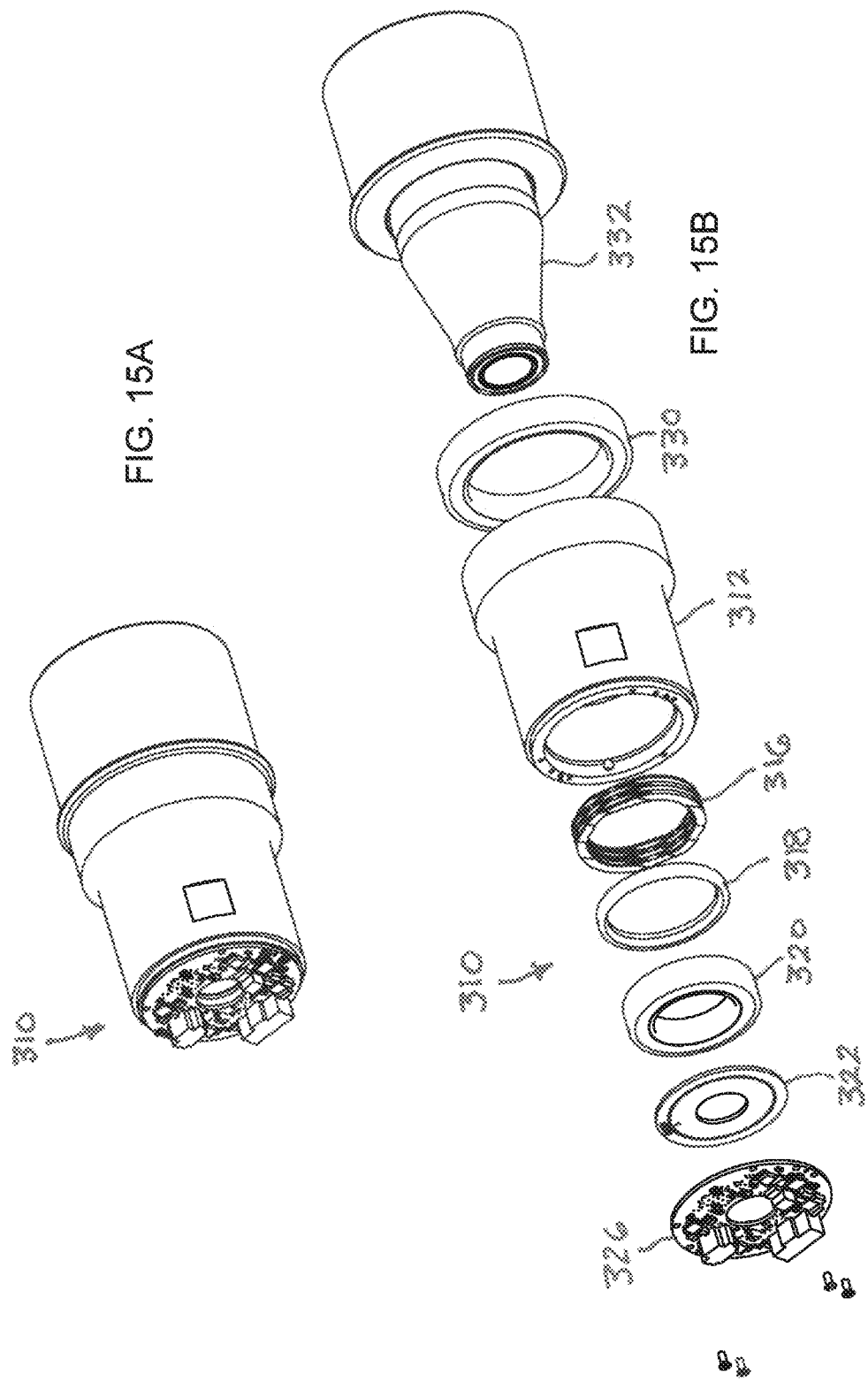

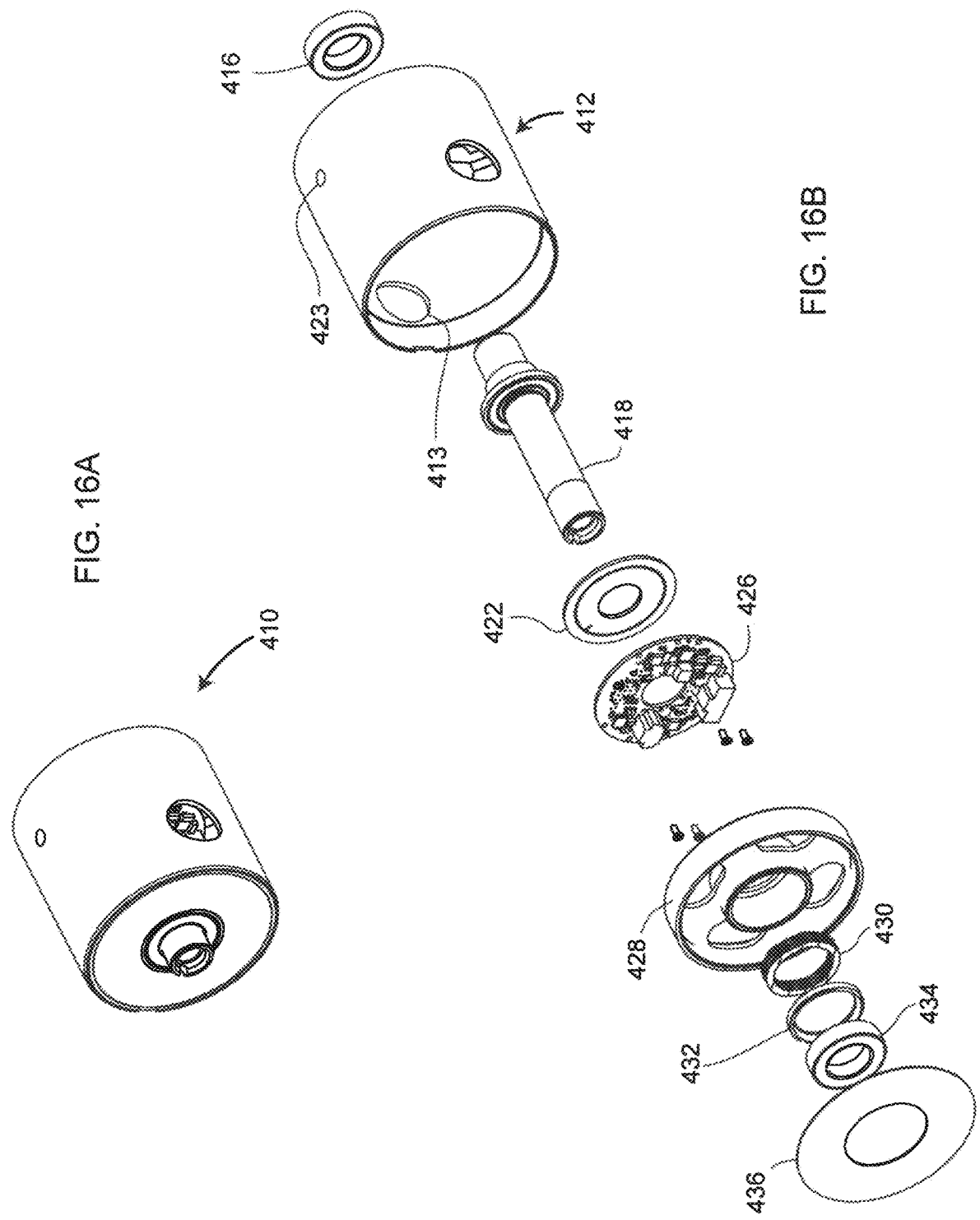

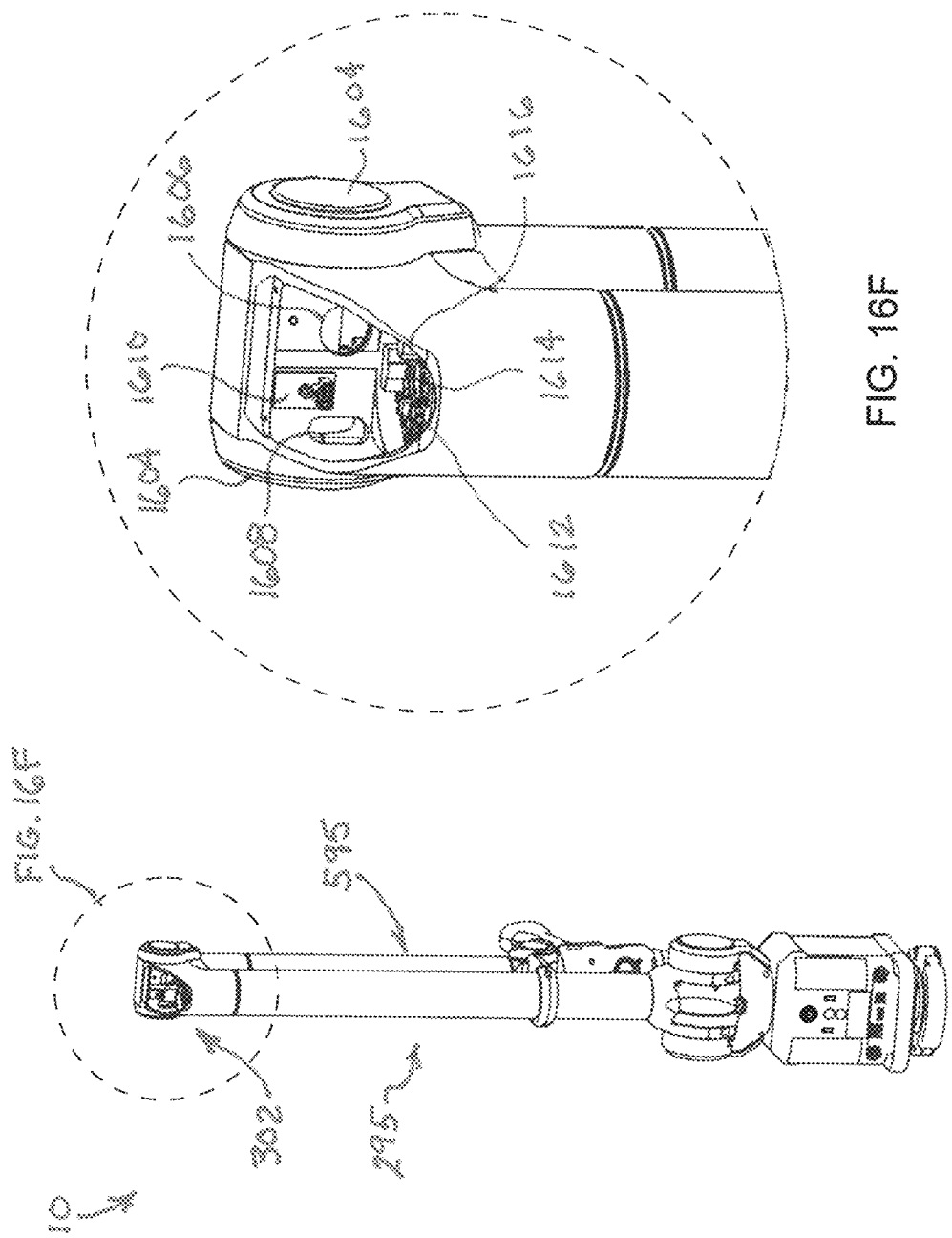

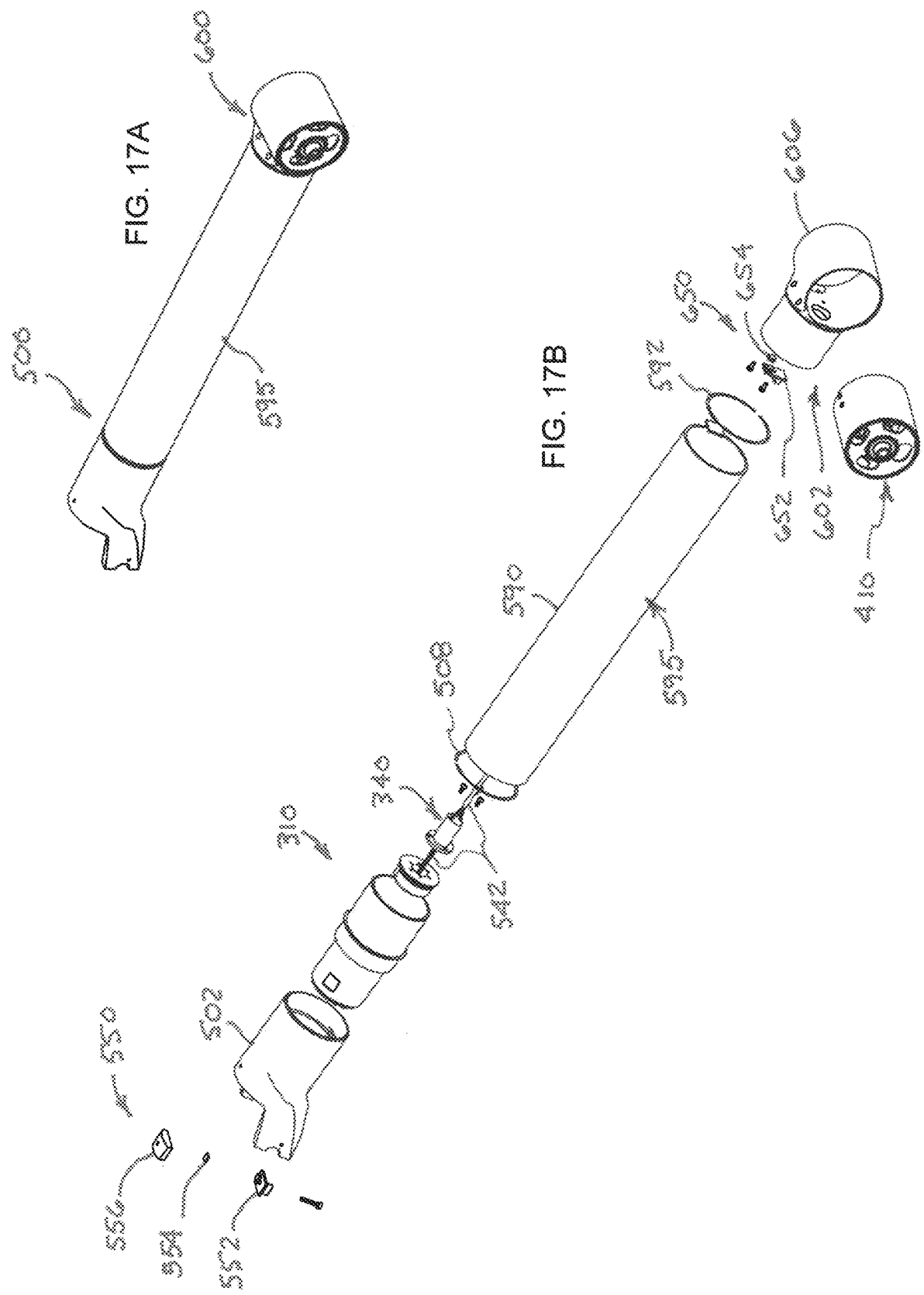

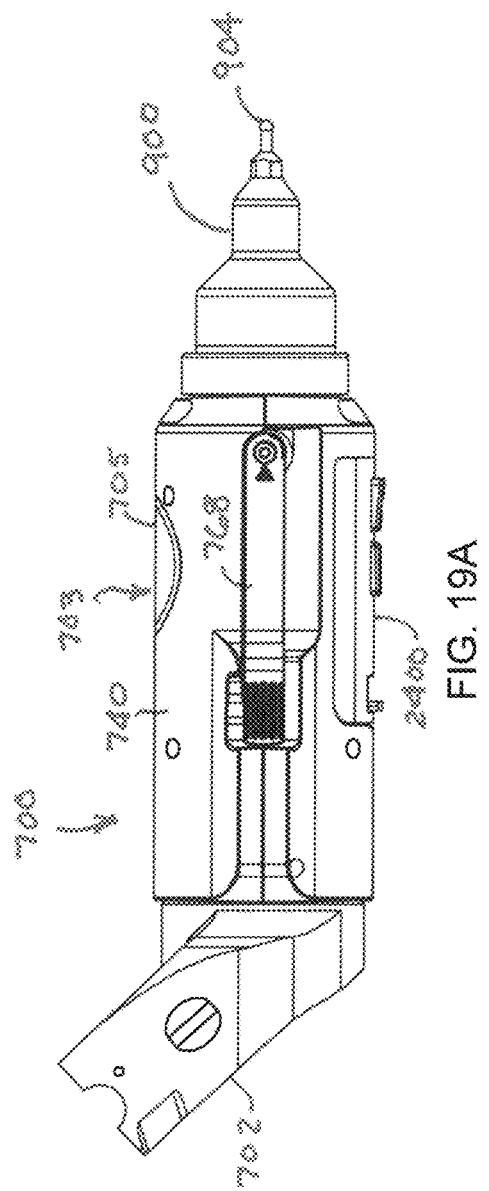
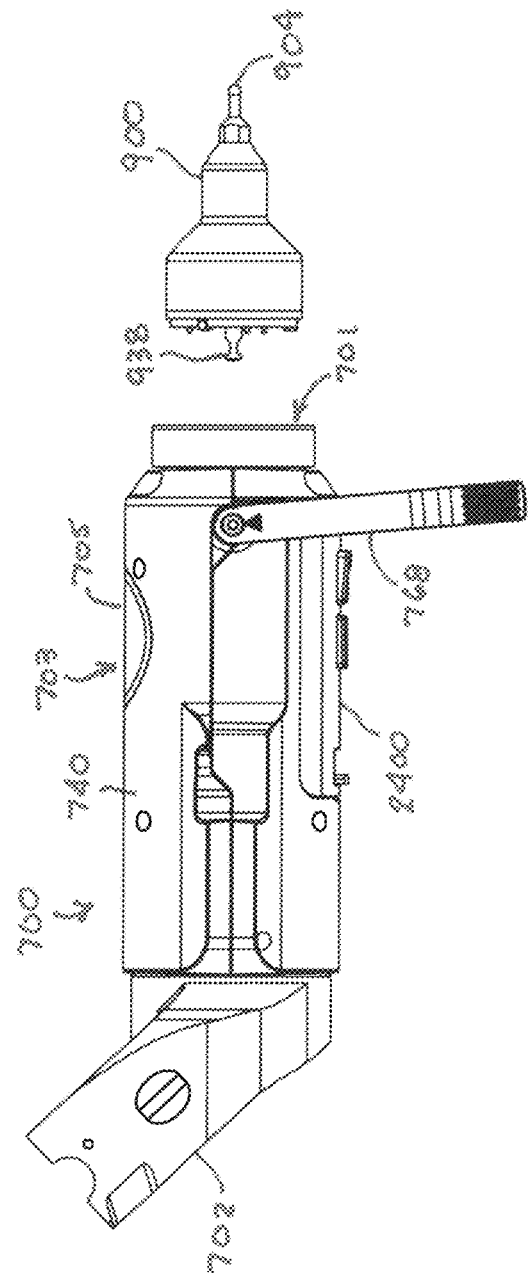
FIG. 19A
FIG. 19B

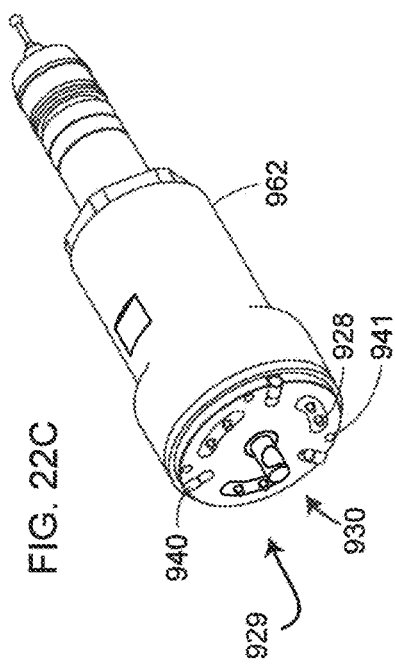
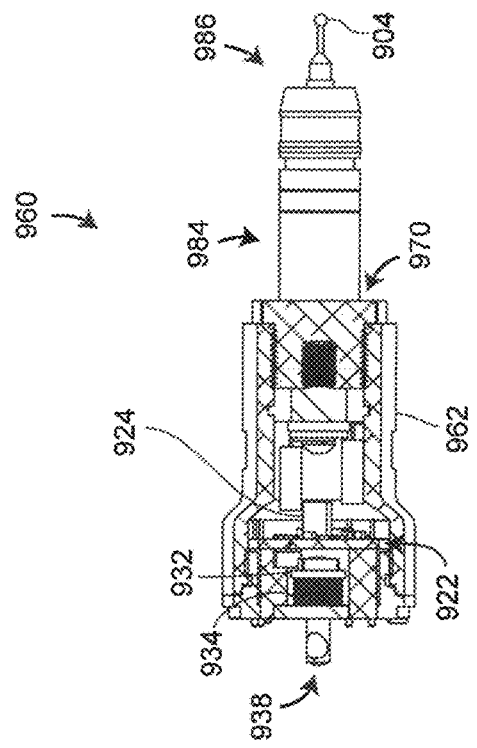
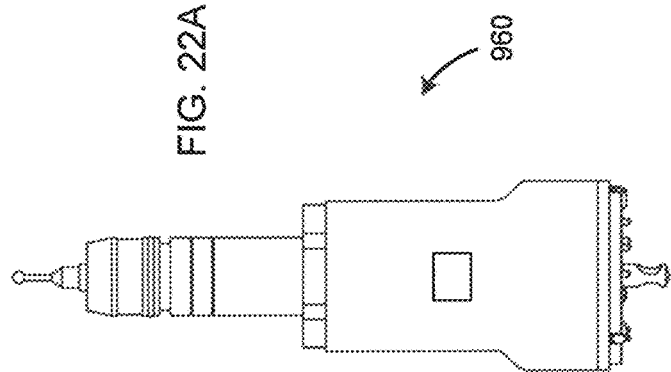
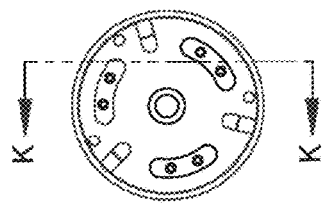

SECTION A-A

DETAIL D

DETAIL E

SECTION C-C

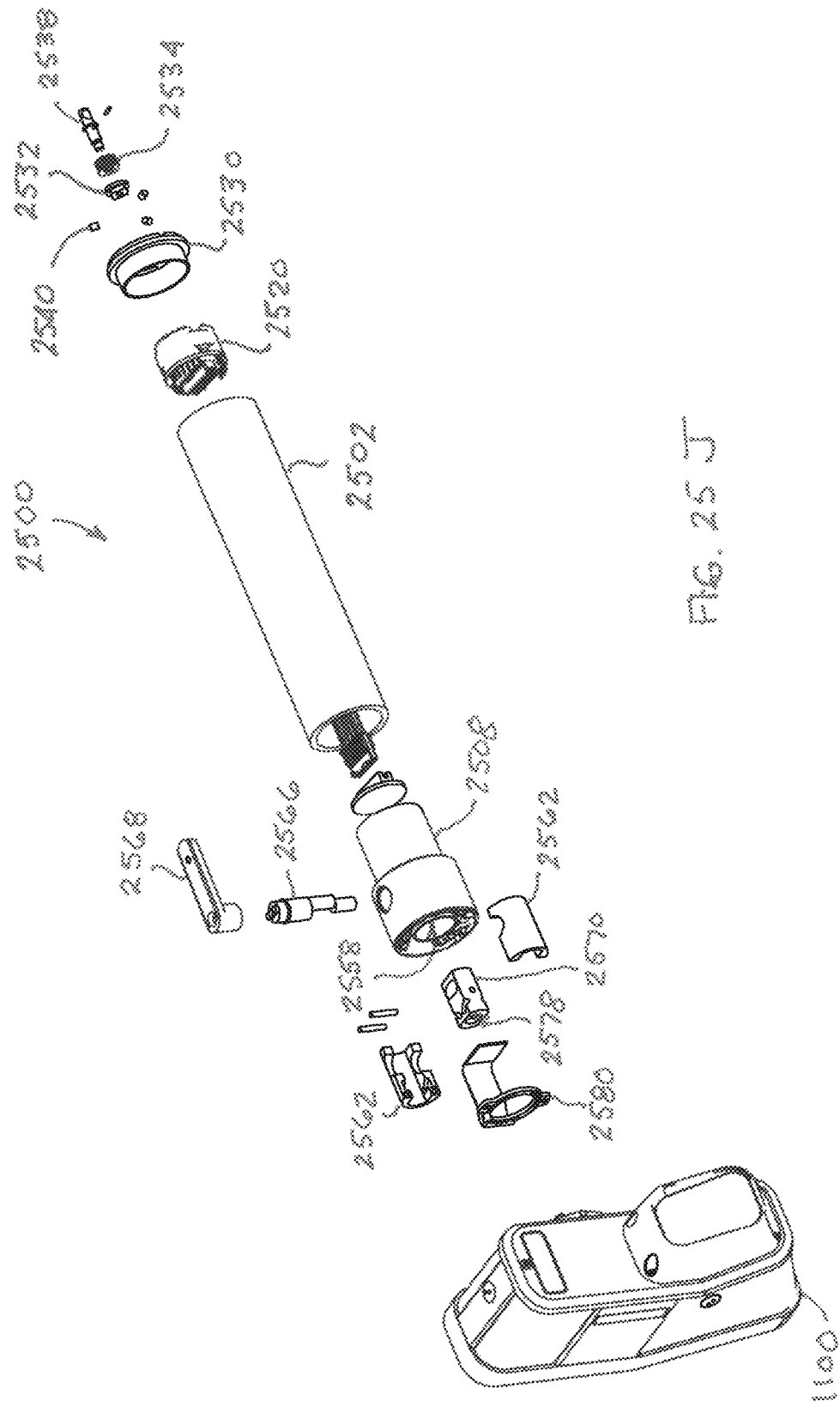

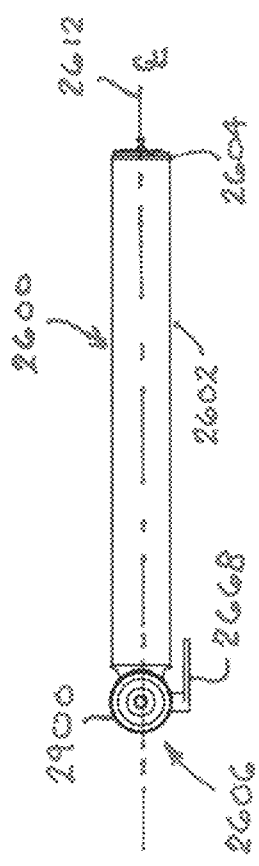
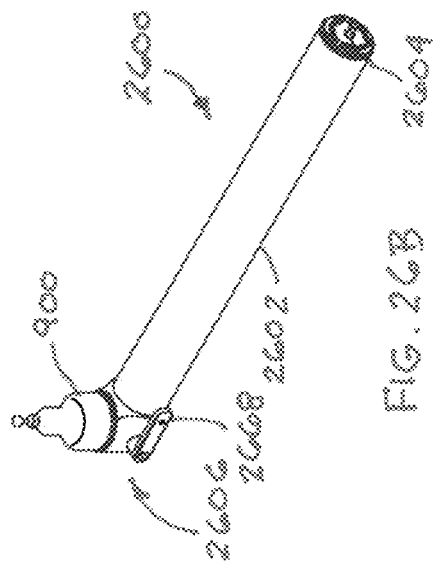
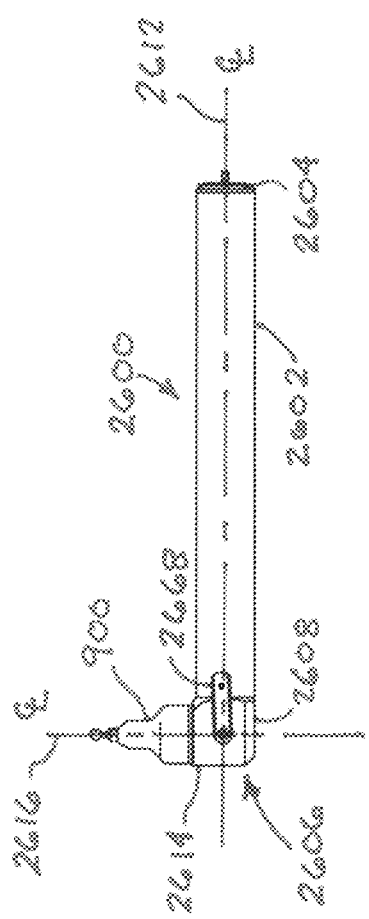
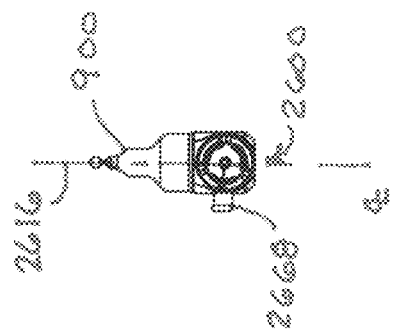

ARTICULATED ARM COORDINATE MEASURING MACHINE

CROSS-REFERENCE TO RELATED APPLICATIONS

The present application is a nonprovisional application of, and claims the benefit of, U.S. Provisional Application Ser. No. 63/112,319 filed on Nov. 11, 2020, the contents of which is incorporated by reference in its entirety.

BACKGROUND

The present disclosure relates to a coordinate measuring system, and in particular to coordinate measuring system including or cooperating with a portable articulated arm coordinate measuring machine (AACMM).

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3D) form on a computer screen. In other cases, the data are provided to the user in numeric form, for example when measuring the diameter of a hole, the text "Diameter=1.0034" is displayed on a computer screen.

Today, probes and accessories of AACMM tend to have defined mounting arrangements that may limit the operators usage of the probe or accessory. For example, the hard probe may only be mounted on the end/tip of the probe end of the arm, with a laser line scanner/probe or camera mounted on the side of the probe end. It should be appreciated that in at least some instances, this may limit or increase the difficulty of obtaining a measurement.

Accordingly, while existing AACMM's are suitable for their intended purposes there remains a need for improvements, particularly in providing an AACMM having the features described herein.

BRIEF DESCRIPTION

According to an embodiment a portable articulated arm coordinate measuring machine (AACMM) for measuring the coordinates of an object in space is provided. The AACMM includes a base and a manually positionable arm portion having an opposed first end and second end, the arm portion being rotationally coupled to the base, the arm portion including a plurality of connected arm segments, each arm segment including at least one position transducer for producing a position signal. A probe end is coupled to the first end, the probe end having a first accessory interface and a second accessory interface, the first accessory interface being positioned on an end of the probe end, the second accessory interface being positioned on a side of the probe end, the first accessory interface having a first latch, the second accessory interface having a second latch. A first accessory is coupled to one of the first accessory interface or the second accessory interface, wherein the first accessory and the second accessory are configured to be removably coupled to both the first accessory interface and the second accessory interface. A first electronic circuit is provided that receives the position signal from the at least one position transducer and provides data corresponding to a position of the first accessory.

In addition to one or more of the features described herein, or as an alternative, further embodiments of the AACMM may include the first accessory interface and the second accessory interface being integral with the probe end. In addition to one or more of the features described herein, or as an alternative, further embodiments of the AACMM may include the first accessory interface and the second accessory interface being substantially identical. In addition to one or more of the features described herein, or as an alternative, further embodiments of the AACMM may include the first accessory being one of a first hard probe, a first touch probe, a first laser line scanner, a first area scanner, and a first camera.

In addition to one or more of the features described herein, or as an alternative, further embodiments of the AACMM may include a second accessory coupled to the other of the first accessory interface or the second accessory interface. In addition to one or more of the features described herein, or as an alternative, further embodiments of the AACMM may include the first accessory being a hard probe and the second accessory is a laser line scanner, the hard probe being coupled to the first accessory interface and the laser line scanner being coupled to the second accessory interface. In addition to one or more of the features described herein, or as an alternative, further embodiments of the AACMM may include the first accessory being a first laser line scanner and the second accessory is a second laser line scanner.

In addition to one or more of the features described herein, or as an alternative, further embodiments of the AACMM may include the first accessory having a first tactile probe and the second accessory having a second tactile probe. In addition to one or more of the features described herein, or as an alternative, further embodiments of the AACMM may include the first accessory being a first hard-probe and the second accessor is a second hard-probe. In addition to one or more of the features described herein, or as an alternative, further embodiments of the AACMM may include the first accessory being one of a first hard-probe or a first touch-trigger probe and the second accessory being one of a second hard-probe or a second touch-trigger probe.

In addition to one or more of the features described herein, or as an alternative, further embodiments of the AACMM may include the first accessory having a first extension element, the second accessory having a second extension element, the first latch being configured to engage and couple to the first extension element and the second extension element, and the second latch being configured to engage and couple to the first extension element and the second extension element.

In addition to one or more of the features described herein, or as an alternative, further embodiments of the AACMM may include the first accessory interface having first kinematic mechanical elements and the second accessory interface having second kinematic mechanical elements; the first accessory having third kinematic mechanical elements and the second accessory having fourth kinematic elements. In addition to one or more of the features described herein, or as an alternative, further embodiments of the AACMM may include the first kinematic mechanical elements being brought into contact with one of the third kinematic elements and fourth kinematic elements when the first extension element is clamped to the one of the first accessory interface and the second accessory interface; the second kinematic mechanical elements being brought into contact with the other of the third kinematic elements and the fourth kinematic elements is clamped to the other of the first accessory interface and the second accessory interface; and the first kinematic elements and the second kinematic elements cooperating with the third kinematic elements and the fourth kinematic elements to repeatably positioning the first accessory and the second accessory to the probe end.

In addition to one or more of the features described herein, or as an alternative, further embodiments of the AACMM may include the second accessory being a line scanner, and the line scanner may be repeatedly coupled to the second accessory interface without recalibration. In addition to one or more of the features described herein, or as an alternative, further embodiments of the AACMM may include the first accessory interface having a first plurality of pins. In addition to one or more of the features described herein, or as an alternative, further embodiments of the AACMM may include the second accessory interface having a second plurality of pins, the second plurality of pins being equal in number to the first plurality of pins; the first accessory being a hard probe, the hard probe having a third plurality of pins; and the second accessory being a line scanner, the line scanner having a fourth plurality of pin, the fourth plurality of pins being larger in number than the third plurality of pins.

In addition to one or more of the features described herein, or as an alternative, further embodiments of the AACMM may include the second accessory interface having at least one first magnet. In addition to one or more of the features described herein, or as an alternative, further embodiments of the AACMM may include a cover member selectively couplable to the second accessory interface via the at least one magnet. In addition to one or more of the features described herein, or as an alternative, further embodiments of the AACMM may include the first accessory interface includes at least one second magnet.

In addition to one or more of the features described herein, or as an alternative, further embodiments of the AACMM may include an actuator plate selectively couplable to an actuator interface on the probe end, the actuator plate having at least one first switch element electrically coupled to the electronic circuit. In addition to one or more of the features described herein, or as an alternative, further embodiments of the AACMM may include the actuator plate having a curved wall, the curved wall being shaped to deflect and bias the actuator plate away from the probe end when the actuator plate is coupled to the probe end. In addition to one or more of the features described herein, or as an alternative, further embodiments of the AACMM may include the actuator plate having a lever coupled to a latch member, the lever extending through the curved wall, the latch member being movable between an extended position and a retracted position, the actuator plate further including a biasing member, the biasing member biasing the latch member into an extended position.

In addition to one or more of the features described herein, or as an alternative, further embodiments of the AACMM may include the latch member engaging the probe end when in the extended position. In addition to one or more of the features described herein, or as an alternative, further embodiments of the AACMM may include a handle selectively couplable to the actuator interface, the handle having at least one second switch element electrically coupled to the electronic circuit when the handle is coupled to the probe end.

In addition to one or more of the features described herein, or as an alternative, further embodiments of the AACMM may include a first lever operably coupled to the first accessory interface, the first lever being movable between a first position and a second position and configured to couple one of the first accessory or the second accessory to the first accessory interface when in the second position. In addition to one or more of the features described herein, or as an alternative, further embodiments of the AACMM may include a second lever operably coupled to the second accessory interface, the second lever being movable between a third position and a fourth position and configured to couple the other of the first accessory or the second accessory to the second accessory interface when in the second position.

In addition to one or more of the features described herein, or as an alternative, further embodiments of the AACMM may include a second electronic circuit disposed within the probe end, the second electronic circuit being electrically coupled between the first electronic circuit and the first accessory interface, the second electronic circuit further being electrically coupled between the first electronic circuit and the second accessory interface. In addition to one or more of the features described herein, or as an alternative, further embodiments of the AACMM may include the second electronic circuit being configured to selectively flow electrical power to the first accessory interface and the second accessory interface.

In addition to one or more of the features described herein, or as an alternative, further embodiments of the AACMM may include the first accessory being an extension accessory, the extension accessory having an elongated body with a coupling interface on a first end and a third accessory interface on a second end, the coupling interface being configured to electrically and mechanically couple to the one of the first accessory interface or the second accessory interface, the third accessory interface having a third latch. In addition to one or more of the features described herein, or as an alternative, further embodiments of the AACMM may include the elongated body having an axis and the third accessory interface being coaxial with the axis. In addition to one or more of the features described herein, or as an alternative, further embodiments of the AACMM may include the elongated body having a first axis and the third accessory interface having second axis, the second axis being perpendicular to the first axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIGS. 7A, 7B are isometric and unassembled views, respectively, of a first-axis assembly and a mounting device according to an embodiment;

FIGS. 8A, 8B, 8C, 8D are front, side, cross-sectional, and unassembled views, respectively, of a first-axis cartridge according to an embodiment;

FIGS. 9A, 9B are unassembled and isometric views of the first-axis cartridge according to an embodiment;

FIGS. 14A, 14B, 14C, 14D, 14E are isometric, unassembled, front, side, and section views, respectively, of a third-axis assembly, a fourth-axis assembly, and a first segment according to an embodiment;

FIGS. 15A, 15B, 15C, 15D are isometric, unassembled, front, and section views of a third/fifth axis cartridge according to an embodiment;

FIGS. 16A, 16B, 16C, 16D are isometric, unassembled, front, and section views of a fourth/sixth axis cartridge according to an embodiment;

FIGS. 16E, 16F, 16G, 16H are isometric, partially exposed views of elements of third-, fourth-, and fifth-axis assemblies according to an embodiment;

FIGS. 17A, 17B, 17C, 17D, 17E are isometric, unassembled, front, side, and section views, respectively, of a fifth-axis assembly, a sixth-axis assembly, and a second segment according to an embodiment;

FIGS. 19A, 19B are side views of a seventh-axis assembly having a tactile probe assembly latched in placed and detached, respectively, according to an embodiment;

FIGS. 22A, 22B, 22C, 22D, 22E are front, bottom, isometric, section, and exploded views, respectively, of a touch-trigger probe assembly according to an embodiment;

FIG. 25A-FIG. 25J are various views of a first extension accessory with a hard-probe or an LLP coupled to the first extension in accordance with an embodiment; and FIG. 26A-FIG. 26I are various views of a second extension accessory with a hard-probe or an LLP coupled to the second extension in accordance with an embodiment.

The detailed description explains embodiments of the invention, together with advantages and features, by way of example with reference to the drawings.

DETAILED DESCRIPTION

Embodiments disclosed herein provide for an articulated arm coordinate measurement machine (AACMM) having a probe end with multiple interfaces for accessories or probes. Embodiments herein provide advantages in allowing the accessories or probes to be coupled to the AACMM probe end in different locations. Still further embodiments provide advantages in allowing multiple accessories to be used simultaneously.

Figure 1A:
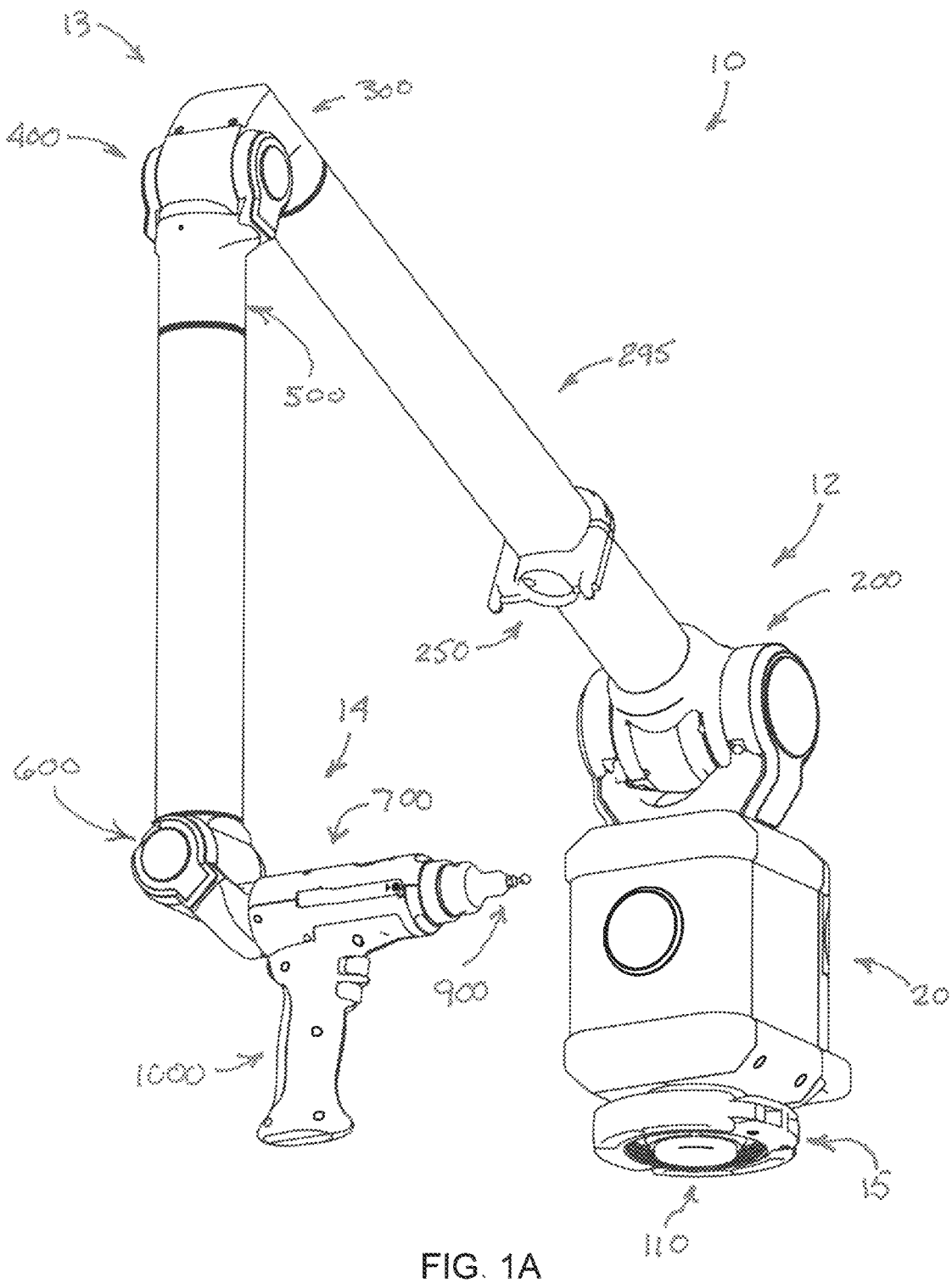
FIGS. 1A, 1B are two isometric views of a portable articulated AACMM according to an embodiment.
Figure 1B:
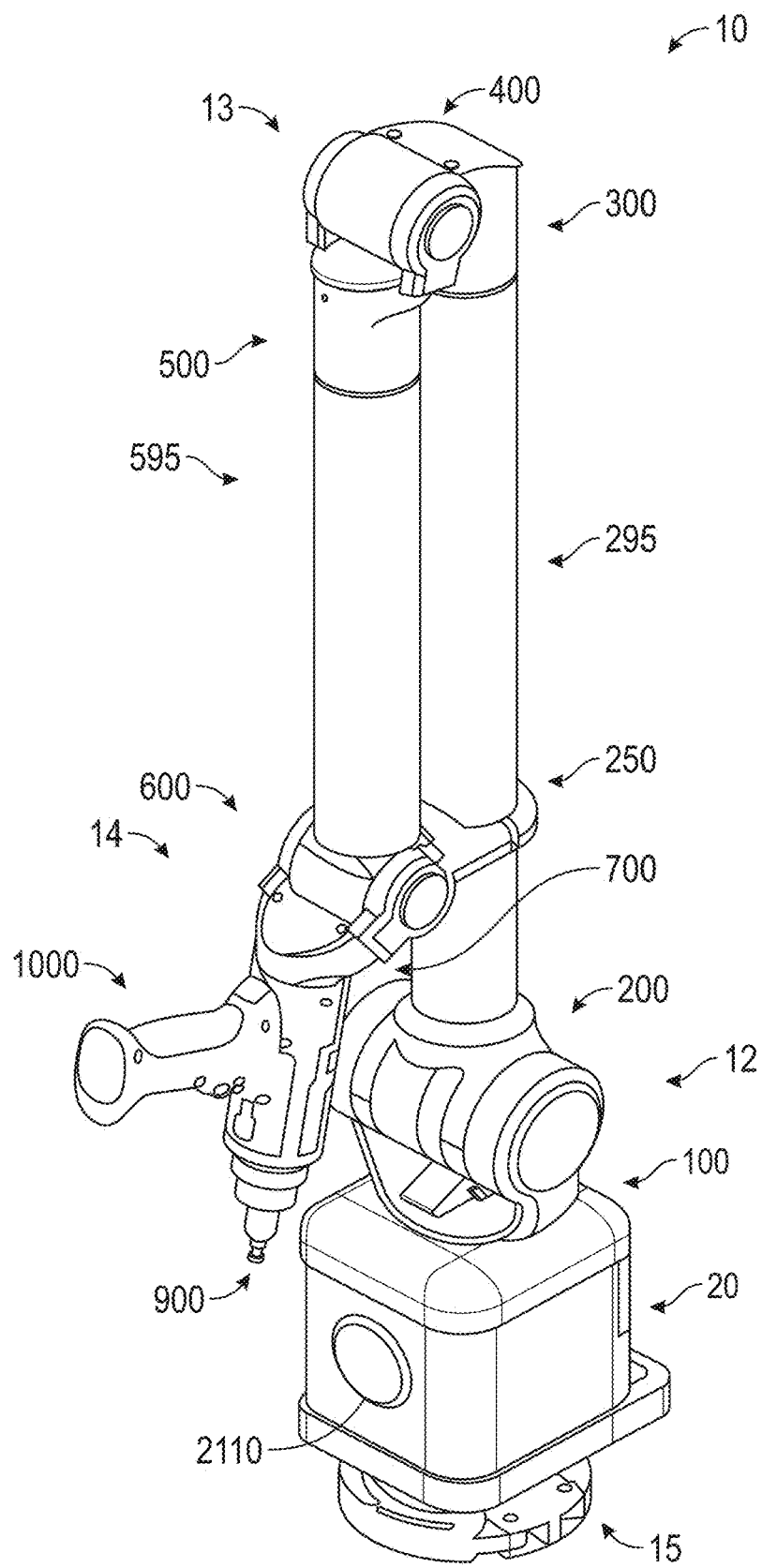
Figure 1C:
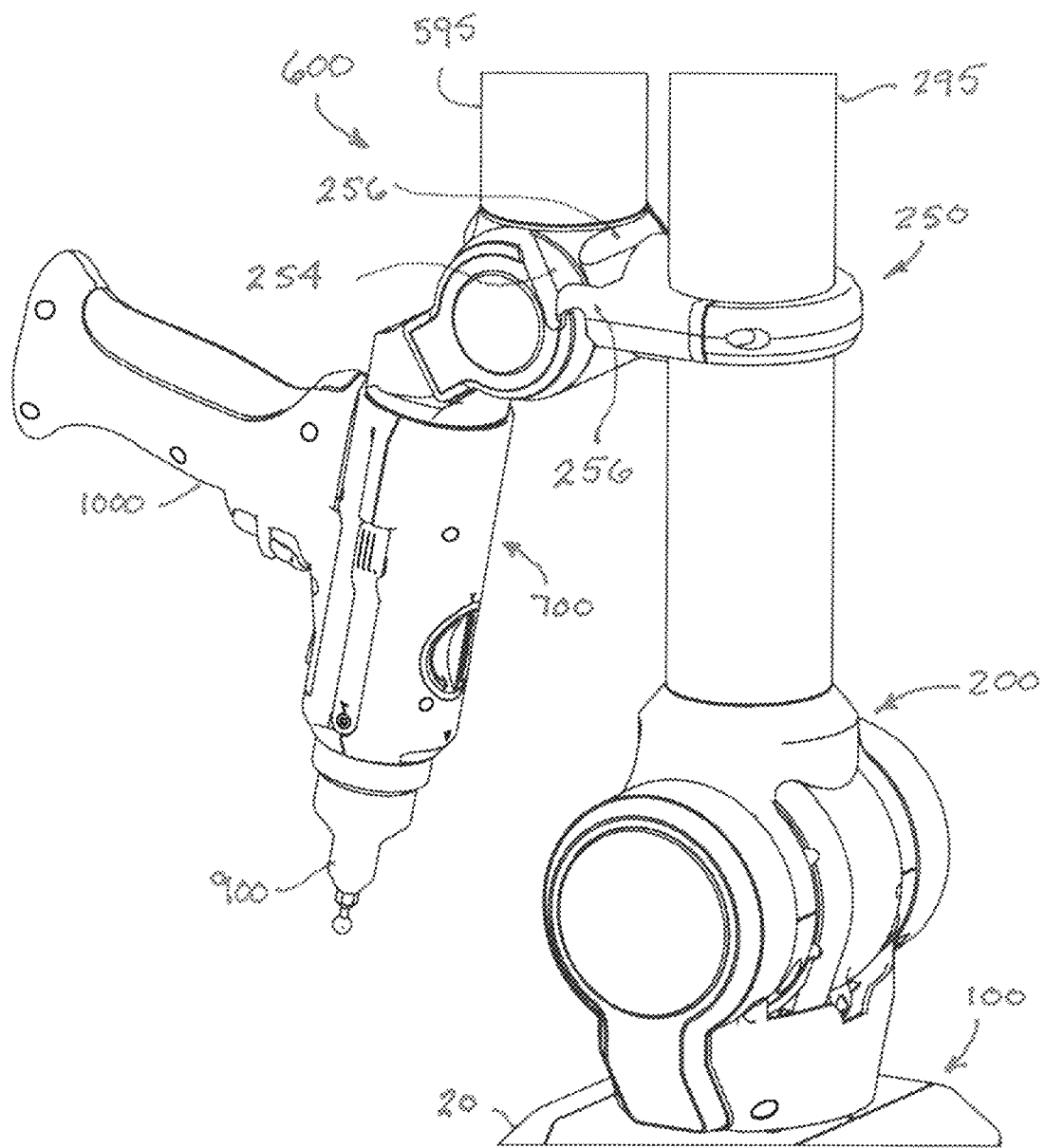
FIG. 1C is a partial isometric view of an AACMM according to an embodiment.

FIGS. 1A, 1B, 1C illustrate, in isometric view, an AACMM 10 according to various embodiments of the present invention, the AACMM being one type of coordinate measuring machine. In an embodiment, a first segment 295 and a second segment 595 are connected to a base 20 on one end and a measurement device on the other end. In an embodiment, the measurement device is a tactile-probe assembly 900.

In an embodiment illustrated in FIGS. 1A, 1B, 1C, the AACMM 10 comprises includes seven rotational elements; hence the AACMM 10 is referred to as a seven-axis AACMM. In other embodiments discussed herein below, the AACMM 10 is a six-axis AACMM. The seven-axis AACMM 10 of FIGS. 1A, 1B, 1C includes first-axis assembly 100, second-axis assembly 200, third-axis assembly 300, fourth-axis assembly 400, fifth-axis assembly 500, sixth-axis assembly 600, and seventh-axis assembly 700. In an embodiment, a tactile probe assembly 900 and a handle 1000 are attached to the seventh-axis assembly. Each of the axis assemblies may provide either a swivel rotation or a hinge rotation. In the embodiment illustrated in FIGS. 1A, 1B, 1C, the first-axis assembly 100 provides a swivel rotation about an axis aligned to a mounting direction of the base 20. In an embodiment, the second axis assembly 200 provides a hinge rotation about an axis perpendicular to the first segment 295. The combination of the first-axis assembly 100 and the second-axis assembly 200 is sometimes colloquially referred to as a shoulder 12 since in some embodiments the possible motions of the shoulder 12 of the AACMM 10 resemble the motions possible with a human shoulder.

In the embodiment illustrated in FIGS. 1A, 1B, 1C, the third-axis assembly 300 provides a swivel rotation about an axis aligned to the first segment 295. The fourth-axis assembly 400 provides a hinge rotation about an axis perpendicular to second segment 595. The fifth-axis assembly 500 provides a swivel rotation about an axis aligned to the second segment 595. The combination of the third-axis assembly 300, the fourth-axis assembly 400, and the fifth-axis assembly 500 is sometimes colloquially referred to as an elbow 13 since in some embodiments the possible motions of the elbow 13 of the AACMM 10 resemble the motions possible with a human elbow.

In the embodiment illustrated in FIGS. 1A, 1B, 1C, the sixth-axis assembly provides a hinge rotation about an axis perpendicular to the second segment 595. In an embodiment, the AACMM 10 further comprises a seventh-axis assembly, which provides a swivel rotation of probe assemblies (e.g. probe 900) attached to the seventh axis. The sixth-axis assembly 600, or the combination of the sixth-axis assembly 600 and the seventh-axis assembly 700, is sometimes colloquially referred to as a wrist 14 of the AACMM 10. The wrist 14 is so named because in some embodiments it provides motions similar to those possible with a human wrist. The combination of the shoulder 12, first segment 295, elbow 13, second segment 595, and wrist 14 resembles in many ways a human arm from human shoulder to human wrist. In some embodiments, the number of axis assemblies associated with each of the shoulder, elbow, and wrist differ from the number shown in FIGS. 1A, 1B, 1C. It is possible, for example, to move the third-axis assembly 300 from the elbow 13 to the shoulder 12, thereby increasing the number of axis assemblies in the shoulder to three and reducing the number of axis assemblies in the wrist to two. Other axis combinations are also possible.

In an embodiment, a parking clamp 250 on the first segment 295 includes parking-clamp fingers 252 (FIG. 1C) that tie together the first segment 295 to the second segment 595 while holding both segments in a vertical orientation. In an embodiment, the parking-clamp fingers 252 grip a parking clamp recess 254 while a sixth-axis yoke bumper 256 cushions the parking clamp 250 against the sixth-axis assembly 600, thereby reducing or preventing potential mechanical shock as the first segment 295 and the second segment 595 are brought together. In an embodiment, the parking clamp 250 holds the first segment 295 and the second segment 595 fixed vertical orientation, thereby reducing or minimizing the space taken by the arm segments 295, 595 when the AACMM 10 is not in use performing a measurement. In an embodiment, an operator may release the parking clamp fingers 252, thereby permitting free movement of the arm segments 295, 595 as illustrated in FIG. 1A. In another embodiment, the parking clamp is attached to the second segment 595 rather than the first segment 295. In another embodiment, the parking clamp fingers attach to a different element than the parking-clamp recess of FIG. 1C. In another embodiment, clamping is provided by a different mechanism than the parking-clamp fingers 252.

In an embodiment, a portable articulated arm coordinate measuring machine (AACMM) includes: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; a parking clamp affixed to one of the plurality of connected arm segments, the parking clamp having a plurality of fingers disposed lock in place two of the plurality of the connected arm segments when the plurality of fingers are pressed into a parking clamp recess of the AACMM, the parking clamp further disposed to release the two of the plurality of the connected arm segments when the fingers of the parking clamp are pulled away from the parking clamp recess; an electronic circuit that receives the position signal from the at least one position transducer and provides data corresponding to a position of the measurement device; and a processor operable to determine three-dimensional (3D) coordinates of a point measured by the measurement device based at least in part on the provided data corresponding to the position of the measurement device.

In an embodiment, the AACMM further includes a bumper, the bumper coupled to the AACMM and arranged to make contact with the parking clamp when the plurality of fingers are pressed into place in the parking clamp recess.

FIG. 2 is a block diagram of base electronics 2000. FIG. 2A includes modular power supply 2005, battery packs 2010, and a power supply 2015. These elements are shown in greater detail in a block diagram of FIG. 2B. In an embodiment, the modular power supply 2005 is located external to the power supply 2015 and is plugged into AC power mains to provide a dual battery smart charger 2020 with a voltage of 24 VDC. In an embodiment, the dual battery smart charger 2020 provides a portion of the voltage from the modular power supply 2005 to charge one or both of smart battery packs. In an embodiment, a System Management Bus (SMBUS) 2021, which is a single-ended simple two-wire bus for the purpose of lightweight communication, provides communication among the dual battery smart charger 2020 and smart battery packs 2010. In an embodiment, the smart battery packs 2010 include a first battery pack 2011 and a second battery pack 2012 (FIG. 2B). In an embodiment, one battery pack provides electrical power to the AACMM 10 while the other battery pack is being charged. In an embodiment, either or both battery packs 2011, 2012 may be removed while power from the modular power supply 2005 is being applied. In other words, the battery packs may be "hot swapped."

Figure 6A:
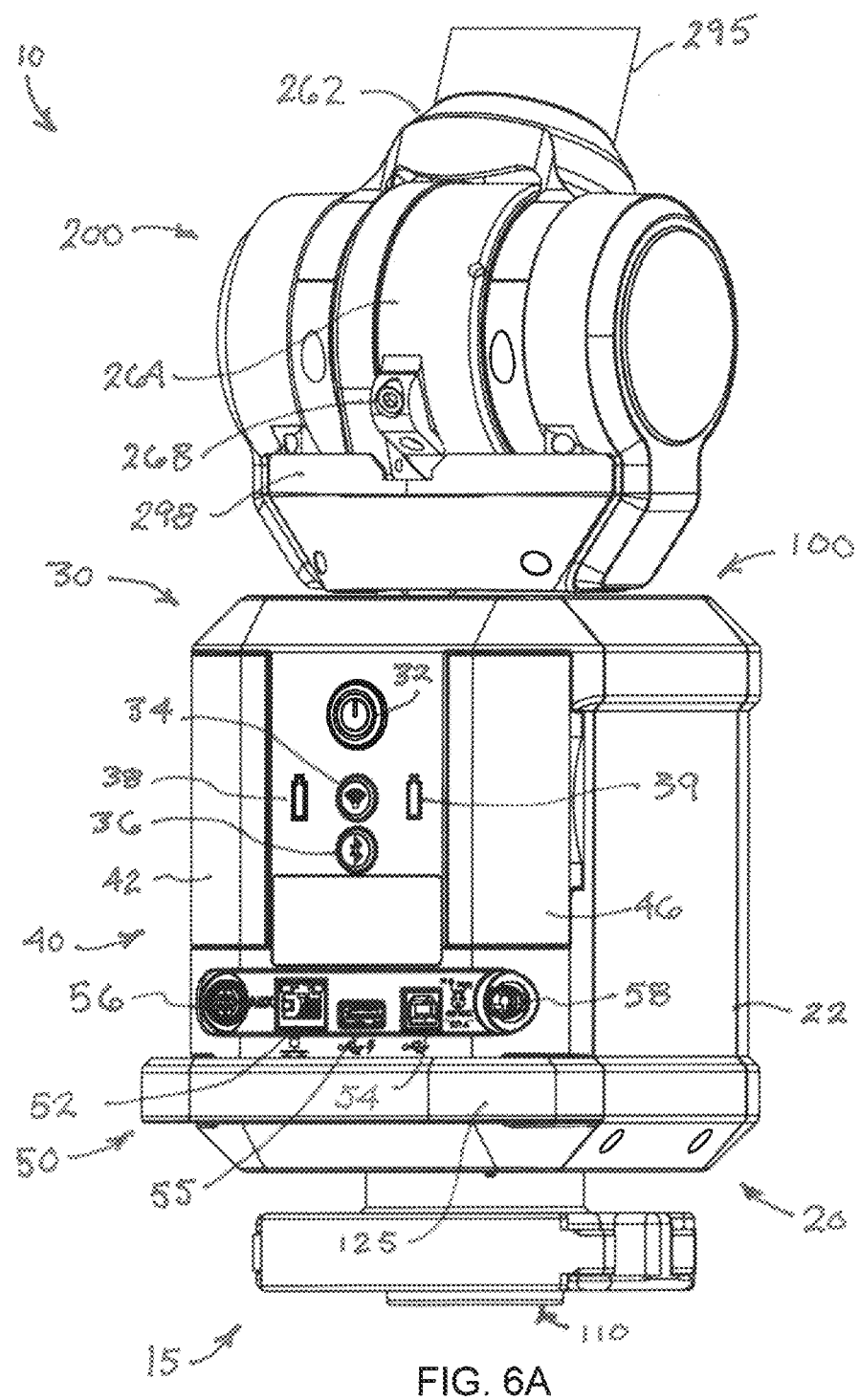
FIG. 6A is an isometric view describing some elements in a lower portion of the AACMM according to an embodiment.

In an embodiment, each battery pack 2011, 2012 includes a 14.4 VDC lithium-ion battery. In an embodiment, the battery packs 2011, 2012 are disposed in the base 20 behind a first battery door 42 and a second battery door 46, respectively, as shown in FIG. 6A. In an embodiment, the first battery door 42 and the second battery door 46 cooperate with a first battery-door hinge and a second battery-door hinge, respectively, as well as a first battery-door latch and a second battery-door latch, respectively. In an embodiment, a first-battery indicator light 38 and a second-battery indicator light 39 indicate an extent to which the first battery pack 2011 and the second battery pack 2012, respectively, are charged. In an embodiment, the external 24 VDC power supply attaches with a locking connector to a power supply port 58 shown in FIG. 6A.

Part of the electrical power passing through the line 2022 arrives at the regulator 2031, which provides a 5 VDC local voltage through a point 2135 to the environmental sensor and recorder battery charger and regulator 2076 (FIG. 2D) and to a user interface (IF) 2025, which includes an electrical on/off switch 2026 and a microcontroller (MCU) 2027. The electrical on/off switch 2026 is activated in response to pressing of a mechanical on-off button 32 shown in FIG. 6A. When the on/off switch 2026 is in the on state, the MCU 2027 produces a signal 2028 that causes a solid-state relay (SSR) 2032 to close, passing the voltage on the line 2022 to a buck-boost regular 2033 and a buck regulator 2034. The buck regulator 2034 provides a 5 VDC system voltage, which from a point 2137 is stepped down to secondary voltages 3.3 VDC, 1.8 VDC, 1.5 VDC, and 1.2 VDC for use by processors and memory. The buck-boost regulator 2033 provides a 24 VDC signal from a point 2136 to electronics in the arm segments, the arm end, and accessories attached to the arm probe end.

Figure 2A:
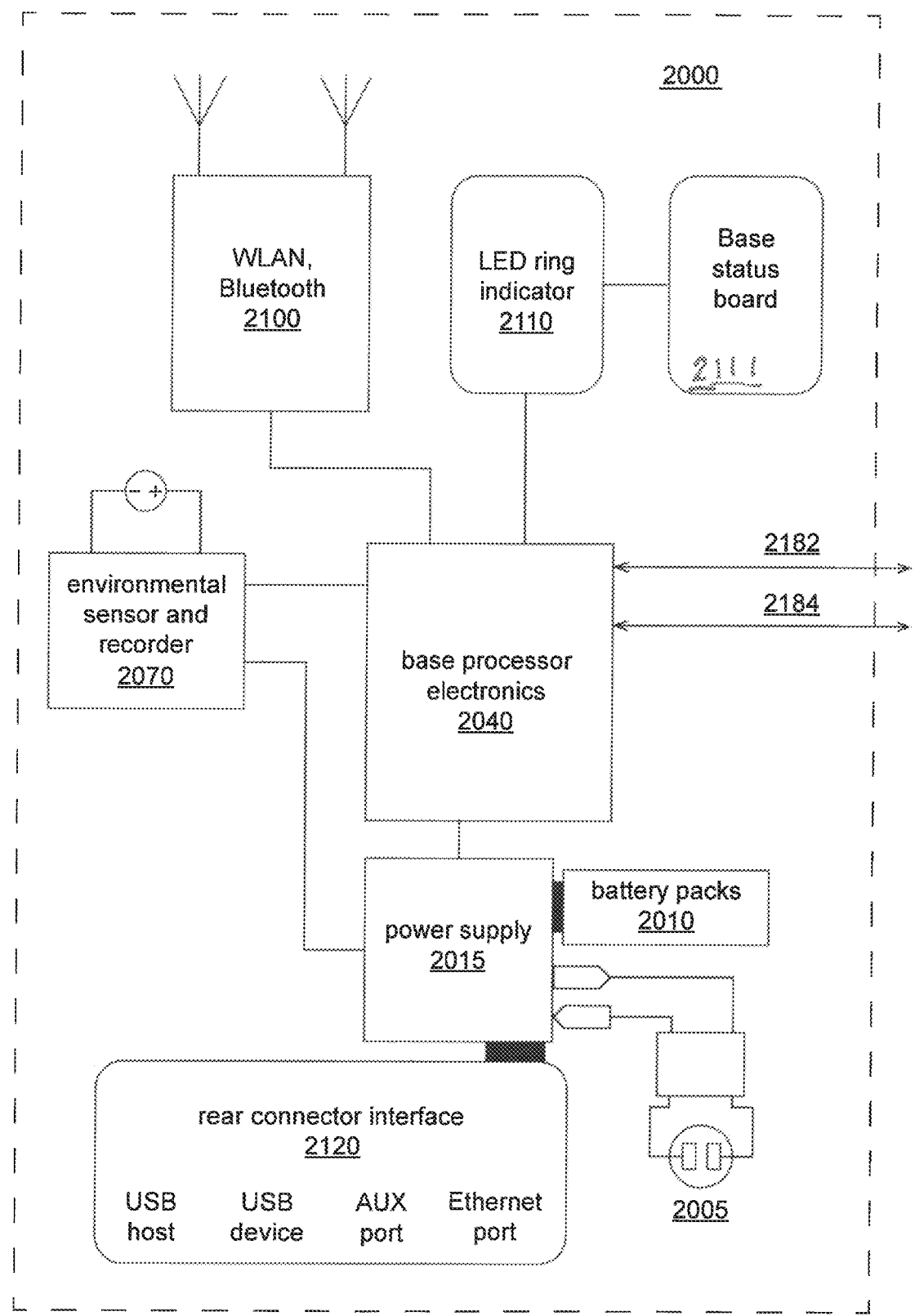
FIG. 2A is a block diagram of base electronics of an AACMM of FIG. 1 according to an embodiment.
Figure 2B:
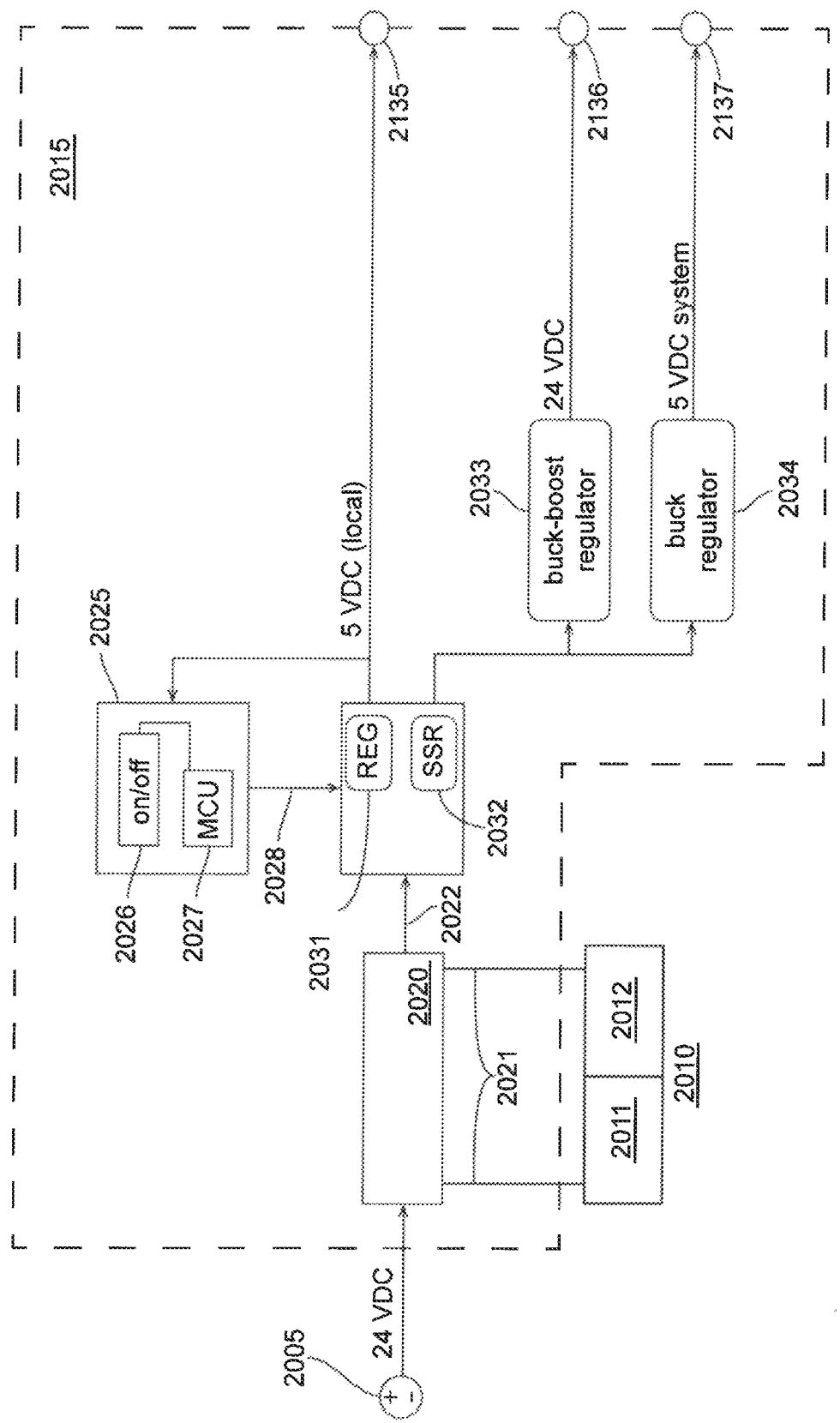
FIGS. 2B, 2C, 2D are block diagrams providing further detail of elements within the block diagram of FIG. 2 according to an embodiment.
Figure 2C:
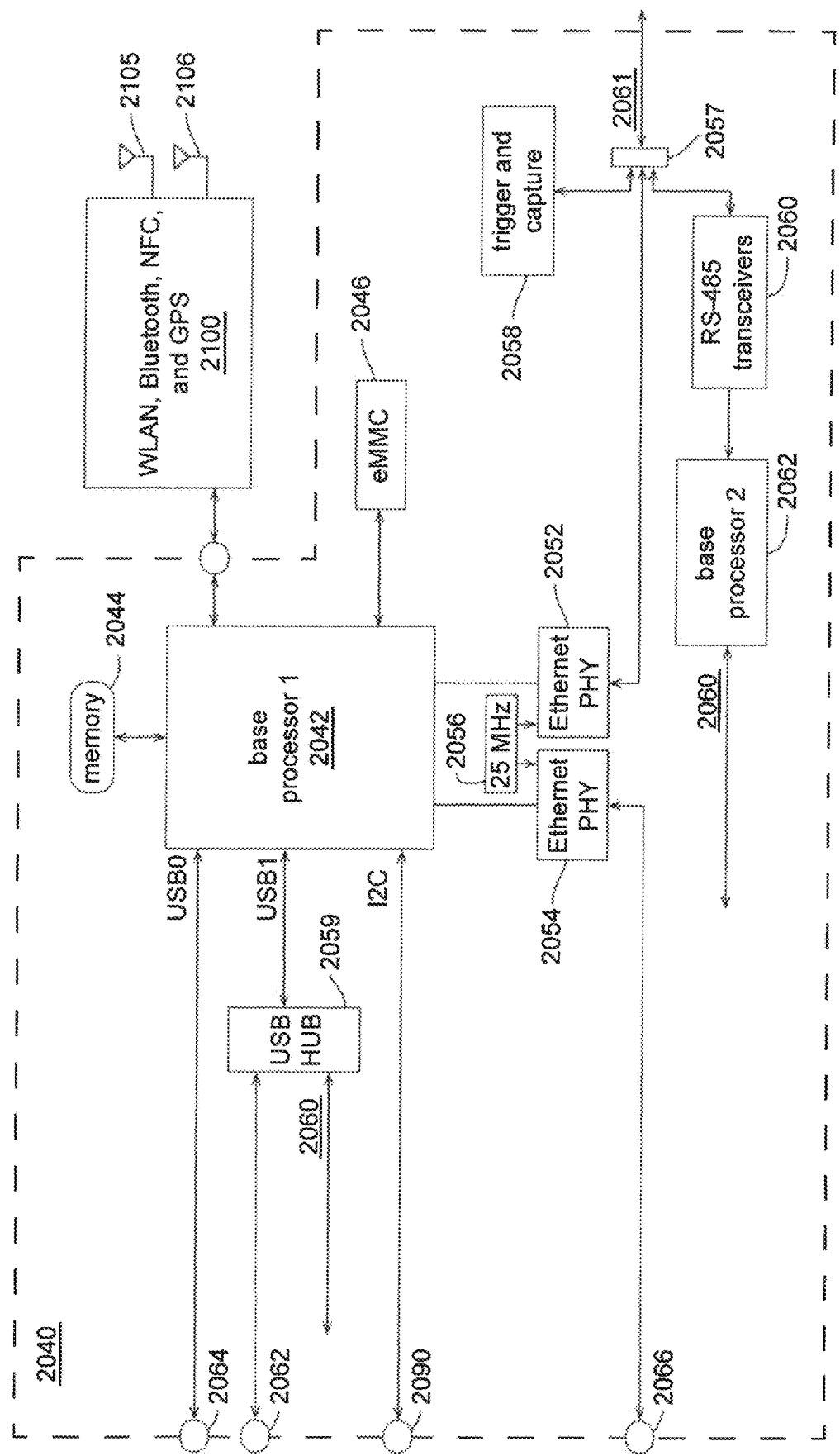
Figure 2D:
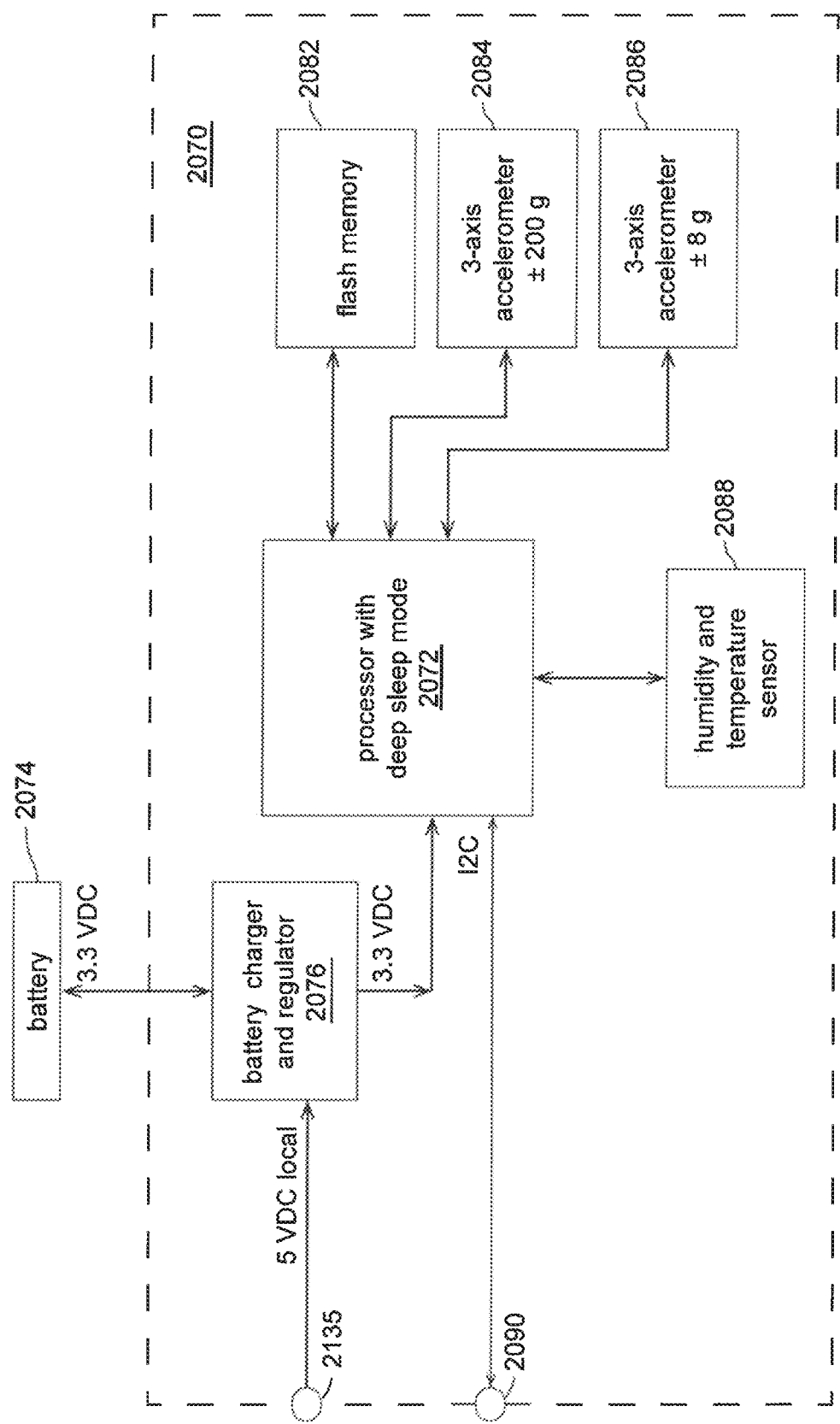

A block diagram of the environmental sensor and recorder 2070 is shown in FIG. 2D. If the voltage on the line 2022 is zero, then the 5 VDC local voltage is not present at the point 2135 in the environmental sensor and recorder 2070. In this case, a battery 2074 provides a 3.3 VDC signal to the components of the environmental sensor and recorder 2070. The 3.3 VDC signal passes through a battery charger and regulator 2076 to provide the 3.3 VDC signal to a processor with deep-sleep mode 2072. The processor 2072 receives readings from a humidity-and-temperature sensor 2088, a three-axis accelerometer 2084 that measures to ±200 g, and a three-axis accelerometer 2086 that measures to ±8 g. In operation, the processor stores readings every 15 minutes on a flash memory 2082. In an embodiment, the processor also saves on the flash memory 2082 large acceleration events observed by the three-axis accelerometers 2084, 2086. If the 5 VDC local voltage is present at the point 2135, then the battery charger 2076 uses the 5 VDC local voltage to charge the battery 2074.

FIG. 2C is a block diagram of the base processor electronics 2040, which includes a first base processor 2042 and a second base processor 2062. In an embodiment, the second base processor 2062 is a real-time processor. In an embodiment, the processor with deep sleep mode 2072 (FIG. 2C) communicates with the first base processor 2042 over an Inter-Integrated Circuit (I2C) bus through the point 2090. In an embodiment, whenever electrical power is being provided to the AACMM 10 by the modular power supply 2005 rather than a battery pack, the first base processor 2042 provides a 5 VDC, 2.5 Amp signal through a Universal Serial Bus (USB) external device port 2064 for use by any external device. This voltage is provided to a USB charging port 55 shown in FIG. 6A. A user may attach any compatible device to obtain power from the USB charging port 55 (FIG. 6A). Currently USB standards are ratified by a USB Implementers Forum (USB-IF).

In an embodiment, the first base processor 2042 exchanges data through a point with external USB host devices, such as external computing devices, over a USB data transfer port 54 shown in FIG. 6A. In an embodiment, electrical signals pass to and from the USB host device through a point 2062 to a USB hub 2059 and on to the first base processor 2042.

In an embodiment, an Ethernet signal may be provided over an Ethernet port 52 as shown in FIG. 6A. Ethernet is a computer networking technology based on IEEE 802.3 standards. The Ethernet signal arrives at a point 2066 in FIG. 2C, travels to an Ethernet PHY 2054, which is clocked at 25 MHz, before arriving at the first base processor 2042. The Ethernet PHY 2054 provides analog signals physical access to a link layer.

A second Ethernet path enables bidirectional communication with electrical components internal to the AACMM 10. The second Ethernet path, which includes an Ethernet PHY 2052, passes through a connector 2057 to join a collection of busses 2061. In an embodiment, the Ethernet is gigabit Ethernet, which means that data may be transferred at a rate of one gigabit per second. In an embodiment, the second Ethernet path mainly transfers data obtained by AACMM accessory devices such as laser line scanner or laser line probes (LLPs).

In an embodiment, electrical signals obtained from a tactile-probe assembly (e.g. probe 900) pass through an RS-485 transceiver 2060 before arriving at the second base processor 2062. Examples of a tactile-probe assembly are a hard-probe assembly 900 shown in FIGS. 1A, 1B and a touch-trigger probe assembly 960 in FIG. 22A. When directed by an operator, a hard-probe assembly 900 returns encoder readings to the base processor electronics 2040 at regular intervals set by a capture signal sent from the base processor electronics 2040. At each capture interval, angular readings are returned to the base processor electronics 2040, thereby enabling calculation of a position of a probe tip 904 (FIG. 22D) on the hard-probe assembly 900. In contrast, a touch-trigger probe assembly 960 (FIG. 22A) triggers a reading when a designated force is applied to the probe tip 904. Hence angular readings are taken in response to the trigger signal sent from the touch-trigger probe assembly 960. A signaling unit 2058 broadcasts capture signals and receives trigger signals. In an embodiment, the capture signals and trigger signals travel along a first bus 2182, shown in FIGS. 2, 4A, 4B. The second base processor 2062 communicates with the first base processor 2042 through a USB slave line 2060 that passes through the USB hub 2058 coupled to the first base processor 2042.

In an embodiment, the first base processor 2042 further connects to an embedded Multi-Media Controller (eMMC) 2046, which includes both flash memory and a flash memory controller integrated on the same silicon die. In an embodiment, the first base processor 2042 further connects to a memory 2044, which in an embodiment is a double data rate type-three synchronous dynamic random-access memory (DDR3 SDRAM).

In an embodiment, the base processor electronics 2040 further interfaces with a board 2100 having accessory communication and sensor devices. In an embodiment, the board 2100 includes a wireless local area network (WLAN) 2101. In an embodiment, the WLAN 2101 is an IEEE 802.11 Wi-Fi network enabled by pressing a Wi-Fi button 34 shown in FIG. 6A. Wi-Fi enables wireless communication between the AACMM 10 and an external device such as a stationary or mobile computing device.

In an embodiment, the board 2100 further includes a Bluetooth™ Low Energy (BLE) device 2102 capable of wirelessly exchanging data with external devices such as computing devices. BLE is a wireless personal area network technology designed and marketed by the Bluetooth Special Interest Group. The BLE device 2102 is enabled by pressing a Bluetooth™ button 36 shown in FIG. 6A. In an embodiment, the on-off button 32, the Wi-Fi button 34, and the Bluetooth™ button 36 are all part of a larger membrane switch and user interface (IF).

In an embodiment, the board 2100 further includes near-field communication (NFC) hardware. In an embodiment, the NFC hardware includes a dual-interface memory/tag device that communicates with an external NFC reader and a wired port that communicates with the first base processor 2042. In another embodiment, the NFC hardware includes a single-port NFC tag that communicates with an external NFC reader but may does not include a wired port for communicating with the first base processor 2042. The single-port NFC tag may store and transmit device data such as serial number, configuration, revision data, or encoder identification data. Descriptions of NFC use in AACMMs are given in commonly owned United States Published Patent Applications 2015/0330761, 2015/0330762, 2015/0330763, 2015/0330764, 2015/0330765, 2015/0330766, the contents all of which are incorporated by reference herein.

In an embodiment, the board 2100 further includes a global positioning system (GPS) receiver. In an embodiment, the GPS receiver is used to track the location of the AACMM 10, for example, to determine the location of the AACMM 10 when leased. In another embodiment, the GPS receiver is used to synchronize multiple instruments, which may include AACMMs, laser trackers, scanners, or other devices. Descriptions of GPS used with AACMMs are given in United States Published Patent Application 2015/0355310, the contents of which is incorporated by reference herein. In an embodiment, WLAN 2101, Bluetooth™ 2102, NFC, and GPS are used in conjunction with antennas, which may include antennas 2105, 2106.

In an embodiment, the base electronics 2000 further includes a light-emitting-diode (LED) ring indicator 2110. In an embodiment, the ring indicator 2110 is coupled to a status board 2111. The ring indicator 2110 and status board 2111 cooperate to provide a visual feedback to the operator.

As will be discussed in more detail herein, the AACMM 10 includes indicator lights on the probe end that provide a visual signal or feedback to the operator. In some embodiments, the probe end indicator lights may be obscured, such as when the probe is being used to measure inside cavities. The indicator ring 2110 provides advantages in allowing the operator to visually see the status of the AACMM and the probe end, even when the indicator lights on the probe end are obscured.

In an embodiment, the rear connector interface includes a USB host 54, a USB device (powered) 55, an Ethernet port 52 and an auxiliary port 56. The auxiliary port 56 allows for a direct RS485/422 connection and 24V isolated power to external encoders or other devices. This includes direct power and communication to devices such as a rotary table. In an embodiment, the rotary table is the same as that described in commonly owned United States Patent Application Publication 2019/0317470, the contents of which are incorporated by reference herein. The auxiliary port 56 further may be used with digital encoder protocols including, but not limited to, open protocols such as SSI, BiSS and BiSS-C (iCHaus), and proprietary protocols (e.g. EnDat—Heidenhain). The auxiliary port 56 could further be used to interface to other digital devices including timers, counters, barcode readers and others for communication or potential automation purposes. In an embodiment, the base electronics includes two RS485 transceivers that can be used separately to communicate to individual or multiple devices via each transceiver.

Figure 3:
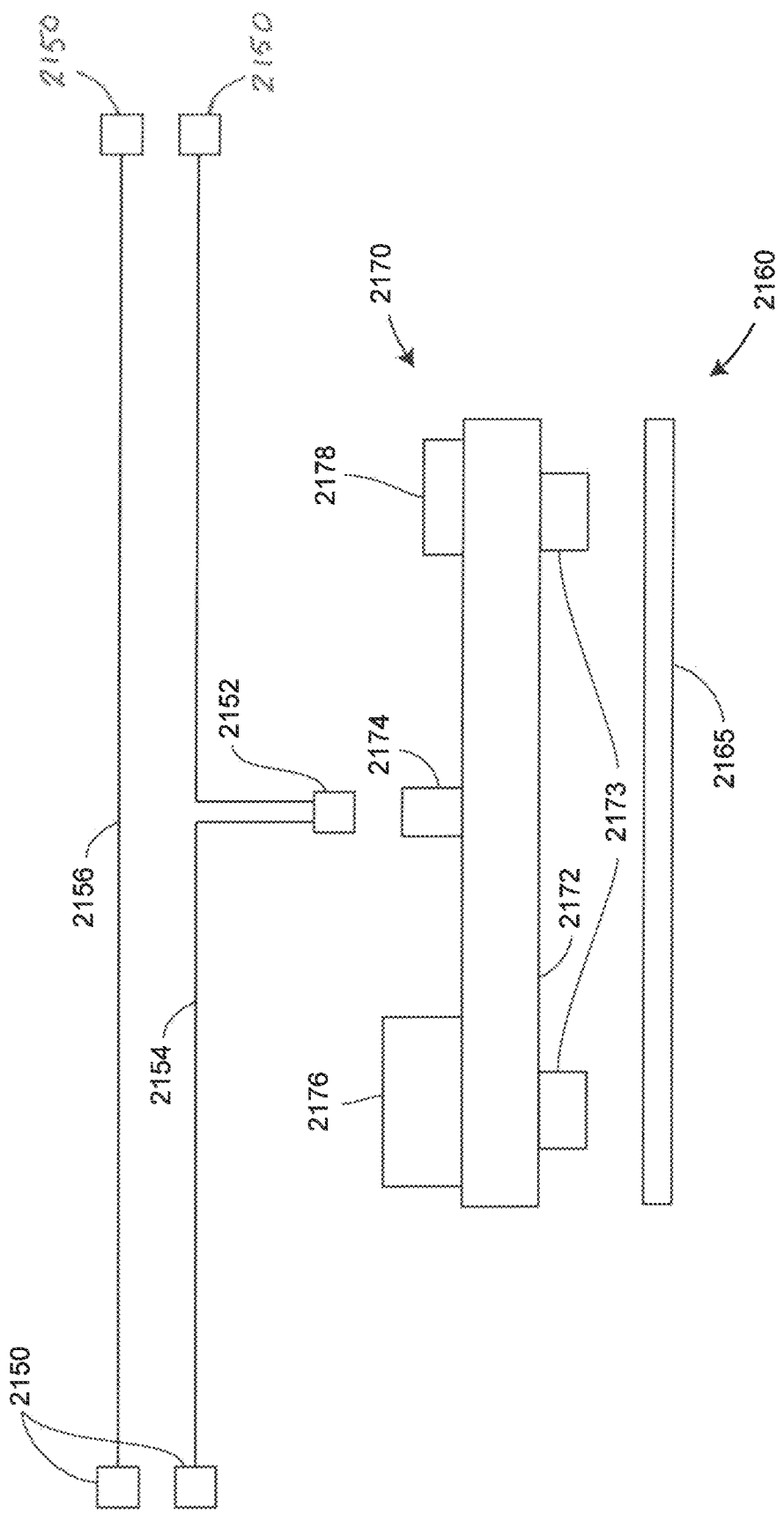
FIG. 3 is a block diagram of bus cables and their relation to encoder components according to an embodiment.

In an embodiment illustrated in FIG. 3, angles of rotation of the axis assemblies 100, 200, 300, 400, 500, 600, 700 of the AACMM 10 are measured with angular transducers. In an embodiment, the angular transducers are angular encoders 2160, elements of which are illustrated schematically in FIG. 3. In an embodiment, an angular encoder 2160 includes an encoder disk 2165 and encoder electronics 2170. In an embodiment, encoder electronics 2170 includes an encoder printed circuit board (PCB) 2172, one or more read heads 2173, processor and support electronics 2176, temperature sensor connector 2178, and board connector 2174. In an embodiment, the encoder disk 2165 includes a collection of radially directed lines, the positions of which are sensed by the one or more read heads 2173 and the sensed positions processed with processor and support electronics 2176, to determine an angle of rotation of the encoder disk 2165 in relation to the read heads 2173. In an embodiment, each board connector 2174 is attached to a T-connector 2152 of a T-cable 2154 within the first bus 2182 (FIG. 2). Each encoder PCB 2172 connects to a corresponding T-cable 2154 of the first bus 2182. Cable connectors 2150 on each end of the T-cable 2154 attach to cable connectors 2154 on adjacent T-cables 2154 in the AACMM 10. In this way, angle information may be transferred from each angular encoder 2160 through the first bus 2182 (FIG. 2A) to the main processor electronics 2040 for further processing. The transmitted angles are synchronized to the capture signal, which in an embodiment has a rate of around one kilohertz. By connecting a single T-connector 2152 to a corresponding single board connector 2174, the angular encoders 2160 continue to send their angle readings to the base processor electronics 2040 even if one or more of the encoder electronics 2170 are disconnected from the first bus 2182. In an embodiment, cable connectors 2150 are provided on each end of an interconnect cable 2156 of the second bus 2184 (FIG. 2A). Cable connectors 2150 of adjacent interconnect cables 2156 are connected together to provide a continuous electrical path for the second bus 2184.

Figure 4A:
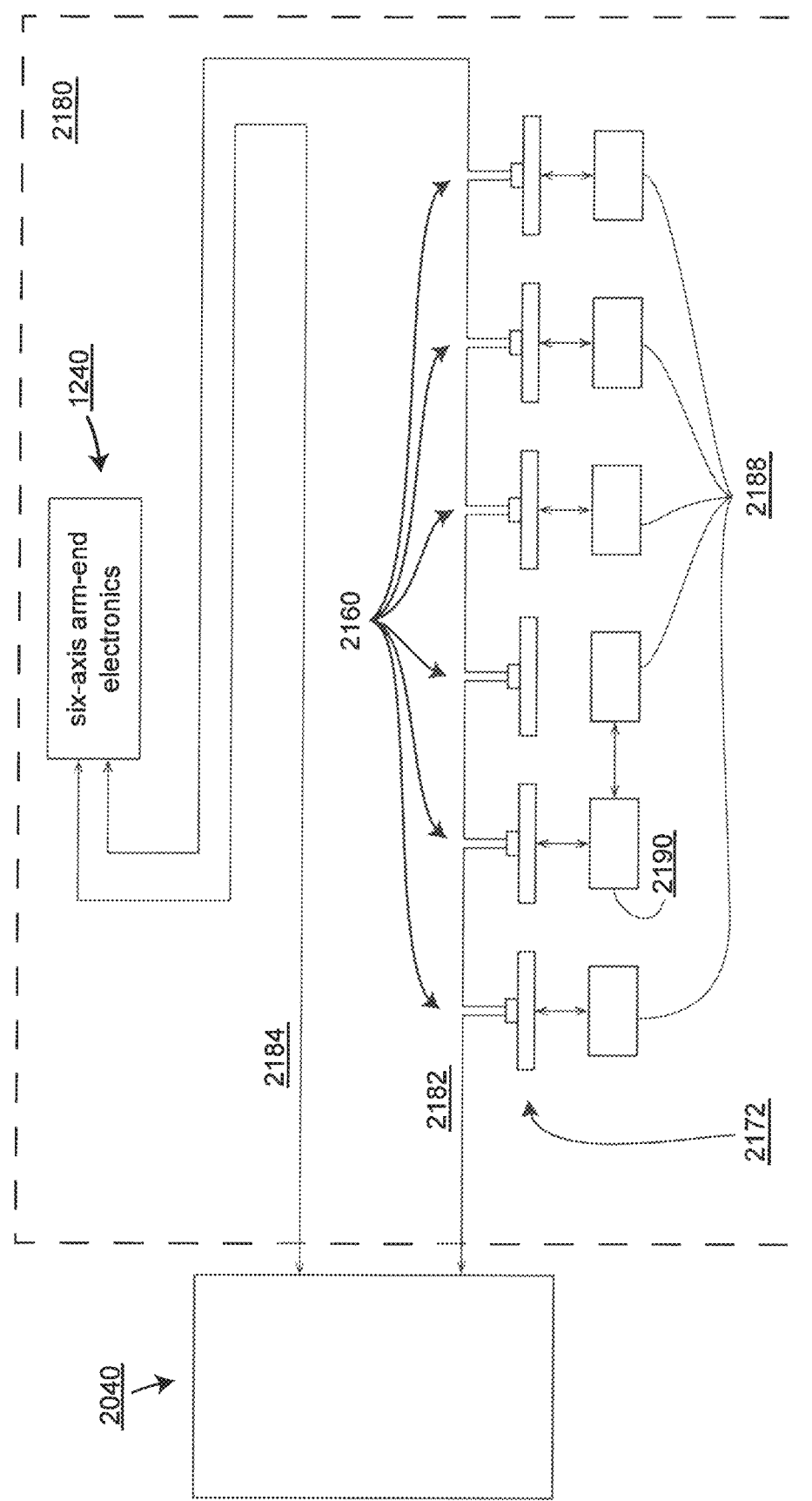
FIGS. 4A, 4B are block diagrams of interconnecting elements in six-axis electronics and seven-axis electronics according to an embodiment.

FIG. 4A shows electrical elements 2180 in a six-axis AACMM. The electrical elements 2180 include six angular encoders 2160 attached by the first bus 2182 to the base processor electronics 2040 on one end, and to six-axis arm-end electronics 1240 on the other end. In an embodiment, one or more of the encoder PCBs 2172 are attached to an expandable temperature sensor 2190. When an expandable temperature sensor 2190 is attached to the temperature sensor connector 2178 (FIG. 3), a further temperature sensor 2188 may be attached to the expandable temperature sensor 2190. In an embodiment, some temperature sensors 2188 are not expandable. In an embodiment, at least one temperature sensor, either 2188 or 2190, is placed in the vicinity of each angular encoder to provide for the compensating of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to six-axis arm-end electronics 1240.

Figure 4B:
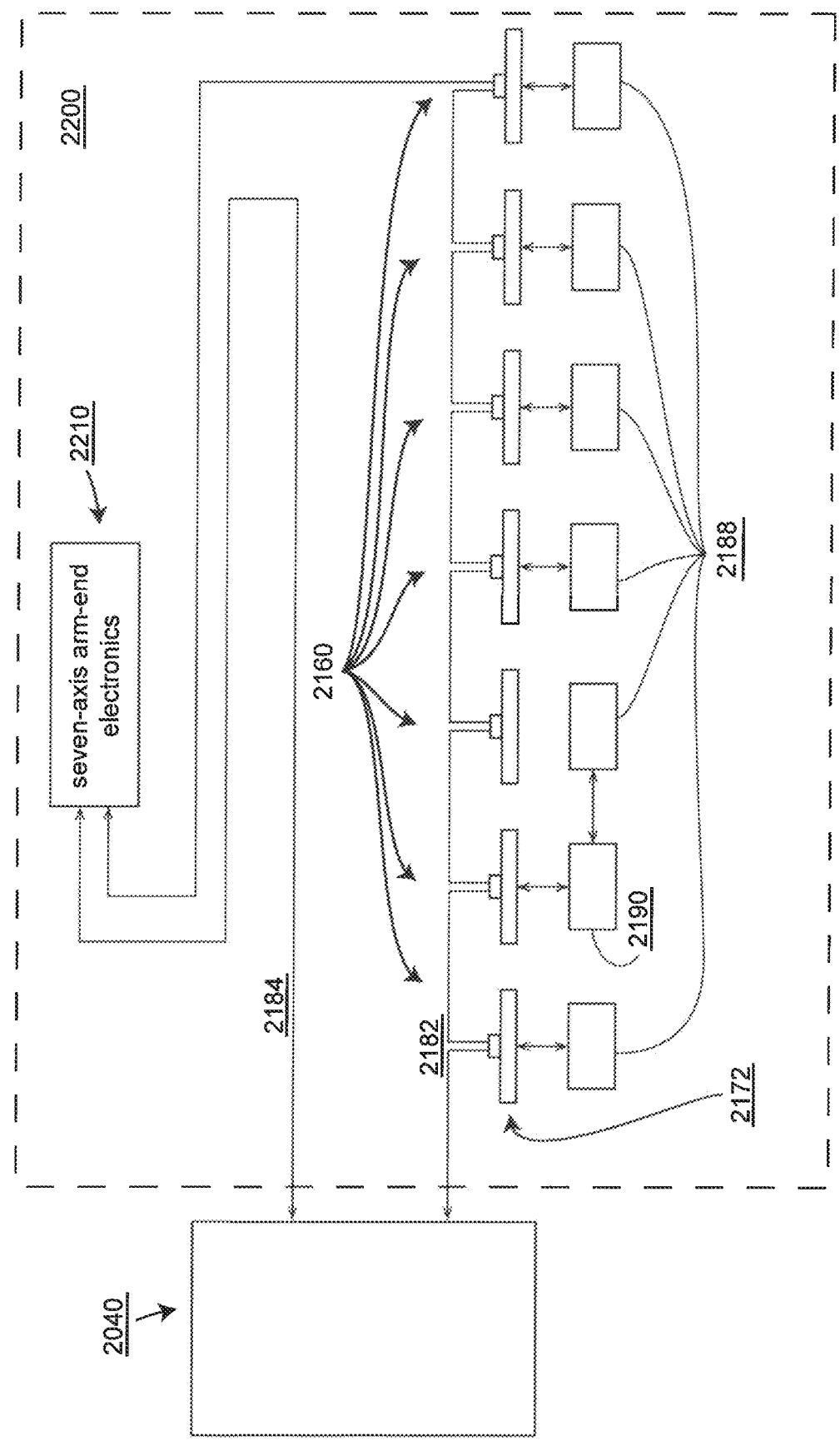

FIG. 4B shows electrical elements 2200 in a seven-axis AACMM. The electrical elements 2200 include seven angular encoders 2160 attached by the first bus 2182 to the base processor electronics 2040 on one end and to seven-axis arm-end electronics 2210 on the other end. In an embodiment, one or more of the encoder PCBs 2172 are attached to an expandable temperature sensor 2190. When an expandable temperature sensor 2190 is attached to the temperature sensor connector 2178, a further temperature sensor 2188 may be attached to the expandable temperature sensor 2190. In an embodiment, some temperature sensors 2188 are not expandable. In an embodiment, at least one temperature sensor, either 2188 or 2190, is placed in a vicinity of the angular encoders to allow for the compensation of angular readings to account for thermal expansion. In an embodiment, further temperature sensors, either 2188 or 2190, are placed in the vicinity of the first segment 295 (FIG. 1A) and the second segment 595 (FIG. 1A) to allow for the compensation of the segment lengths to account for thermal expansion of the segments. In an embodiment, the compensated segment lengths are used by the base processor electronics 2040 or by associated computing devices to more accurately determine 3D coordinates measured by the AACMM 10. In an embodiment, a second bus 2184 electrically attaches base processor electronics 2040 to seven-axis arm-end electronics 2210.

Figure 5:
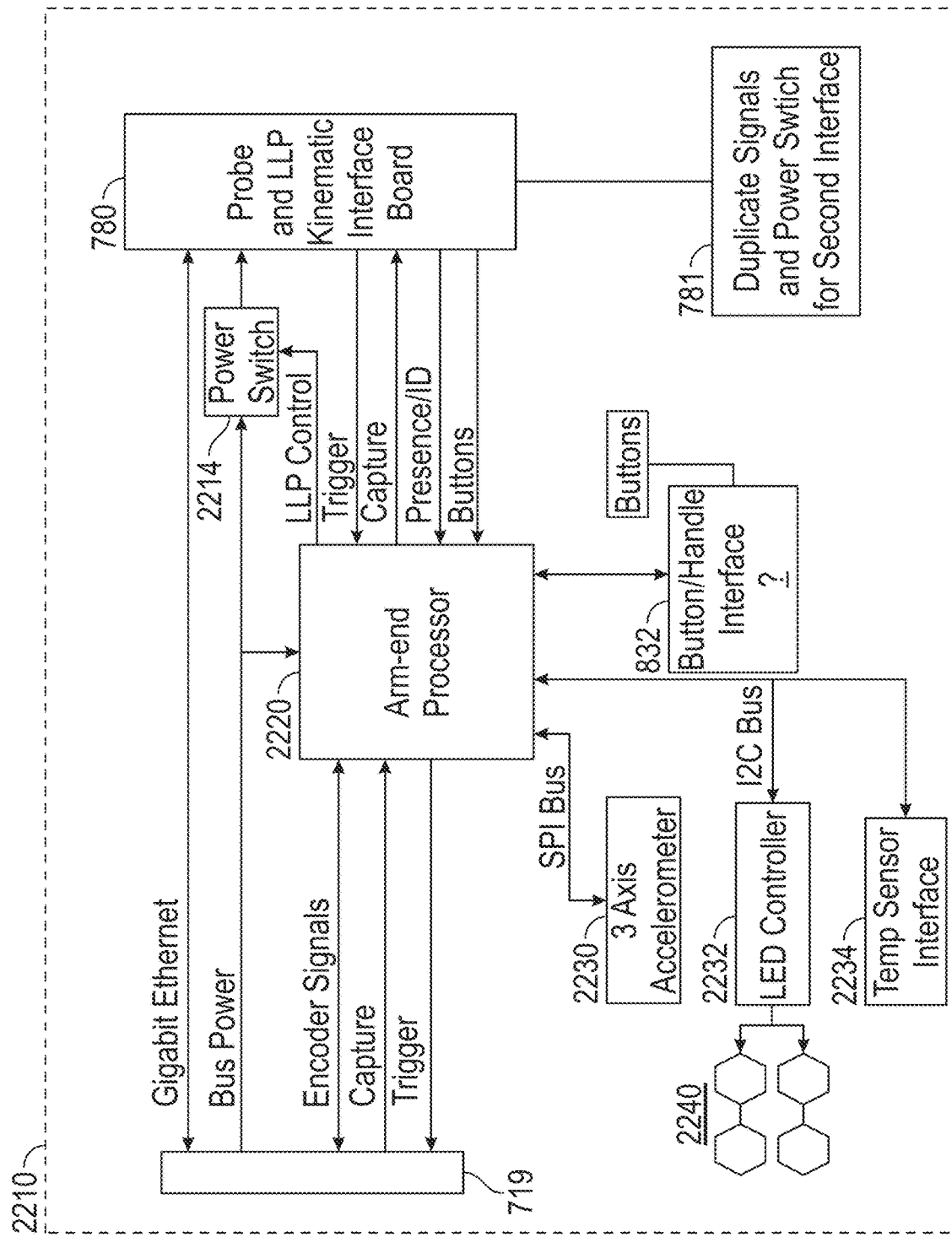
FIG. 5 is a block diagram of seven-axis arm-end electronics according to an embodiment.

FIG. 5 is a block diagram of elements of the seven-axis arm-end electronics 2210. Bus connectors 719, also shown in FIG. 19F, include two electrical connectors that attach to cable connectors 2150 (FIG. 3) of the first bus 2182 (FIG. 2A) and the second bus 2184 of the sixth-axis assembly 600. An arm-to-handle/button-plate connector 832 in FIG. 5, and further shown in FIGS. 24A-24K, and also connects to a handle-to-arm connector 1022 (FIG. 18D, FIG. 18E) of an interchangeable device such as a handle 1000 as shown in in FIGS. 18A, 18C, 18D, 18E or a button-plate 2400 shown in FIG. 18B, and FIGS. 24A-24F. FIG. 5 includes an accessory interface board 780. The accessory interface board 780 is configured to make electrical contact with removable accessories, such as tactile probes laser-line-scanners/laser-line-probes, as discussed further herein below. The accessory interface board 780 communicates bidirectionally with the arm-end processor 2220 through an I2C bus. When a touch-trigger probe assembly 960 (FIG. 22D) is attached, the accessory interface board 780 further sends trigger signals from the accessory interface board 780 to the arm-end processor 2220.

The button plate interface 832 connects buttons 833 to the arm-end processor 2220. The buttons 822 function as actuators for switches that cause a signal to be transmitted or other control function to be performed.

As discussed in more detail herein, the accessory interface board 780 is configured to connect with two separate accessory interfaces on the arm probe end, such as a combination of multiple probes (FIG. 23M, FIG. 23N) or a probe and laser line probe (FIGS. 23I-23L) for example. It should be appreciated that the combinations of accessories shown in in FIGS. 23I-23N are for example purposes and not intended to be limiting. In other embodiments, other accessories or other combinations of accessories may be coupled to the accessory interface board 780, such as but not limited to cameras, area scanners, triangulation scanners, and lights for example. In an embodiment, each of the accessory interfaces have a pinned interface, such as a 21 pin interface for example.

In an embodiment, the accessory interface board 780 may include or cooperate with a switch 781, that provides for duplicating signals and switching power between the two accessory interfaces. In one embodiment, the switch 781 is configured to allow accessories to be used on both accessory interfaces simultaneously. In another embodiment, the accessory interface board 780 only allows power to one of the accessory interfaces at a time.

In an embodiment, the seven-axis arm-end electronics 2210 includes an arm-end processor 2220 as shown in FIG. 5. In an embodiment, the arm-end processor 2220 is electrically connected to a three-axis accelerometer 2230 through a serial peripheral interface (SPI) bus. The three-axis accelerometer 2230 provides a record of severe impacts to the arm end. A record of such impacts may provide a clue to an origin of problems observed in service. In an embodiment, the three-axis accelerometer 2230 is included on a seven-axis arm-end board.

Figure 25A:
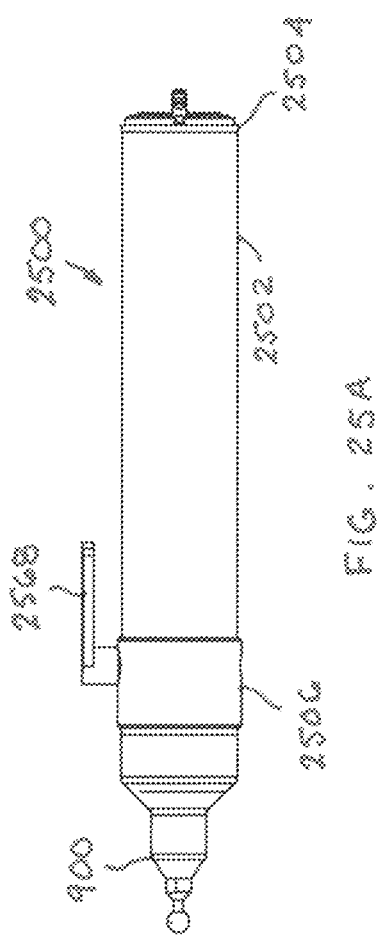
Figure 25B:
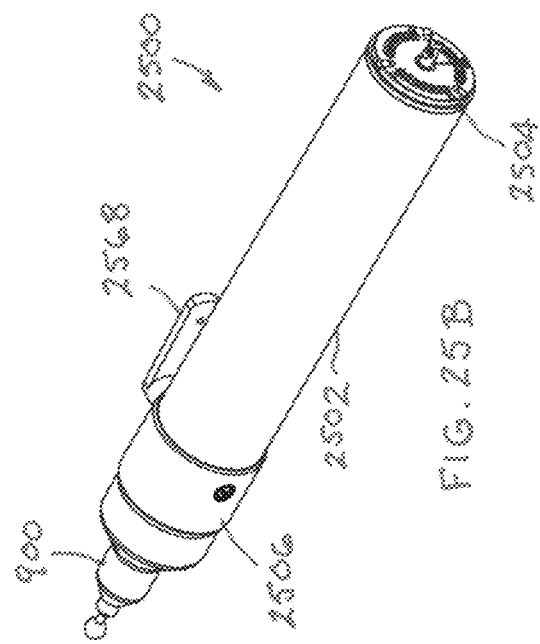
Figure 25C:
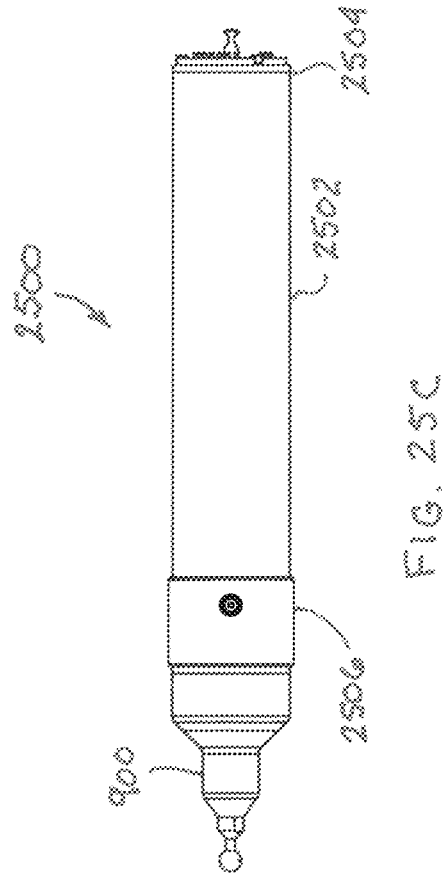
Figure 25D:
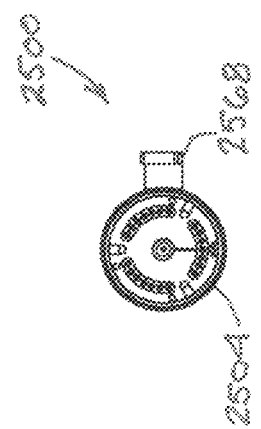
Figure 25E:
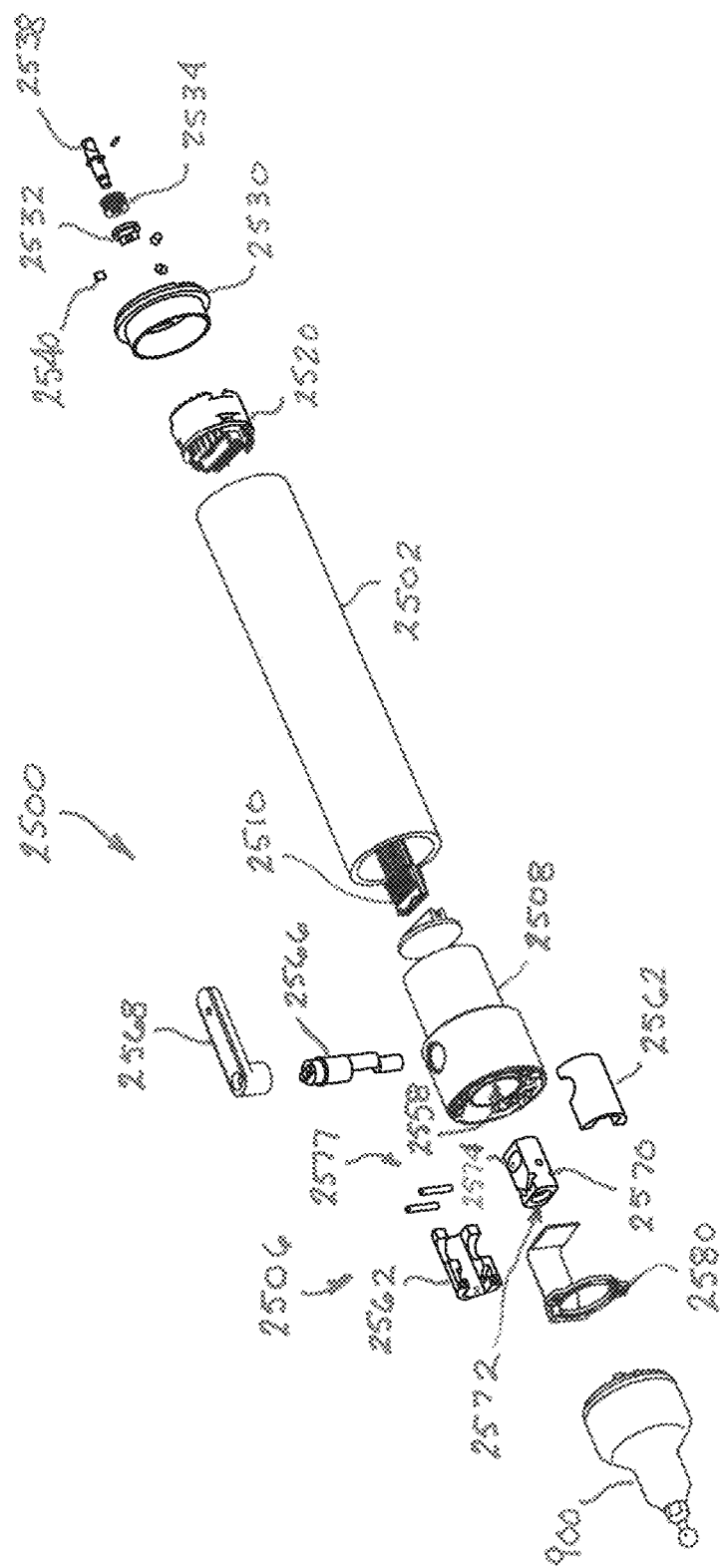
Figure 25G:
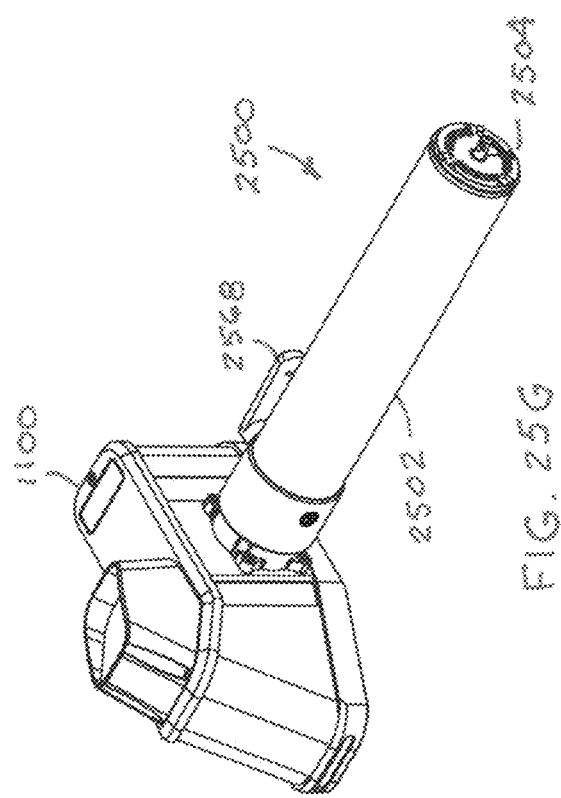
Figure 25I:
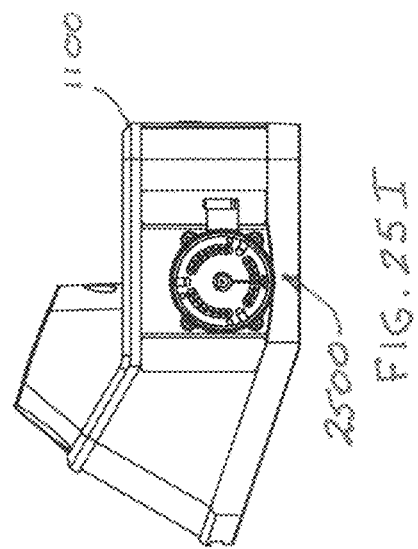
Figure 25F:
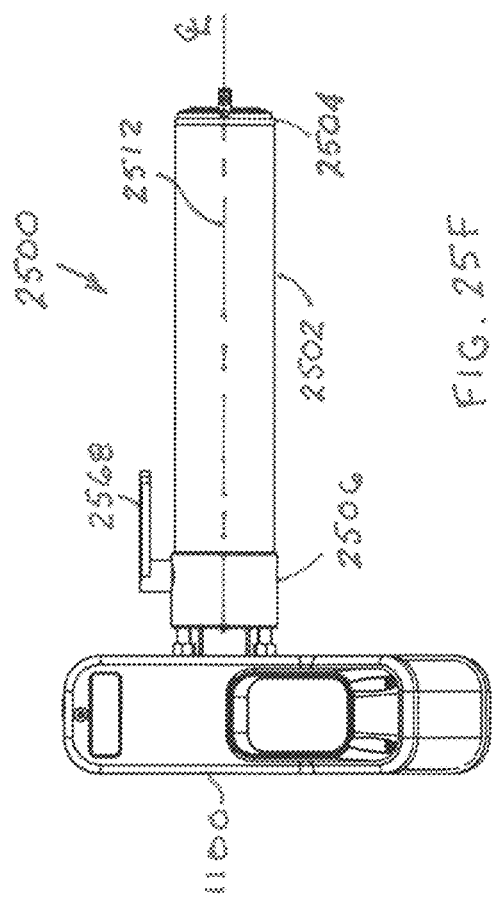
Figure 25H:
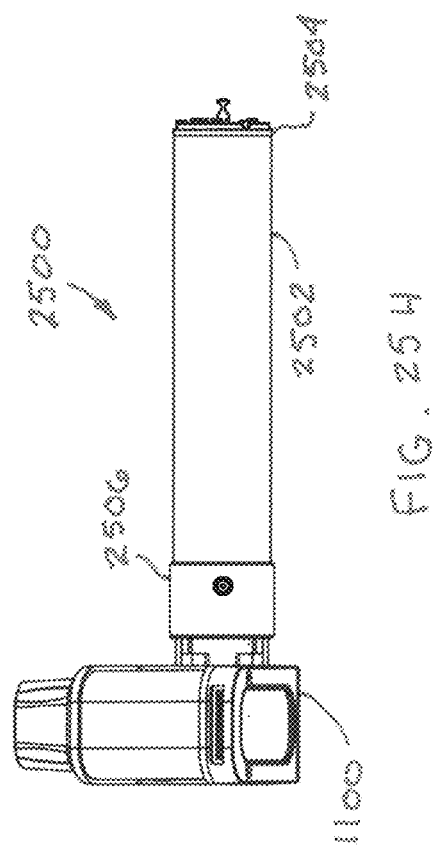

In an embodiment, the arm-end processor 2220 is further connected to a light-emitting diode (LED) controller 2232 through an I2C bus. In an embodiment, the LEDs 2240 are red-blue-green (RGB) LEDs that provide any of a plurality of colors within the visible spectrum. The LED controller 2232 provides control signals to the LEDs 2240 to control aspects such as emitted colors and light levels from the LEDs 2240. In an embodiment, the light emitted from the LEDs 2240 is controlled separately for each LED 2240 so that light emitted by the LEDs 2240 may be one color from an upper light diffuser 1222 and another color from a lower light diffuser of an end-effector assembly 1200, as shown in FIG. 25A. In an embodiment, the color emitted by the LEDs 2240 is duplicated on the light ring 2110. It should be appreciated that the light ring 2110 provides a technical effect of alerting the operator of a status of the system even if the LED's 2240 are not visible, such as due to the connection of an accessory for example.

In an embodiment, the arm-end processor 2220 also communicates with a temperature sensor interface 2234 over an I2C bus. The temperature sensor interface provides a measured temperature that may be used to compensate for thermal expansion of elements/accessories attached to the end of the arm.

The arm-end processor 2220 receives a variety of electrical signals from the bus connectors 719 including bus power signals, encoder signals, capture signals, and trigger signals. The bus connector further provides bus power to the arm-to-handle connector 832 if a power switch 2214 is activated by an LLP 1100 control signal from the arm-end processor 2220. The LLP 1100 control signal is a signal provided by the LLP 1100 or other accessory indicating that it is connected to the AACMM 10 and should receive electrical power from the bus. It should be appreciated that in some embodiments, the power switch 2214 cooperates with, or is integrated with the switch 781 to provide power to an accessory coupled to one of the accessory interfaces. Besides sending bus power to the LLP 1100 or other accessory device, the accessory interface board 780 also transfers high-speed data from accessories such as the LLP 1100 over the second bus 2184 (FIG. 4A, 4B) to the first base processor 2042. In an embodiment, the pressing of an actuator or button may result in signals being transmitted the arm-to-handle connector 832 to the arm-end processor 2220 in response to pressing of a handle button 1010, 1011 or buttons 2401, 2402 shown in FIGS. 18A, 18E, 24A, 24B. The capture signals are sent from the arm-end processor 2220 to the arm-to-handle connector 832 to synchronize measured values obtained from accessories such as the LLP 1100 with the angular readings obtained by the angular encoders in the arm-axis assemblies 100, 200, 300, 400, 500, 600, 700. In some cases an accessory may send a trigger signal to the arm-end processor 2220. An accessory device may also send a presence/ID signal indicating its presence and identity in the system.

Figure 6B:
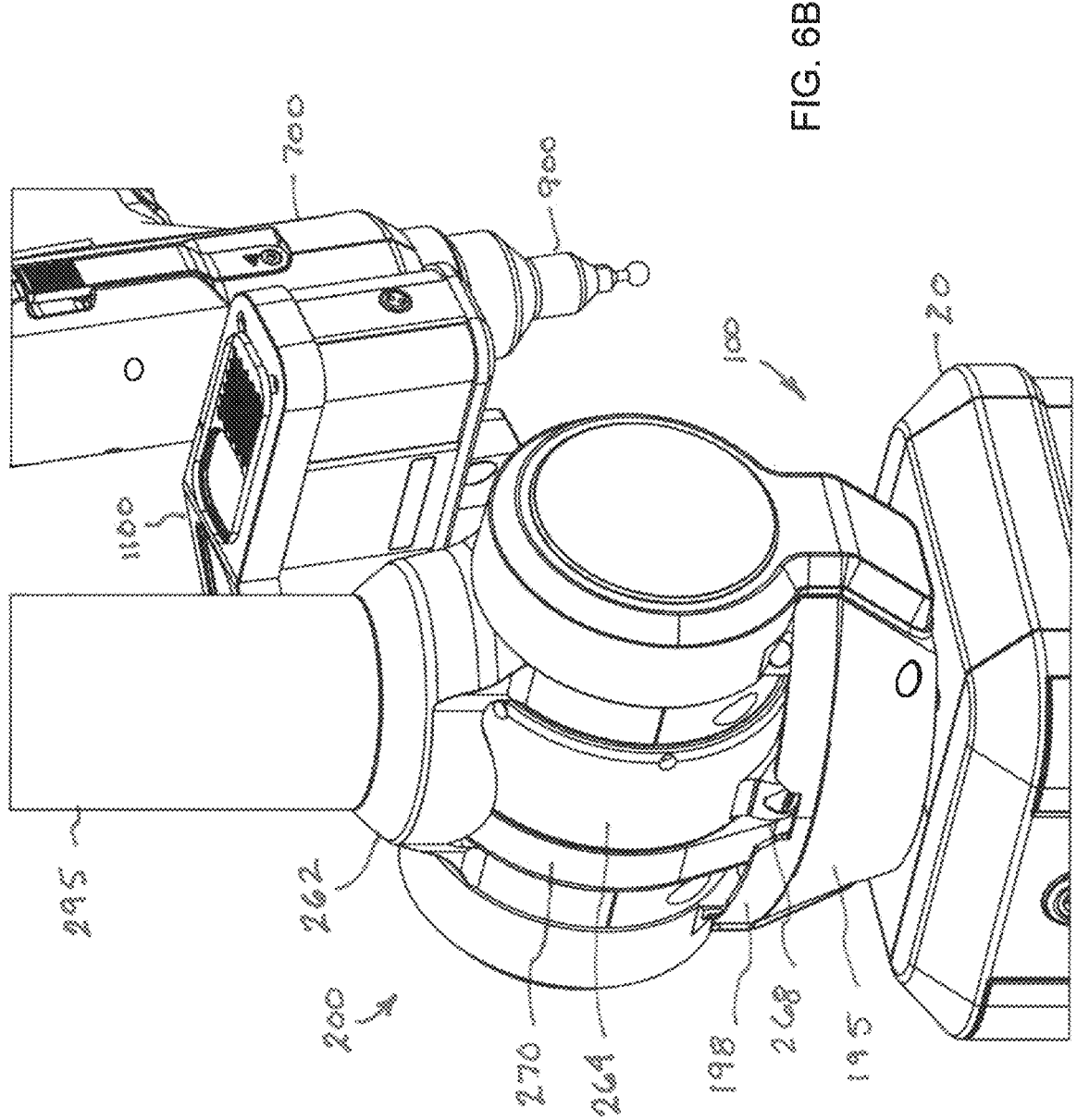
FIG. 6B is an isometric view showing relative positions of some elements of the AACMM when connected arm segments are held in a vertical orientation according to an embodiment.
Figure 6C:
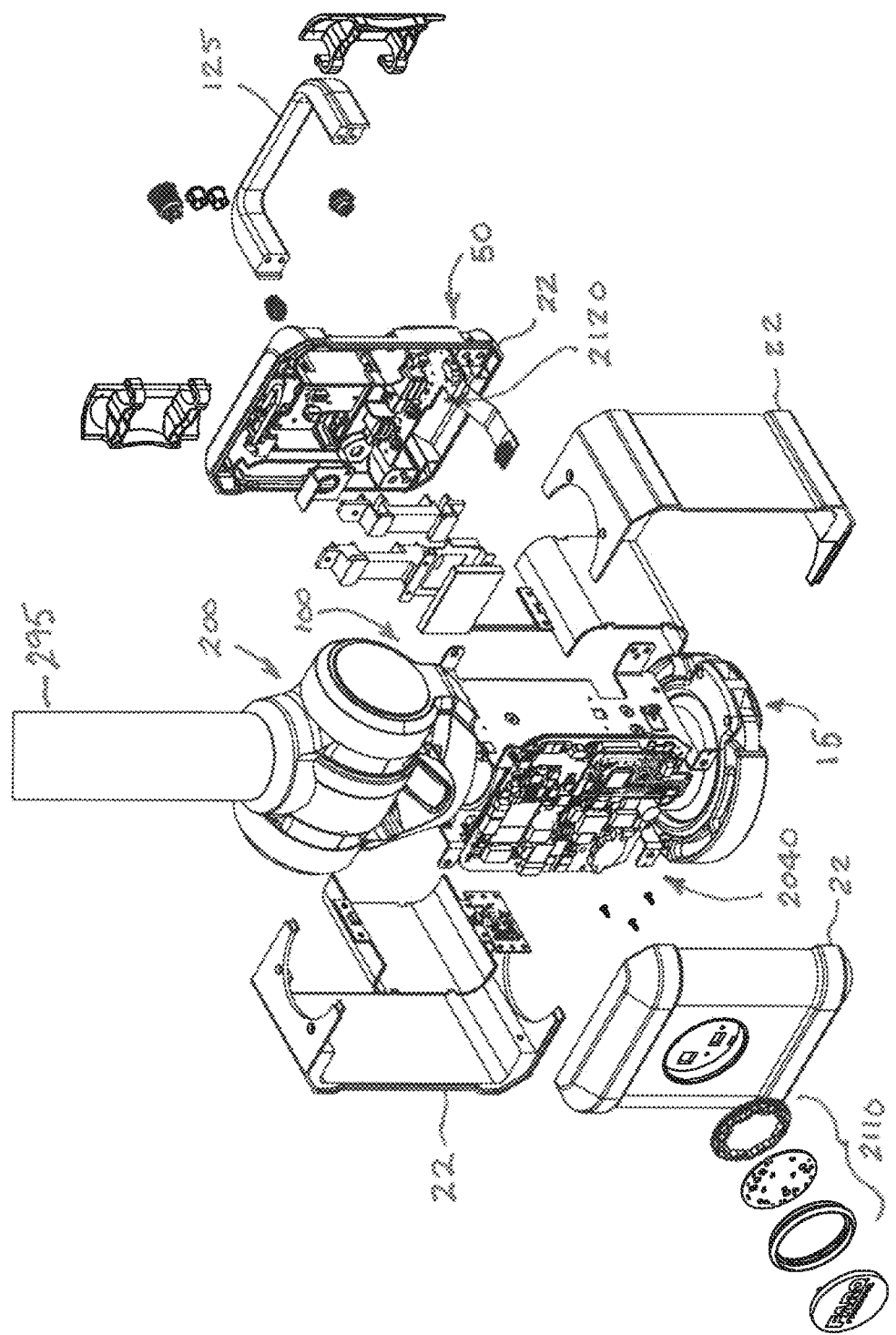
FIG. 6C is a partial unassembled isometric view of the lower portion of the AACMM according to an embodiment.

FIGS. 6A, 6B show some elements of the lower arm. The mounting device 15 provides a way of a attaching the AACMM 10 to a mounting ring. The shock-absorber bumper 110 provides a way to cushion a potential drop of the AACMM 10 when affixing the arm to a mounting ring, as discussed in more detail herein. The base 20 includes elements shown in FIGS. 6A, 6B such as a base cover 22, a control panel 30, a battery access 40, and a port panel 50, as well as mechanical elements shown in later figures, as discussed herein below. The control panel 30 includes the on-off button 32, the Wi-Fi button 34, the Bluetooth™ button 36, the first-battery indicator light 38, and the second-battery indicator light 39. The battery access 40 may include the first battery door 42 and the second battery door 46. The port panel 50 includes an Ethernet jack 52, a USB data-transfer port 54, a USB charging port 55, an auxiliary port 56, and a power supply port 58.

Figure 8D:
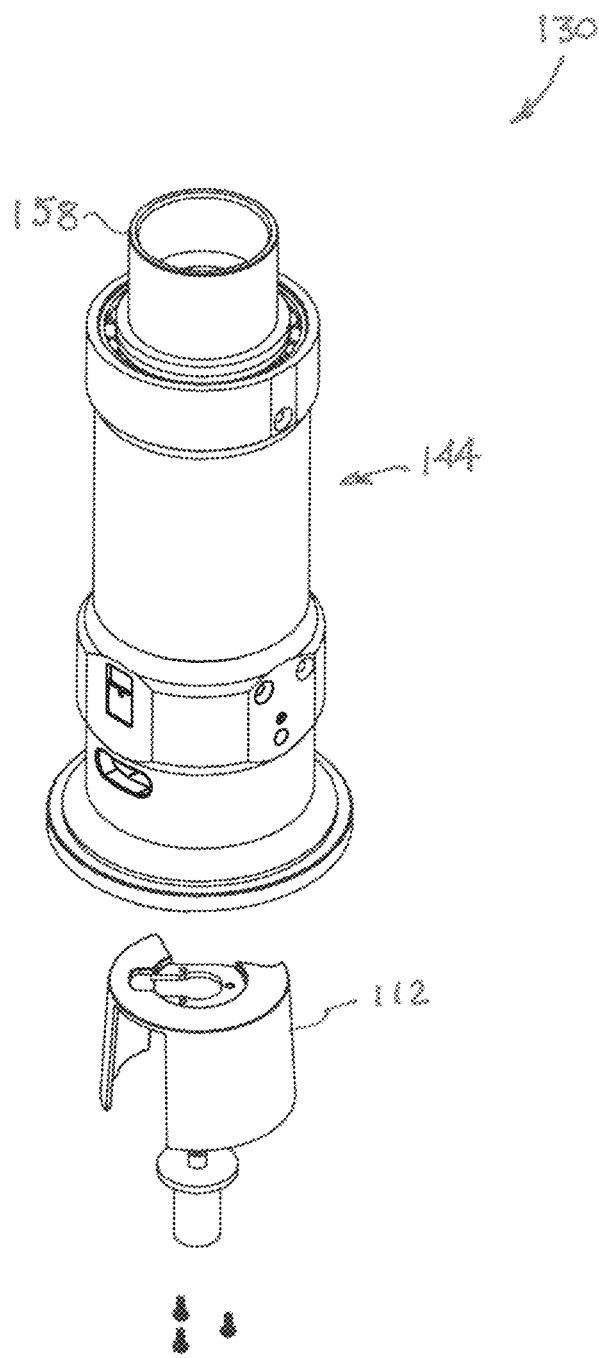

The first-axis assembly 100 is shown in FIGS. 6A, 6B, 6C, 7A, 7B, 7C, 7D. The first-axis assembly 100 includes a first-axis cartridge 130 and a first-axis yoke structure 194. In an embodiment, the handle 125 and the shock-absorber bumper 110 are coupled to the first axis assembly 100. As shown in FIGS. 8A, 8B, 8C, in the first-axis cartridge 130, a first-axis shaft 158 rotates about a first axis 131 relative to a first axis housing 144. As shown in FIGS. 9A, 9B, with continuing reference to FIG. 8C, the first-axis cartridge 130 includes an encoder board with read heads 132, a read-head plate 134, an encoder disk 136, a lower bearing 138, a preload bearing spacer 140, a wave washer 142, a first-axis housing 144, an upper bearing 150, and a first-axis shaft 158. The first-axis housing 144 includes a lower lip 145 against which the wave washer 142 is placed.

In an embodiment, in a first manufacturing step the upper bearing 150 is held in place between a fifth lip 151 of the first-axis shaft 158 and a fourth lip 149 of the first-axis housing 144. The wave washer 142 is benched against the third lip 145 and brought into contact with the preload bearing spacer 140, which is brought into contact with an outer race of the lower bearing 138. In an embodiment, in a second manufacturing step, the first-axis shaft 158 is press fit against the lower bearing 138 until a bottom of the lower bearing lies on a plane of the second lip 143. A press fit, also known as an interference fit or a friction fit, is a fastening between two parts obtained by pressing the parts together under conditions in which there is a slight interference between the parts, resulting in friction that holds the parts tightly in place. The wave washer 142 and preload bearing spacer 140 press downward on the outer race of the lower bearing 138, which in turn presses down on the ball in the lower bearing. In response, the inner race presses upward on the ball in the lower bearing 138. The lower bearing 138 when subjected to such forces is said to be preloaded, a condition that improves the performance of the bearing. Advantages obtained by preloading a bearing include increased bearing rigidity and better consistency in angular movements.

In an embodiment, the spring force from the wave washer 142 further presses or applies a force on the third lip 145 upward (e.g. in a direction towards an end 148), causing the fourth lip 149 to press upward (e.g. in a direction towards the end 148) on an outer race of the upper bearing 150 and, in reaction, causing the fifth lip 151 to press downward (e.g. away from end 148) on the inner race of the upper bearing 150. Hence preload is also applied to the upper bearing 150. In an embodiment, the lower bearing 138 and the upper bearing 150 are deep groove ball bearings. In another embodiment, the lower bearing 138 and the upper bearing 150 are angular contact ball bearings. It should be appreciated that while the illustrated embodiment describes angular contact ball bearings or deep groove ball bearings, this is for example purposes and in other embodiments, other suitable types of bearings are used.

In an embodiment, with the first-axis shaft 158 press fit in place, an adhesive or glue is applied to the glue grooves 159 of the first-axis shaft 158 and the encoder disk 136 is adjusted in place and allowed to cure. Screws 133 attach the encoder board with read heads 132 to the read-head plate 134, which is benched/engaged against the first lip 141 of the first-axis housing 144.

In an embodiment, a brush assembly 152 includes a carbon brush, a brush spring, and a set screw. The brush assembly is inserted through the first-axis housing 144, enabling the carbon brush to electrically ground the upper bearing, which can otherwise generate static electricity during rotation. Hence, use of the brush assembly 152 provides the technical effect of improving electrical reliability.

In an embodiment, the first-axis cartridge 130 may further includes an electrical transfer assembly 170. The electrical transfer assembly 170 includes a first-axis slip ring 171, a slip-ring adapter 190, and cable elements. Cable elements may include bus connectors, first cable wires 180, and a cable jacket. The first-axis slip ring 171 includes a slip-ring housing, a slip-ring flange, slip-ring holes, and slip-ring screws. In an embodiment, the slip-ring adapter 190 screws onto the first-axis shaft 158 in a threaded portion. First-axis slip-ring screws extend through slip-ring holes of the slip-ring flange to attach the first-axis slip ring 171 to the slip-ring adapter 190. The slip-ring flange and the slip-ring housing turn together, but the slip-ring shaft turns independently of the slip-ring housing. Furthermore, first cable wires 180, which enter the slip-ring housing, turn with the slip-ring housing, while the second cable wires 186, which enter the slip-ring shaft, turn with the slip-ring shaft. In an embodiment, electrically contacting brushes keep electrical continuity among first cable wires 180 and second cable wires 186 even as the slip-ring shaft rotates relative to the slip-ring housing. In an embodiment, the slip-ring shaft does not rotate relative to the slip-ring housing until the second cable wires 186 become twisted enough to apply a restoring torque to the slip-ring shaft. In an embodiment, the electrical transfer assembly 170 is similar to that described in commonly owned U.S. patent Ser. No. 10/663,274, the contents of which are incorporated by reference herein.

In an embodiment illustrated in FIGS. 7A, 7B, the first-axis assembly 100 includes the first-axis cartridge 130, the first-axis yoke structure 194, the shock-absorber bumper 110, and screws 126, 128. Optionally, the first-axis assembly 100 may be used in conjunction with the mounting device 15. In an embodiment, the three short base screws 128 attach one side of the shock-absorber bumper 110 to a bottom of the first-axis housing 144, while the three long base screws 126 and corresponding washers 127 attach the shock-absorber bumper 110 to the bottom of the first-axis housing 144. In an embodiment, the mounting device 15 sits loosely on the shock-absorber bumper 110 until it is tightened onto a mounting ring as described further herein.

Figure 7D:
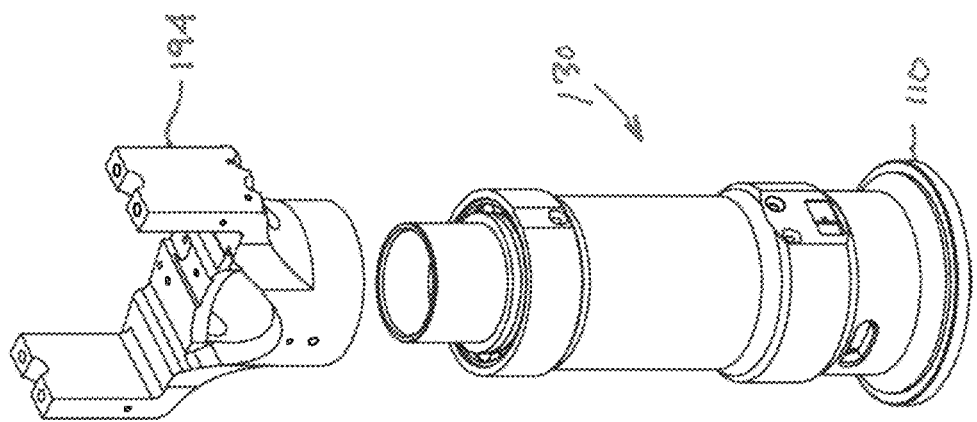
FIGS. 7C, 7D are isometric and unassembled views, respectively, of a first-axis cartridge and a first-axis yoke structure according to an embodiment.
Figure 7C:
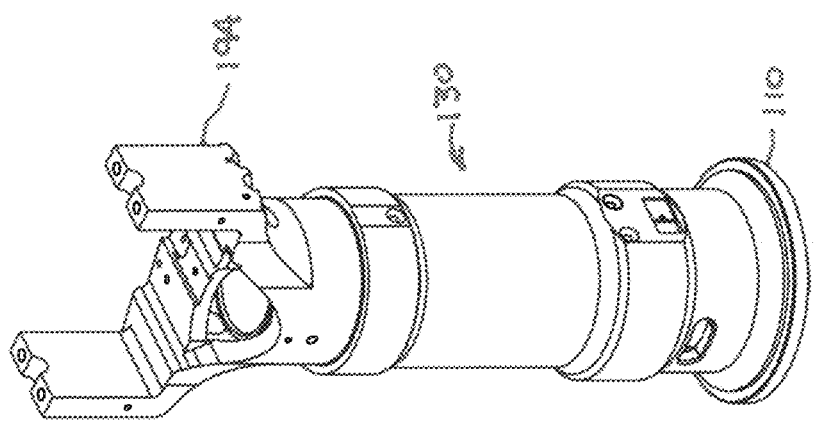
Figure 7E:
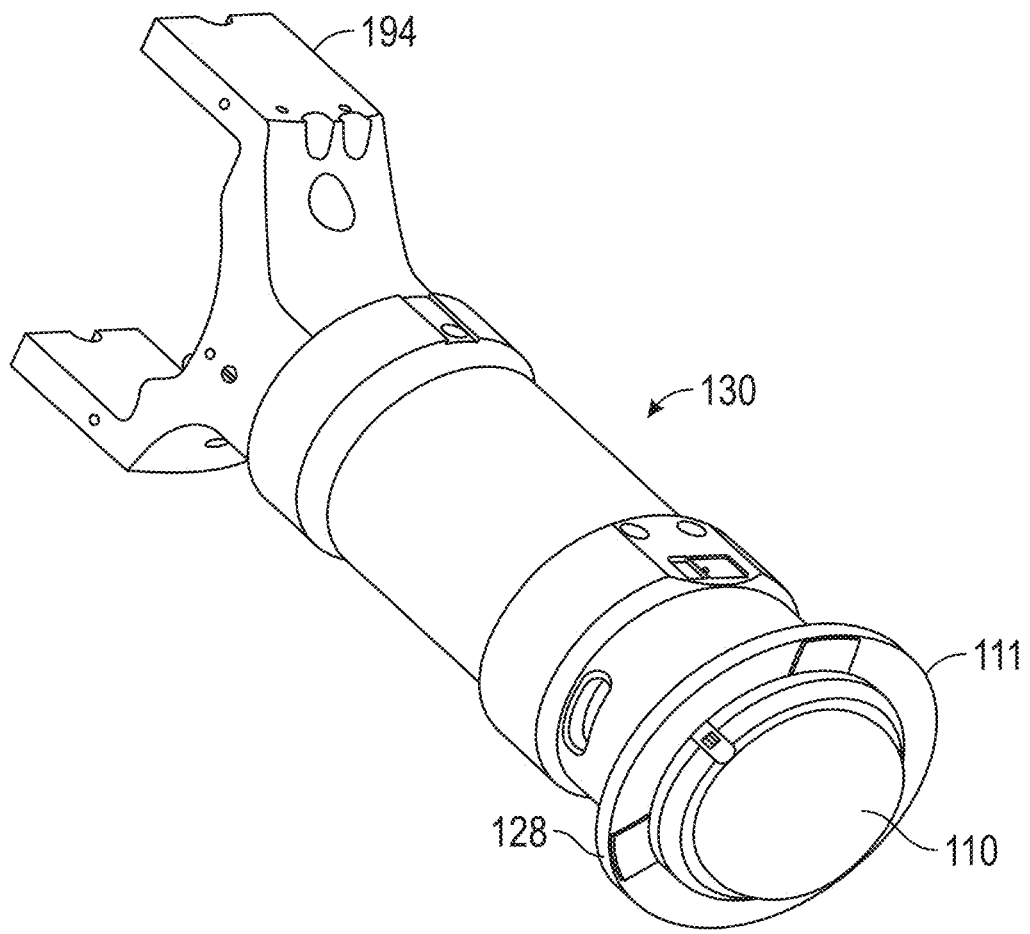
FIG. 7E, is an isometric of a shock-absorber bumper according to an embodiment.

FIGS. 7B, 7E illustrate the shock-absorber bumper 110, which includes lower screws 128, a guiding retainer ring 111, and a bell 112. In some embodiments, this assembly may include, a damper, a preload spacer, a base-nut retainer, a tilt board, and fasteners as was described in the aforementioned U.S. patent Ser. No. 10/663,274. The damper is made of compressible material so that the bell 112 deflects or compresses upward when a force is applied to a bottom of the bell 112. The purpose of the shock-absorber bumper 110 is to reduce mechanical shock to the AACMM 10 that may occur if the AACMM 10 drops when being mounted to a table, stand, or similar structure.

Disposed about the shock absorber bumper 110 is the mounting device 15. The mounting device 15 may be the same as that described in commonly owned U.S. Pat. No. 8,028,432, the contents of which are incorporated by reference herein.

In an embodiment, an externally threaded mounting ring (not shown) is attached to a mounting surface such as an instrument stand, tripod, or table. In an embodiment, internal screw threads of the mounting device 15 engage the external screw threads of the mounting ring. As the screw threads are tightened, a mounting device lip is drawn into firm contact with a base-nut retainer shelf of the mounting device 15. In this way, the AACMM 10 is locked firmly in place. Advantageously, the screw threads on the mounting device may be temporarily loosened to allow the base 20 of the AACMM 10 to be turned to different direction before being retightened.

Initially, when the base 20 of the AACMM 10 is being positioned by the user on the mounting ring, the bottom of the AACMM 10 may not be centered on the mounting ring. As a result, when the AACMM 10 is centered on the ring, the AACMM 10 may drop suddenly, shocking the mechanical elements within the AACMM 10. The shock-absorber bumper 110 reduces or minimizes the risk of damage to the AACMM 10 by catching the mounting surface with the bottom of the bell 112 and slowing the descent of the AACMM 10 as the damper compresses. In other embodiments, the mounting device 15 is attached to threads not included on a mounting ring. In still other embodiments, the AACMM 10 is attached to a mounting without use of the mounting device 15. In this embodiment, the shock-absorber bumper may provide protection against rapid falls of and shocks to the AACMM 10.

A portable articulated arm coordinate measuring machine (AACMM), comprising: a base; a manually positionable arm portion having an opposed first end and second end, the arm portion being rotationally coupled to the base, the arm portion including a plurality of connected arm segments, each arm segment including at least one position transducer for producing a position signal; a measurement device coupled to the first end; an electronic circuit that receives the position signal from the at least one position transducer and provides data corresponding to a position of the measurement device; a shock-absorber assembly coupled to a lower portion of the AACMM, the shock-absorber assembly operable to reduce mechanical shock to the AACMM when the AACMM is brought into contact with a support element; and a processor operable to determine three-dimensional (3D) coordinates of a point measured by the measurement device based at least in part on the provided data corresponding to the position of the measurement device.

In an embodiment, the shock-absorber assembly includes a retractable surface that, when brought into contact with the support element, retracts toward an interior of the shock-absorber assembly through compression of a damper material.

Figure 10:
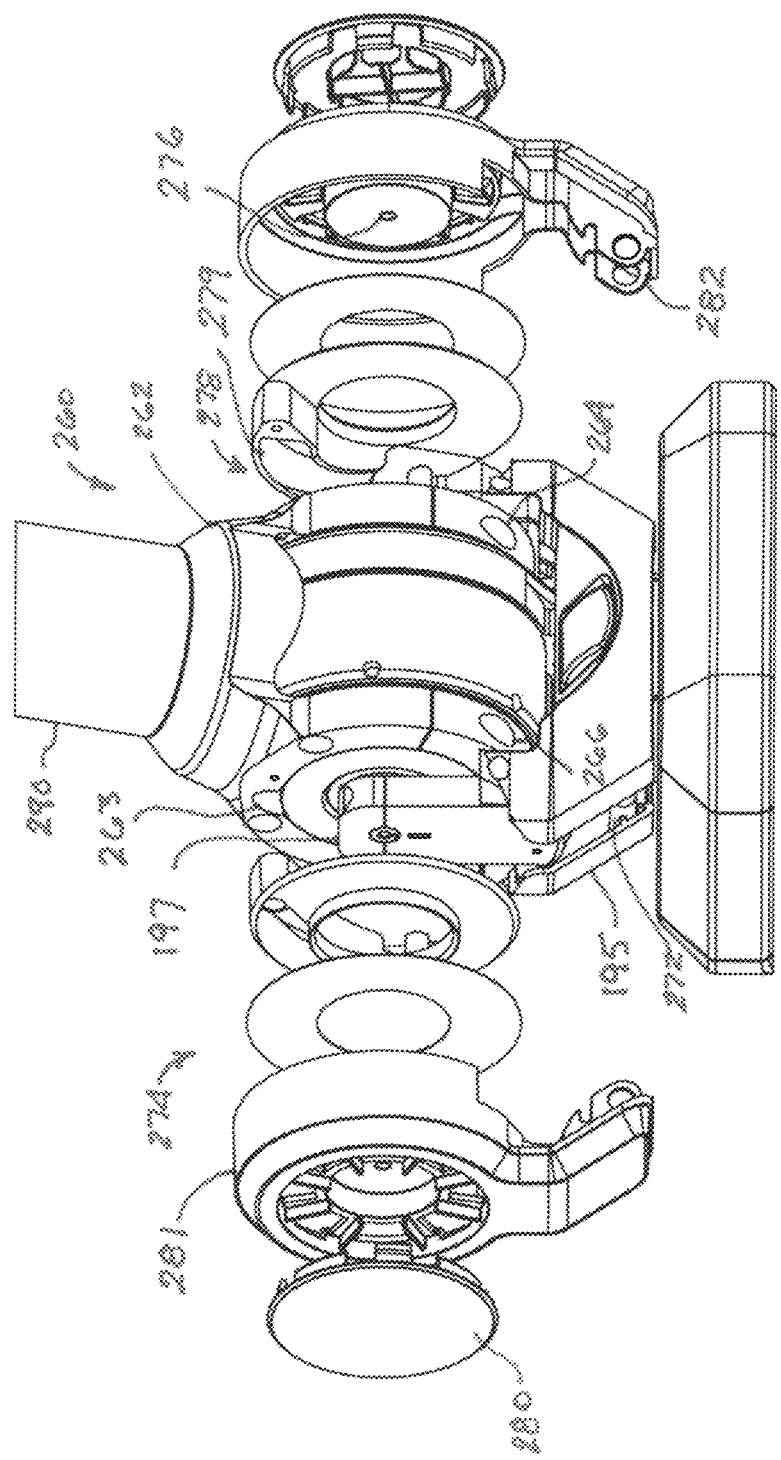
FIG. 10 is an unassembled view of a lower portion of the AACMM according to an embodiment of the present invention.
Figure 11:
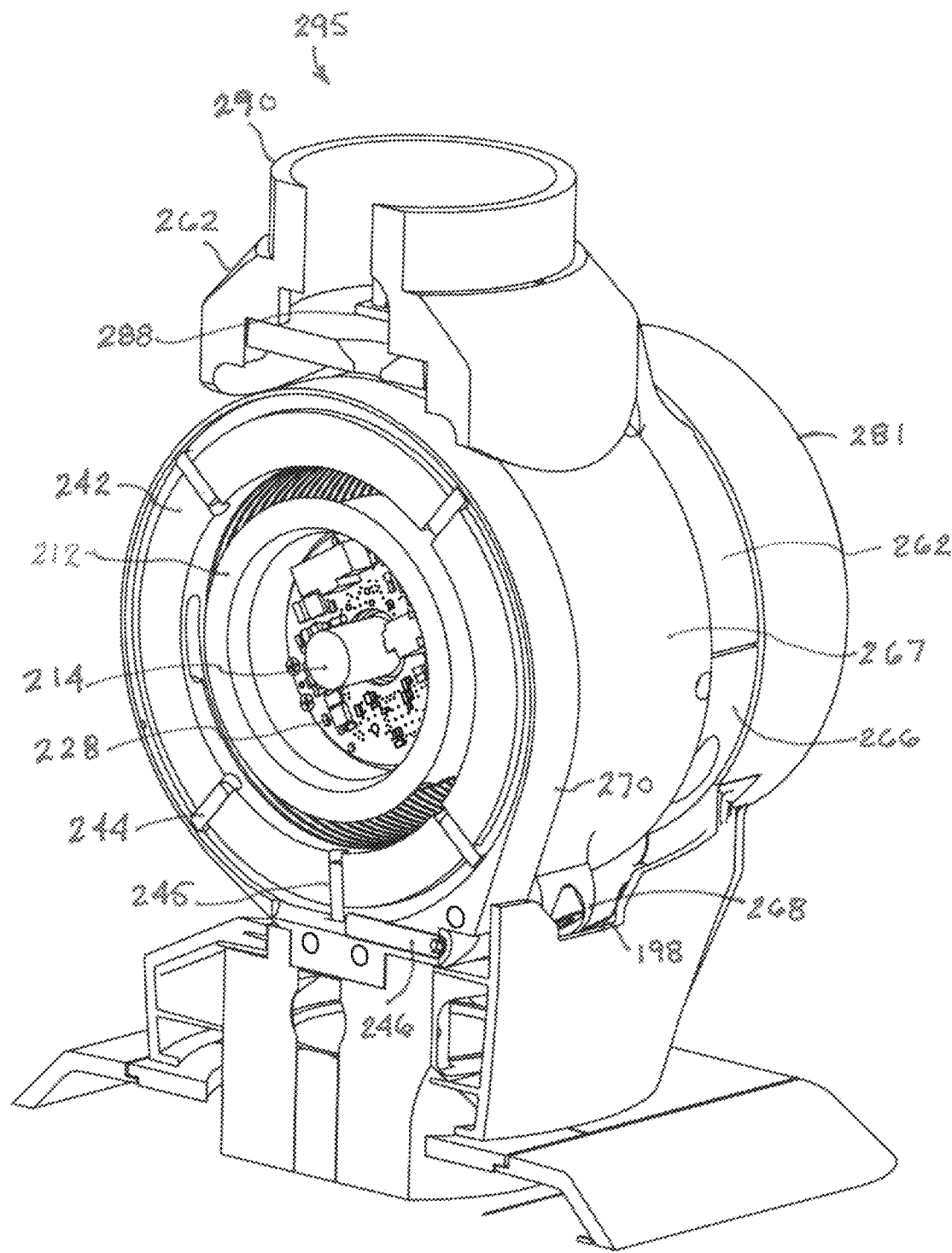
FIG. 11 is a partial isometric view of a second-axis/counterbalance assembly and surrounding components according to an embodiment.
Figure 12:
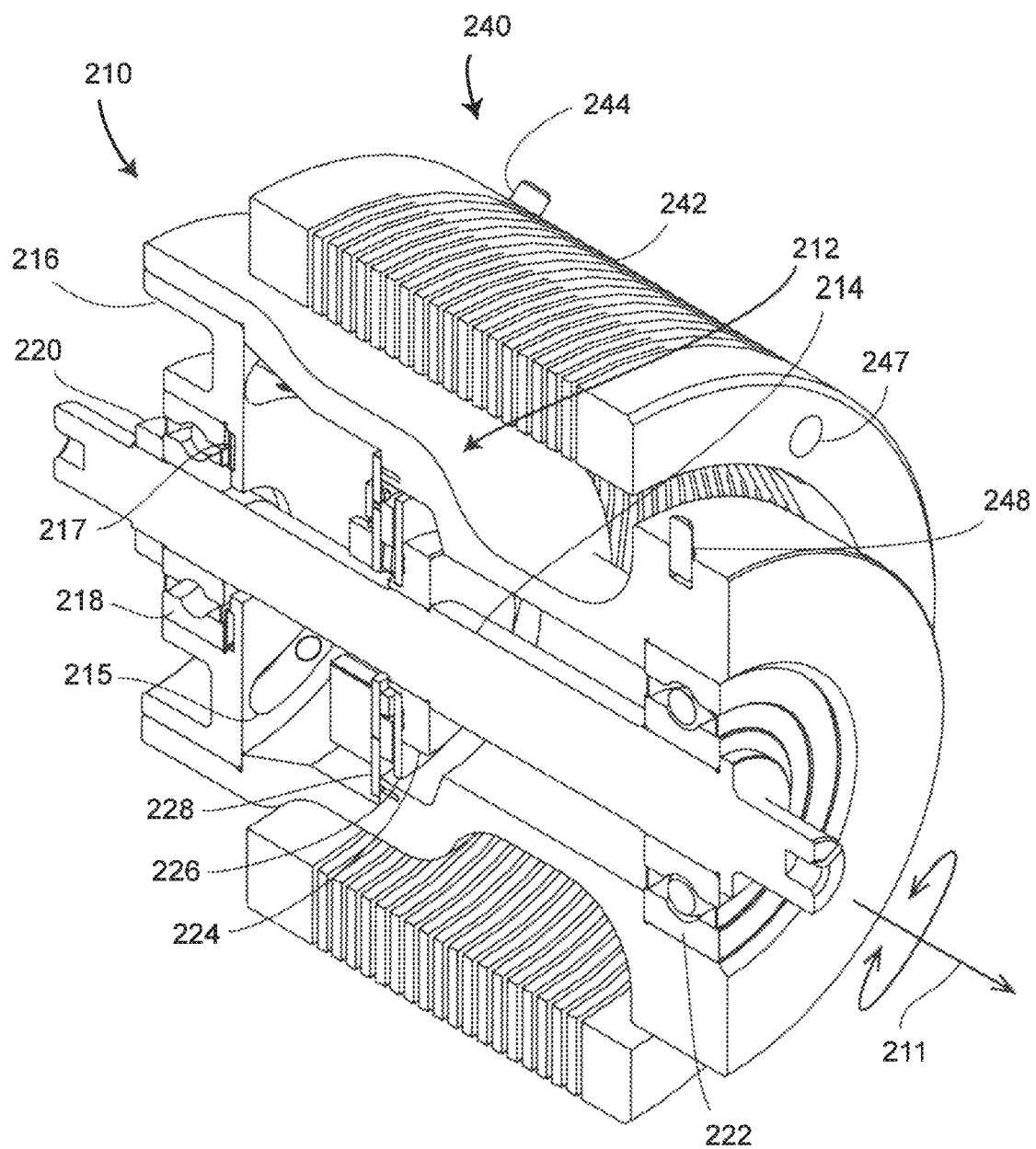
FIG. 12 is a partial section view of a second axis cartridge and counterbalance ring according to an embodiment.
Figure 13:
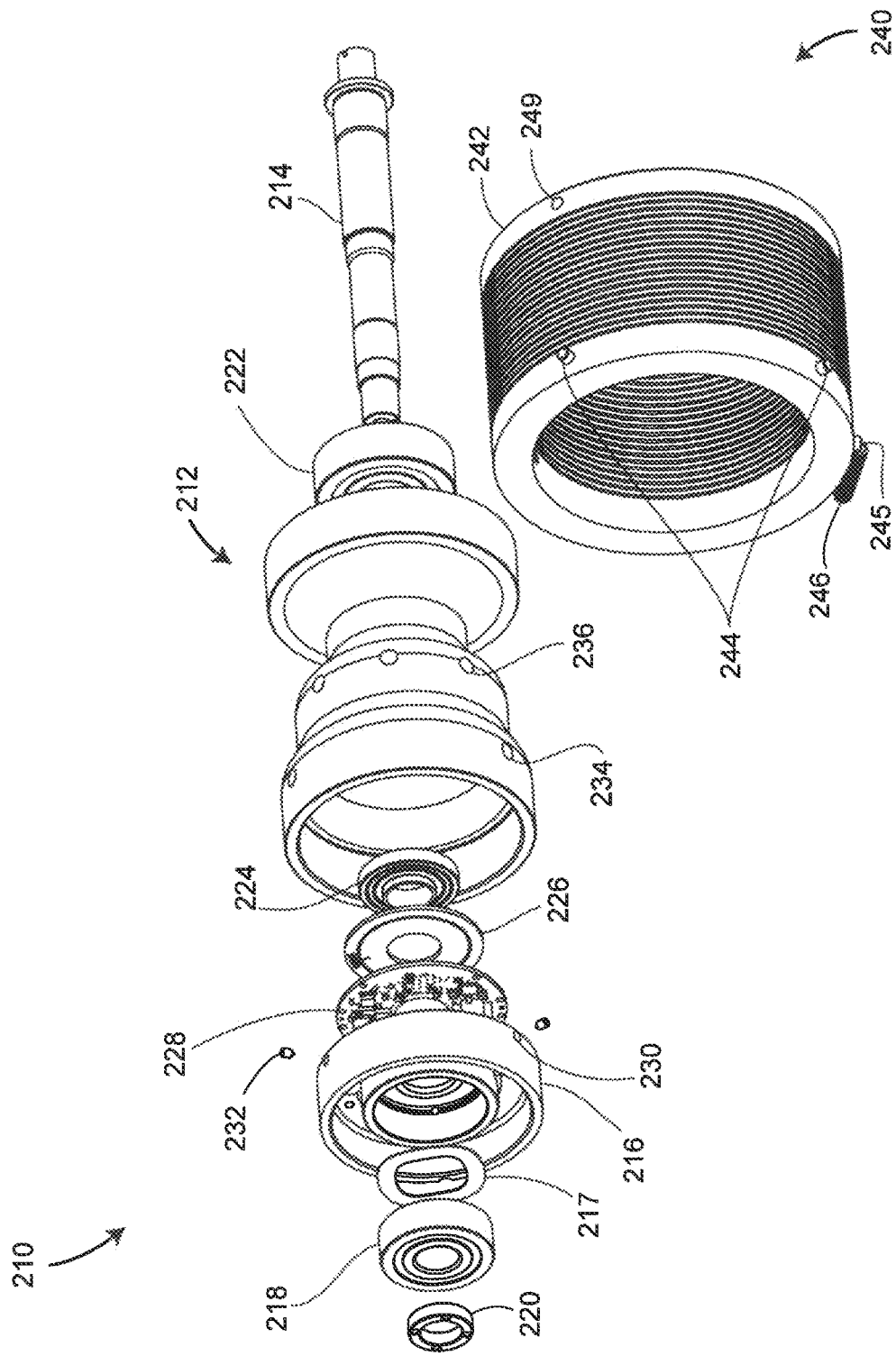
FIG. 13 is an unassembled view of the second-axis cartridge and counterbalance ring according to an embodiment.
Figure 15D:
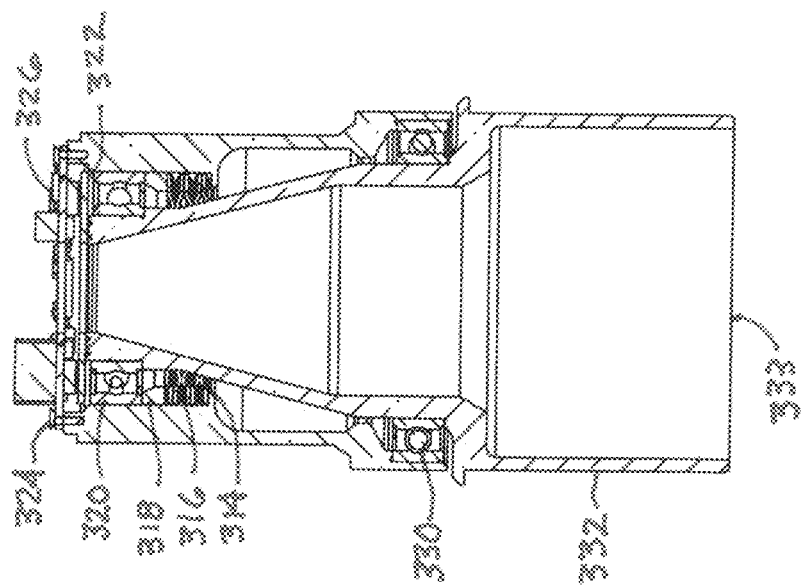
Figure 15C:
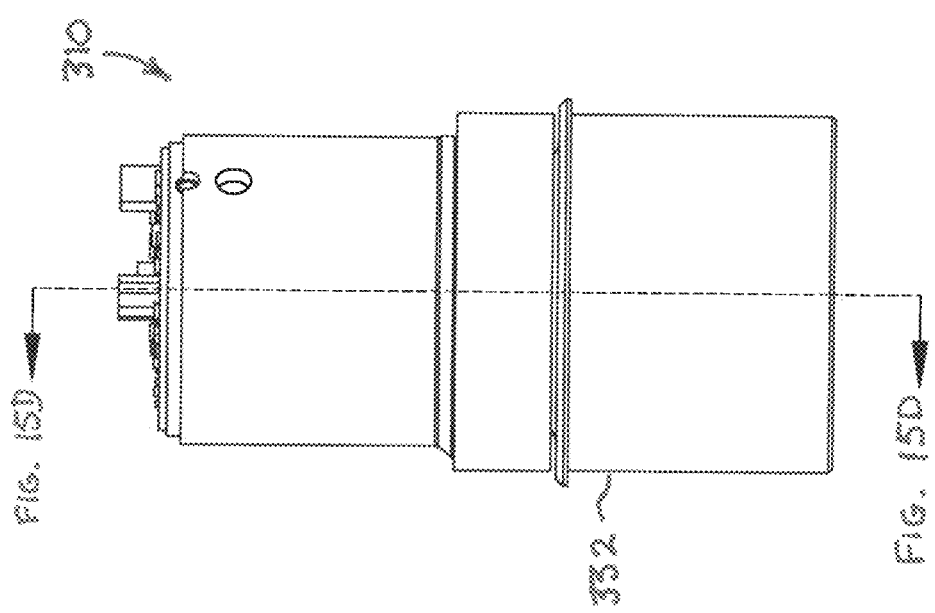

FIGS. 6A, 6B, 10, 11 show some external elements of the second-axis assembly 200, including first-segment yoke 260, second-axis cap 280, cable cover 274, and cable-track 278. The first-segment yoke 260 includes first-segment yoke beam 262, first-segment-yoke right bow 264, and first-segment-yoke left bow 266. FIGS. 12, 13 show some internal elements of the second-axis assembly 200, including the second-axis cartridge 210 and the counterbalance ring 240. In an embodiment, the second-axis assembly 200 provides a hinge-type rotation about a second axis 211. In an embodiment, the second-axis assembly 200 also includes the counterbalance ring 240 that provides a torque that lightens the downward force on arm segments held by an operator, thereby making it easier for an operator to support and maneuver the AACMM 10 in making measurements.

In an embodiment, the second-axis cartridge 210 includes a second-axis shaft 214, a left second-axis bearing 222, a second-axis housing 212, a second-axis disk mount 224, an encoder disk 226, an encoder board with read heads 228, a cartridge inner plate 216, a wave washer 217, a right second-axis bearing 218, and a lock nut 220. In an embodiment, the left second-axis bearing 222 is press fit onto both the second-axis shaft 214 and the second-axis housing 212. In an embodiment, the cartridge inner plate 216 is press fit to the second axis housing, and the inner race of the right second-axis bearing 218 is press fit onto the second-axis shaft 214. The wave washer 217 applies force to the outer race of the right second-axis bearing 218 but not to the inner race. The inner race of the right second-axis bearing is held in place with the lock nut 220. In an embodiment, the force applied by the wave washer 217 pushes the outer race of the right second-axis bearing 218 against a ball in the bearing 218, with a corresponding and oppositely directed force between applied to the ball by the inner race. The distance between the inner race of the bearing 218 and the inner race of the bearing 222 is set so that upon tightening the lock nut 220 into position, the inner race of bearing 222 pulls inward on the shaft, with an oppositely directed force applied to the ball by the outer race. The result of the application of these forces is a preloading similar to preloading of the bearings in the first-axis cartridge 130. Bearing lock set screws 232 are passed through outer access holes 234 and inner access holes 230, where the inner access holes 230 penetrate both cylindrical portions of the cartridge inner plate 216, enabling the bearing lock set screws 232 to hold rigidly fix the position of the outer race of the right second-axis bearing 218. Although the wave washer 217 applies a force to the outer race that establishes preload of the bearings in the second-axis cartridge 210, the wave washer 217 may be subject to vibration when the AACMM 10 is in use. Hence the bearing lock set screws provides an additional stable locking into position of the outer race of the right second-axis bearing 218. In an embodiment, an adhesive such as epoxy is further applied to the outer race to hold it in place.

In an embodiment, the second-axis disk mount 224 is press fit onto the second-axis shaft 214. The encoder disk 226 is bonded/glued and centered on the second axis 211 and allowed to cure. The encoder board with read heads 228 is centered on the encoder disk and affixed to the second-axis housing 212. In an embodiment, disk centering holes 236 in the second-axis housing 212 are used to assist in centering the encoder disk on the rotating shaft 214. A tool inserted through the disk centering holes 236 is used to move or nudge the encoder disk 226 in a direction to center it on the shaft. In an embodiment, the centering procedure is performed while slowly rotating the second-axis shaft 214 on a rotation fixture used in a manufacturing process. As the encoder disk 226 is slowly rotated, electrical signals generated by the rotation fixture indicate a direction in which the encoder disk 226 should be moved or nudged to center the encoder disk 226 on the second-axis shaft 214.

A wire-routing slot 215 (FIG. 12) is cut into the cartridge inner plate 216 to pass the busses 2182, 2184 through the second-axis cartridge 210. An anti-rotation pin 248 that is pressed into the second-axis housing 212 mates with first-segment yoke beam 262 shown in FIGS. 10, 11. The first-segment-yoke beam 262 attaches to the first-segment tube 290 of the first segment 295 as further shown in FIGS. 11, 14A, 14B, 14C, 14D, 14E. Hence the second-axis housing 212 rotates together with the first segment 295. The first-segment-yoke beam 262 further attaches to first-segment-yoke right bow 264 and first-segment-yoke left bow 266 as shown in FIG. 10. In an embodiment, a temperature sensor 288 is included adjacent to the first-segment yoke beam 262.

As shown in FIG. 12 and FIG. 13, the counterbalance ring 240 includes a torsion spring 242, spring retaining pins 244, threaded holes 247 to accept yoke locking screws, an anti-rotation threaded hole 249 to accept an anti-rotation set screw 249, and a tensioning set screw 246. Threaded holes 247 in the counterbalance ring 240 attach with yoke locking screws to holes 265 in first-segment yoke beam 262 shown in FIG. 14D. Likewise, the anti-rotation threaded hole 249 receives an anti-rotation set screw 269 to fix one side of the torsion spring 242 to a counterbalance ring cylinder 267 as shown in FIG. 11. Hence, the side of the torsion spring that includes the threaded hole 247 and the anti-rotation threaded hole 249 turns along with the first segment yoke beam and the first segment 295.

In contrast, the other side of the torsion spring is fixed to a spring tension plate 270 attached rigidly to the base 20, as shown in FIG. 11. A tensioning set screw 246 in FIGS. 11, 13 is brought into contact with a spring tension pin 245. A counterbalance ring bump 268 (FIG. 6A) makes contact with a first-axis yoke bumper 198 when the first segment 295 is rotated as far as possible about the second axis 211 (FIG. 12) in one direction. At this position, the amount of force exerted by one side of the torsion spring 242 relative to the other side is determined by an adjustment of the tensioning set screw 246. As the first segment 295 is rotated to bring the counterbalance ring bump 268 farther from the first-axis yoke bumper 198, the amount of force exerted by the torsion spring 242 increases. The effect of the increase in the force as the first segment 295 is moved away from a vertical orientation is to apply an increasing force to the first segment 295, with the force directed opposite the direction of gravity. In this way, the arm segments are made to feel lighter and easier to handle to the user. Spring retaining pins 244 shown in FIGS. 11, 13 keep the torsion spring 242 centered within the spring tension plate 270.

As illustrated in FIG. 10 and FIG. 11, the second-axis shaft 214 is clamped between upper prongs of the first-axis yoke structure 194 and first-axis-yoke caps 197. Hence the second-axis shaft 214 is fixed in relation to the base 20. A first-axis yoke cover 195 is placed over a lower portion of the yoke structure 194 and may be locked into place with screws applied to first-axis-yoke-cover screw holes (not shown). Placed about each side of the first-axis yoke structure 194 (FIG. 7B) are a cable-track 278, a cable cover 274, and a second-axis cap 280. The second-axis cap 280 includes a cap body 281 and a cap snap connector 282, the cap snap connector 282 attaching to a cap snap receptacle 272 of the first-axis yoke cover 195. In an embodiment, the assembly includes two opposing second-axis caps 280, each having a cap snap connector 282 that couples with a respective cap snap receptacle 272. Wires routed from the base 20 pass through an opening in the cap snap receptacle 272. The wires are channeled by a cable-track plate 280 and through a cable-track window of the cable track 279. The wires pass through a first-segment-yoke cable hole 263 (FIG. 14D). The wires that pass through the first-segment-yoke cable hole may pass directly into the first-segment tube 290 or through the wire-routing slot 215 (FIG. 12) to the encoder board connector 2174 (FIG. 3) before passing back through the wire-routing slot 215 into the first-segment tube, as shown in FIGS. 10, 14E. In an embodiment, wires of the first bus 2182 (FIG. 4A) pass through the first-segment yoke-cable hole 263 on one side of the first-segment-yoke beam 262 while the wires of the second bus 2184 pass through the first-segment yoke-cable hole 263 on the other side. In an embodiment, the cable-track 278 and the cable cover 274 are attached to the second-axis shaft 214 with a screw that passes through a cable-cover screw hole 276. In an embodiment, each second-axis cap 280 is snapped onto a corresponding cable cover 274.

FIGS. 14A, 14B, 14C, 14D, 14E illustrate the first-segment-yoke beam 262, the first segment 295, the third-axis assembly 300, and the fourth-axis assembly 400. The section view of FIG. 14E shows that the first-segment-yoke beam 262 attaches inside the first-segment tube 290. FIG. 14B shows a conductive grounding ring 292 that provides grounding between the first-segment-yoke beam 262 and the first segment tube 290, thereby improving electrical reliability and performance of the AACMM 10. Likewise, a conductive grounding ring 308 provides grounding between the cartridge adapter 302 and the first-segment tube 290. In an embodiment, the first-segment tube 290 is made of a carbon-fiber composite material.

The wires of the first bus 2182 and the second bus 2184 (FIG. 4A) are routed through the first-segment-yoke cable hole 263 as described herein above. The bus wires 2182, 2184 continue as cables 342 to pass through the third/fifth-axis slip ring, which is a part of the third/fifth cartridge 310. The term third/fifth-axis slip ring indicates that the same slip-ring assembly is used in both the third-axis assembly 300 and in the fifth-axis assembly 500 (FIG. 1). The term third/fifth cartridge indicates that the same cartridge assembly 310 is used in both the third-axis assembly 300 and the fifth-axis assembly 500. The cartridge adapter 302 is a common component of the third-axis assembly 300 and the fourth-axis assembly 400 since these axis assemblies house the third/fifth-axis cartridge 310 and the fourth/sixth-axis cartridge 410, respectively. The third-axis assembly 300 provides rotation of the cartridge adapter 302 about a third axis 311 shown in FIG. 14D. The fourth-axis assembly 400 provides rotation of fourth/sixth-axis shaft 418 about a fourth axis 411 shown in FIG. 14C.

The third/fifth-axis cartridge 310 illustrated in FIGS. 14E, 15A, 15B, 15C, 15D includes an encoder board with read heads 326, an encoder disk 322, an upper bearing 320, a preload bearing spacer 318, a wave washer 316, a third/fifth-axis housing 312, a lower bearing 330, a third/fifth-axis shaft 332, and the third/fifth-axis slip ring 340 with cables 342. The third/fifth-axis shaft 332 rotates relative to the third/fifth-axis housing 312.

In an embodiment, the third/fifth-axis shaft 332 is press fit against an inner race of the upper bearing 320. The wave washer 316 is placed against a housing upper ledge 314. The preload bearing spacer 318 sits between the wave washer 316 and an outer race of the upper bearing 320. The spring action of the wave washer 316 acts to push the outer race of the upper bearing 320 against a ball in the upper bearing 320. In reaction, the inner race of the upper bearing 320 pushes oppositely against the ball in the upper bearing 320. The wave washer 316 also pushes downward (e.g. in the direction of end 333) on the housing lower ledge 314, thereby pushing the outer race of the lower bearing 330 against the ball in the lower bearing 330. In response, the inner bearing presses oppositely against a ball in the lower bearing 330. In this way, a preload is applied to the bearings 320, 330 in the third/fifth axis cartridge 310. In an embodiment, the encoder disk 322 is glued to the third/fifth-axis shaft 332, centered on the shaft 332, and cured in place. The encoder board with read heads 326 is pinned in place with the pin 324.

The fourth/sixth-axis cartridge 410 illustrated in FIGS. 16A, 16B, 16C, 16D includes a fourth/sixth-axis bearing 416 located on the encoder side, a fourth/sixth-axis housing 412, a fourth/sixth-axis shaft 418, an encoder disk 422, an encoder board with read heads 426, a drum flexure 428, a wave washer 430, a preload bearing spacer 432, a fourth/sixth-axis bearing 434 located on the spring side, and a protective cover 436. The fourth/sixth-axis shaft 418 rotates relative to the fourth/sixth-axis housing 412. In an embodiment, the fourth/sixth-axis cartridge 410 does not include a slip ring but rather provides routing for the wires through as described herein below with respect to FIGS. 16E, 16F, 16G, 16H. In an embodiment a slip ring is not used on those second-axis assembly 200, the third-axis assembly 400, or the sixth-axis assembly 600 because the total amount of rotation is limited by the hinge movement of these assemblies.

In an embodiment, with the wave washer 430 and the preload bearing spacer 432 are held in place by the drum flexure 428, the inner race of the fourth/sixth-axis bearing 434 is press fit to the fourth/sixth-axis shaft 418, while the inner race of the fourth/sixth-axis bearing 416 is press fit against the shaft 418 and benched against the shaft first ledge 417. The force applied by the wave washer 430 and preload bearing spacer 432 pushes the outer race of the bearing 434 against a ball in the bearing 434, and a counter force presses the inner race of the bearing 434 in an opposing direction against the ball in the bearing 434. At the same time, the forces on the bearing 434 pull the outer race of the bearing 416 against a housing first ledge 414. This combination of actions provides preloads for the bearings 416, 434. In an embodiment, the encoder disk 422 is glued to the housing second ledge 420, after which it is centered on the fourth/sixth-axis shaft 418 and cured in place. In an embodiment, the encoder board with read heads 426 is attached to the fourth/sixth-axis housing 412 at first ledge 424. In an embodiment, centering of the encoder disk 422 about the fourth/sixth-axis shaft 418 is facility by moving or nudging the encoder disk with a tool placed through one or more encoder-adjustment holes 423 in the fourth/sixth-axis housing 412.

Figure 16C:
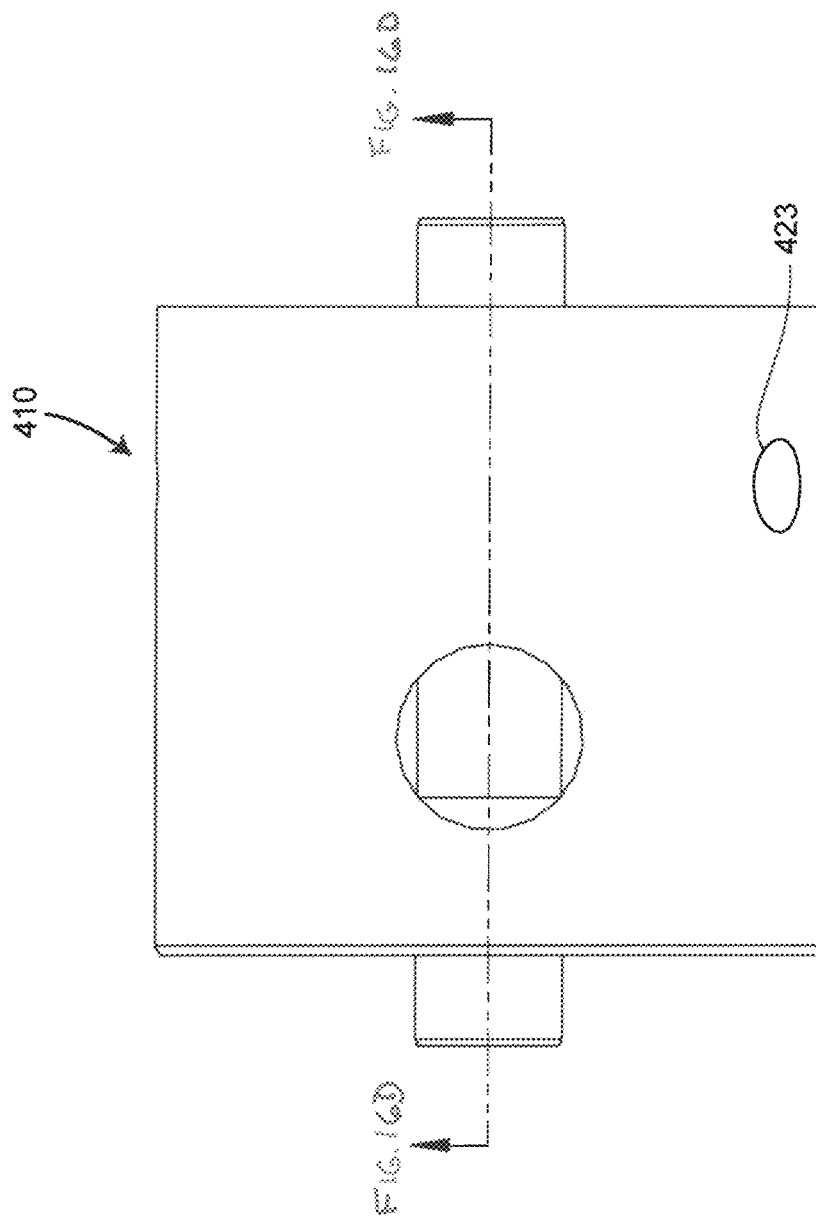
Figure 16D:
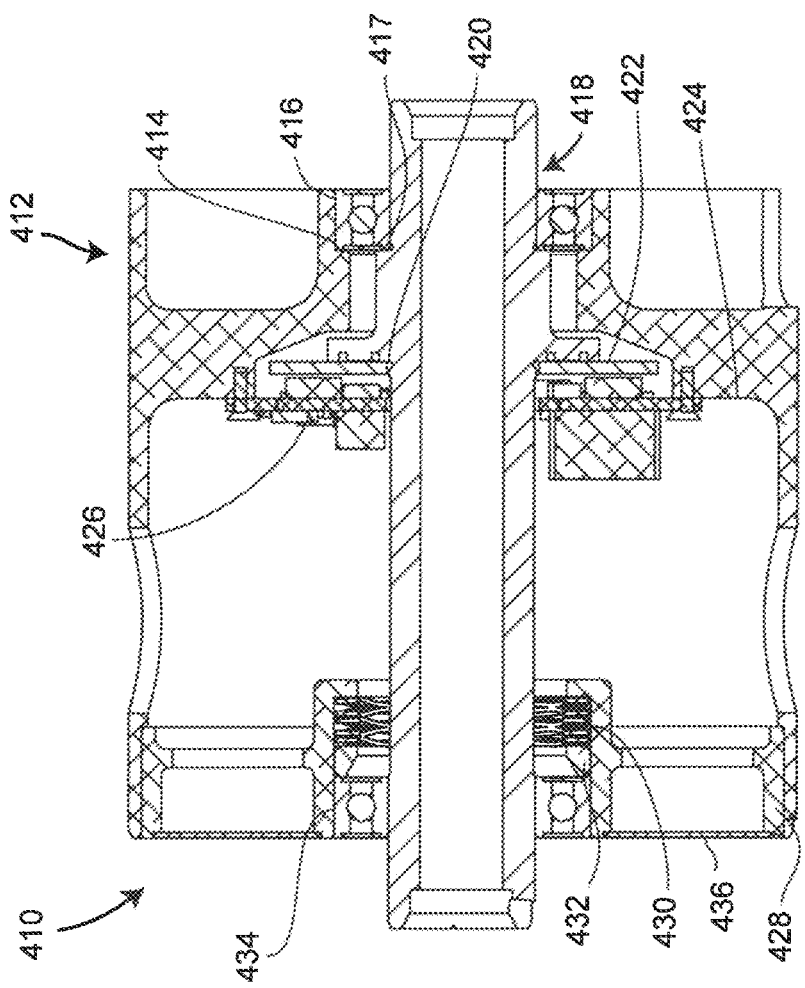
Figure 16H:
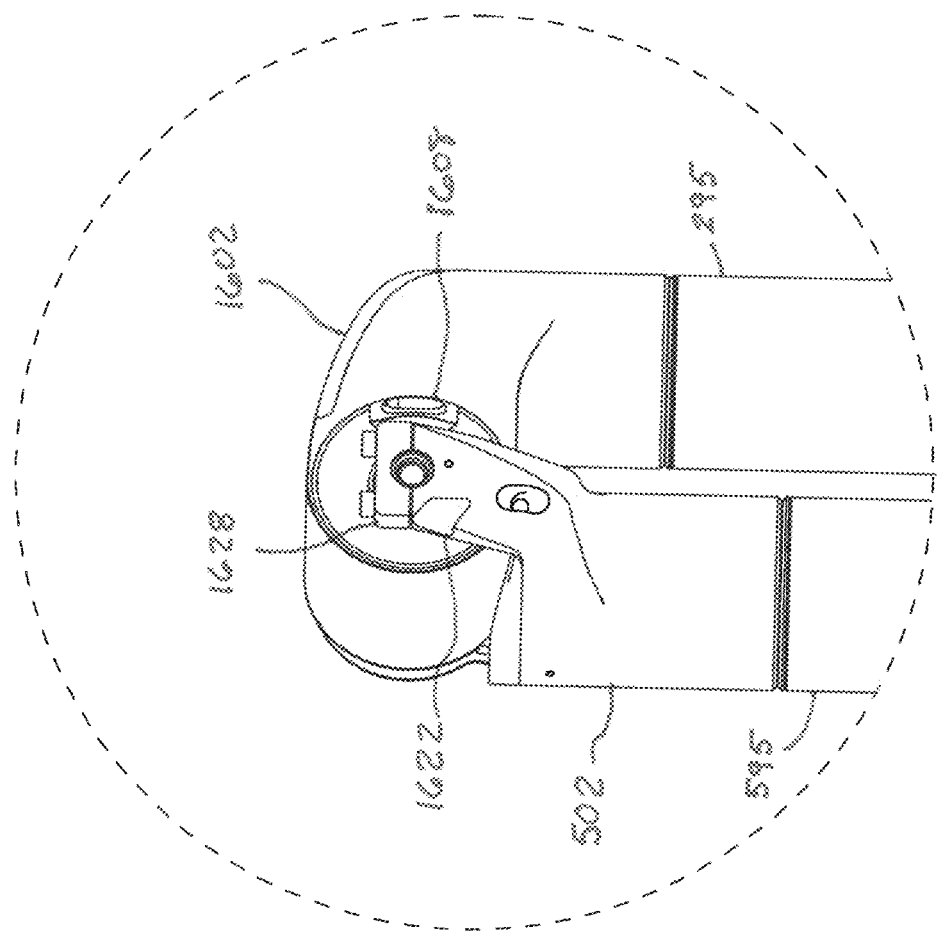
Figure 16G:
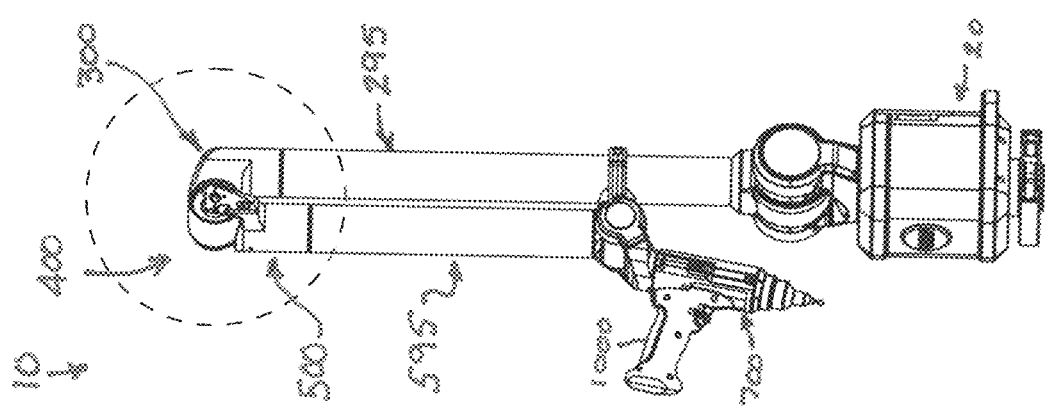

FIGS. 16E, 16F show the AACMM 10 including the first segment 295, second segment 595, and cartridge adapter 302. The cartridge adapter 302 includes a top-bumper opening 1616 that accommodates a top bumper 1602 as shown in FIGS. 16G, 16H. The encoder board with read heads 326 (FIG. 15B) is visible through the top-bumper opening 1616. An encoder connector 1612 and a temperature-sensor connector 1614 are attached to the encoder board 326. A cable (not shown) attaches the temperature-sensor assembly 350 and temperature sensor connector 1610 to the temperature sensor connector 1614. The temperature-sensor assembly 350 shown in FIG. 14B includes a temperature sensor 352, thermal putty 354, and screw 356. Readings from the temperature sensor are sent through the encoder board 326 (FIG. 15B) to the encoder connector 1612 where they are transferred to the first bus 2154 (FIG. 3). The cables 342 (FIG. 14B), which include the first bus 2154 and the second bus 2156, pass from the third/fifth-axis slip ring through a hole in the encoder board 326. The cable wires in the first bus 2154 attach to the encoder connector 1612, which in an embodiment is a T-connector, and continue on through the encoder-access hole 1606. The first housing hole 413 in the fourth/sixth-axis housing of FIG. 16B is aligned with the encoder-access hole 1606, thereby enabling the cable wires in the first bus 2154 to pass through the holes 1606 and 413 before attaching to a connector on the encoder board with read heads 426. The wires of the first bus 2154 pass back through the encoder-access hole 1606. The wires of the first bus 2154 and the second bus 2156 travel through the exit hole 1608, as may be seen from a different perspective in FIG. 16H.

FIGS. 16G, 16H show that the fifth-axis yoke/receptacle 502 and the first-axis-yoke cap 1628 clamp to the fourth/sixth-axis shaft 418 (FIG. 16B). Cable wires passing through the exit hole 1608 make one-and-a-half-turn cable loop 1618 traveling through a loop hole 1622 to enter the fifth-axis assembly 500. Side bumpers 1604 (FIG. 16F) are placed over some elements as shown in FIG. 16H.

Figure 17C:
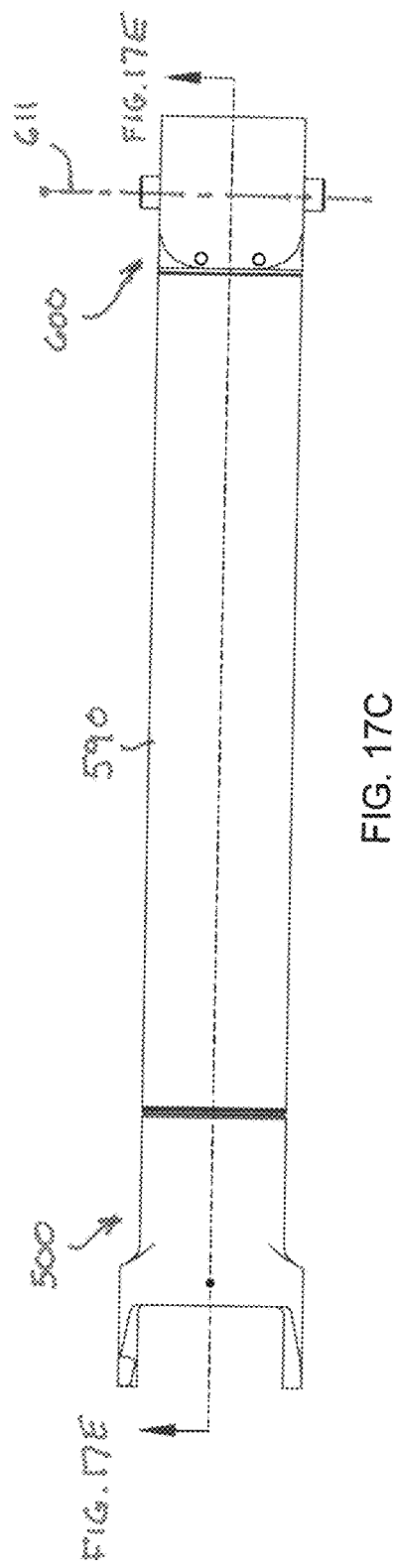
Figure 17D:
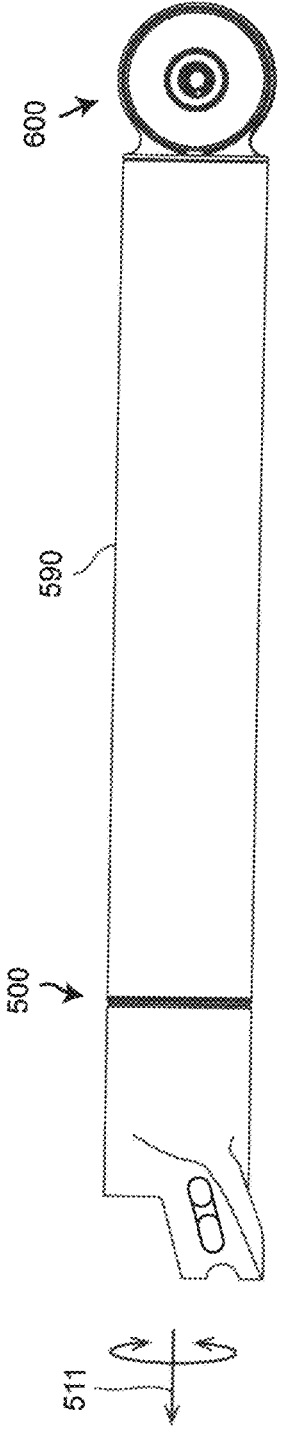
Figure 17E:
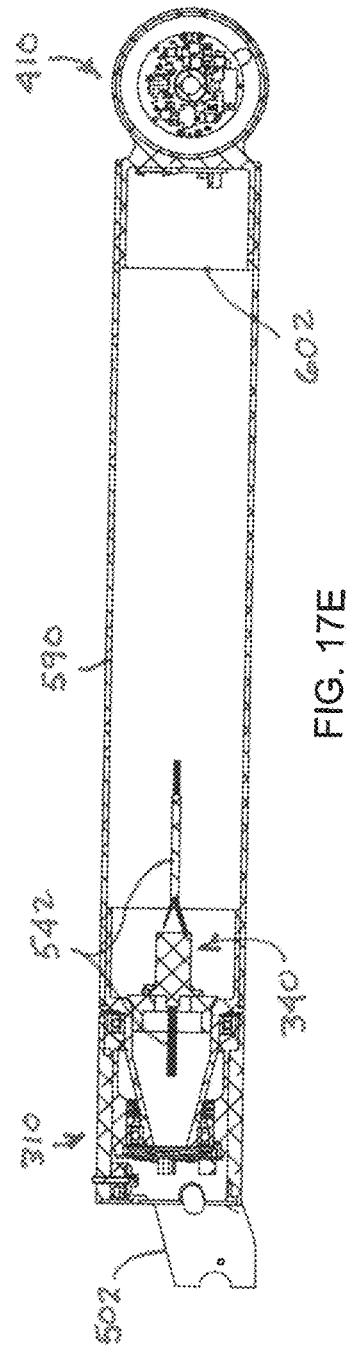

FIGS. 17A, 17B, 17C, 17D, 17E illustrate the fifth-axis assembly 500, the second segment 595, and the sixth-axis assembly 600. The fifth-axis assembly 500 includes a temperature-sensor assembly 550, a fifth-axis yoke/receptacle 502, a third/fifth-axis cartridge 310, and a conductive grounding ring 508. The second segment 595 includes a second-segment tube 590. The sixth-axis assembly includes a temperature-sensor assembly 650, a fourth/sixth-axis cartridge receptacle 606, and a cartridge adapter 602. As shown in FIGS. 17B, 17E, the third/fifth-axis cartridge 310 attaches to the inner portion of the second-segment tube 590, which in an embodiment is hollow. In an embodiment, another part of the third/fifth-axis cartridge 310 fits in the fifth-axis yoke/receptacle 502. In an embodiment, the temperature-sensor assembly 550 includes a temperature sensor 552, thermal putty 554, and a metal contact 556 that holds the temperature sensor 552 in place. In an embodiment, the third/fifth-axis cartridge 310 includes the elements described in FIGS. 15A, 15B, 15C, 15D, including the third/fifth-axis slip ring 340 and corresponding cables 542. The conductive grounding ring 508 provides electrical continuity between the cartridge 310 and the second-segment tube 590, which in an embodiment is made of carbon-fiber composite.

As shown in FIGS. 17B, 17E, the fourth/sixth-axis cartridge 410 fits inside the sixth-axis cartridge receptacle 606, which in turn attaches to the inside of the second-segment tube 590. In an embodiment, the temperature-sensor assembly 650 includes a temperature sensor 652 and thermal putty 654. In an embodiment, the fourth/sixth-axis cartridge 410 includes the elements described in FIGS. 16A, 16B, 16C, 16D. The conductive grounding ring 592 provides electrical continuity between the cartridge 310 and the second-segment tube 590. In an embodiment illustrated in FIG. 17D, the fifth-axis assembly 500 provides for swivel rotation about a fifth-axis 511. As illustrated in FIG. 17C, the sixth-axis assembly 600 provides for a hinge rotation of the fourth/sixth-axis shaft 418 (FIG. 16B) in the sixth-axis assembly 600 about the sixth-axis 611.

Figure 18A:
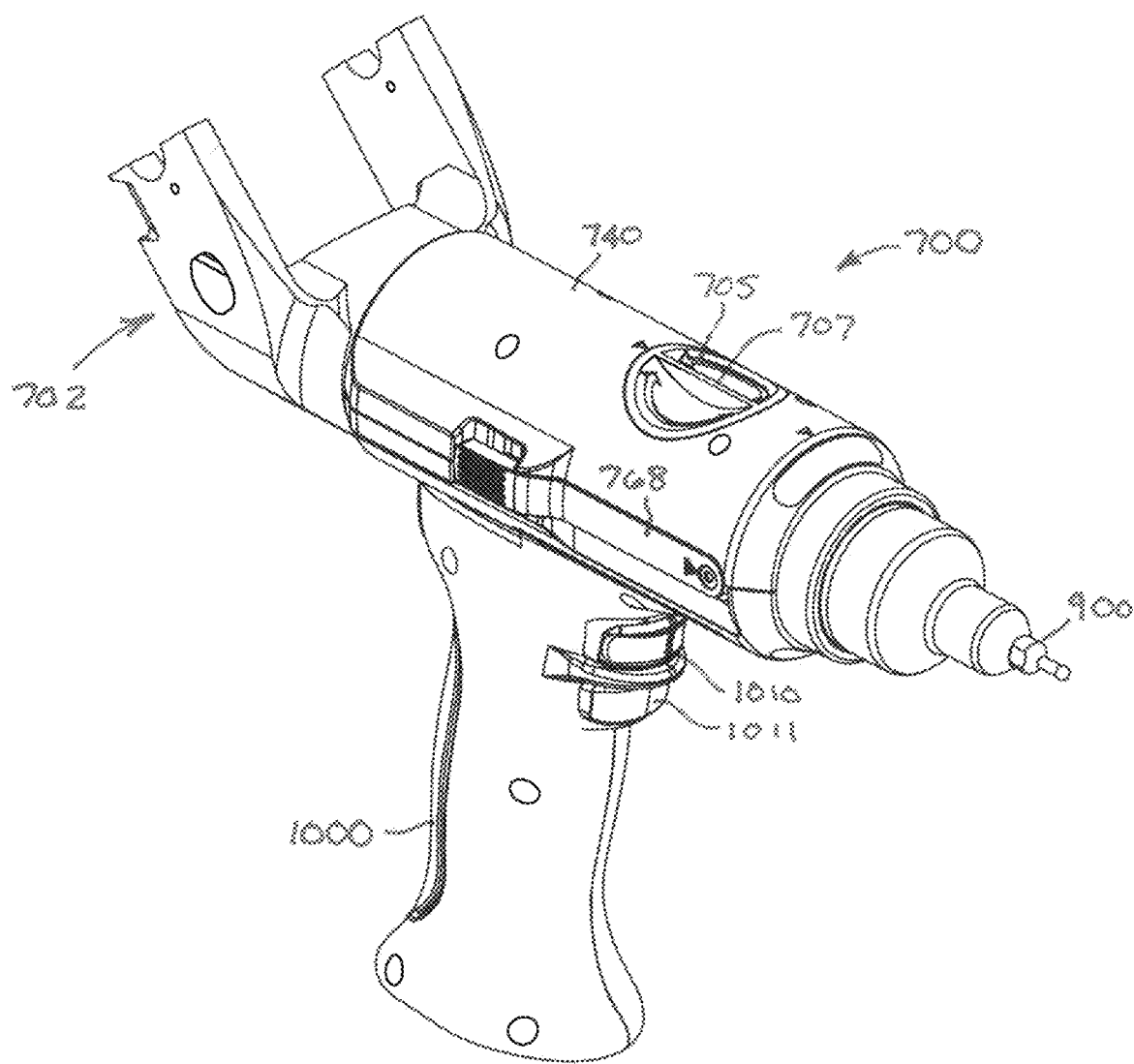
FIG. 18A is an isometric view of a seventh-axis assembly including a removable handle according to an embodiment.
Figure 18B:
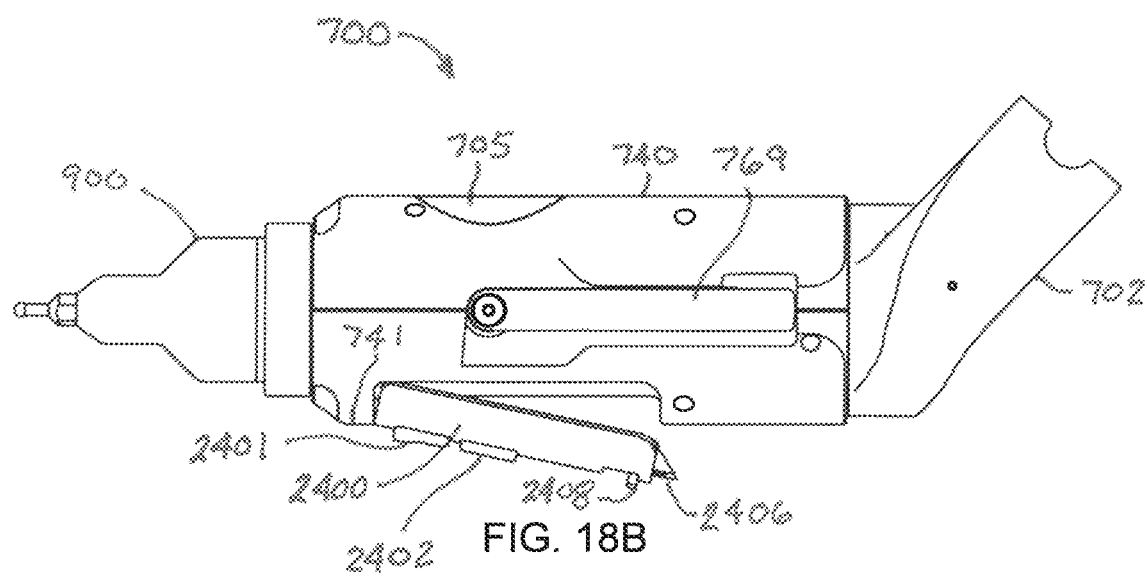
FIG. 18B is a side view of a seventh-axis assembly including a removable button-plate according to an embodiment.

In an embodiment, the AACMM 10 includes seven rotation axes, as illustrated beginning with FIG. 18A. In another embodiment, the AACMM 10 includes six rotation axes as is described in the aforementioned U.S. patent Ser. No. 10/663,274. It should be appreciated that while embodiments herein describe the end assembly as being seven-axis AACMM, this is for example purposes and the multiple accessory interface end assembly may also be incorporated into a six-axis AACMM. In an embodiment illustrated in FIGS. 18A, 18B, 18C, 19A, 19B, 19C, 19D, 19E, 19F, 20A, the seventh-axis or end assembly 700 includes a seventh-axis housing/yoke 702, a shaft 750, a seventh-axis slip ring 710, a first accessory latch 768, a second accessory latch 769, upper end-effector buttons 2401, 2402 (on button plate 2400), a seventh-axis circuit board 820 (FIG. 19G, 19H), and a carrier 770. In an embodiment, the seventh-axis housing/yoke 702 attaches at one end to the fourth/sixth-axis shaft 418 (FIG. 16B) of the six-axis assembly 600. In this attachment, the seventh-axis housing/yoke 702 serves a yoke function. The seventh-axis housing/yoke 702 couples to outer races of a rear bearing 732 and to the outer races of a front bearing 736. The shaft 750 couples to inner races of the rear bearing 732 and the front bearing 736. In an embodiment, the shaft 750 rotates about a seventh axis 711 relative to the housing/yoke 702. In an embodiment, a wave washer 734 applies force to the outer race of the rear bearing 732. The inner race of the rear bearing 732 is press fit onto the shaft 750. This results in preload being applied to both the rear bearing 732 and the front bearing 736.

In an embodiment, the encoder disk 724 is bonded/glued to the shaft 750, centered, and allowed to cure. An encoder board with read heads 722 is attached to a read-head adapter 720, which in turn is attached to the housing/yoke 702. A seventh-axis slip ring 710 may include a slip-ring housing 712, a slip-ring shaft, a slip-ring flange, a front slip-ring cable 718, a rear slip-ring cable 717, bus connectors 719 attached to the rear slip-ring cable 717, and bus connectors 839 attached to the front slip-ring cable 718. In an embodiment, the slip-ring flange is attached to an adapter plate hat is coupled to the yoke/housing 702. The slip-ring shaft 714 rotates independently of the slip-ring housing 712 and turns in response to force applied by wires that twist as the shaft rotates about the seventh axis 711. The seventh-axis slip ring 710 maintains electrical continuity among corresponding wires in the front slip-ring cable 718 and the rear slip-ring cable 717 even as the slip-ring shaft 714 rotates relative to the slip-ring housing 712. In an embodiment, each of the rear slip-ring cable 717 and the front slip-ring cable 718 include wires of the first bus 2182 and the second bus 2184. A T-connector 2152 associated with a T-cable 2154 of the first bus 2182 attaches to a board connector 2174 of the encoder board with read heads 722.

As will be discussed in more detail herein, the button plate 2400 is removably coupled to a seventh assembly housing 740. In the illustrated embodiment, that housing 740 includes an opening sized to receive the button plate 2400. In this embodiment, the button plate 2400 includes a lip 2404 that engages a front edge 741 of housing 740. The button plate 2400 further includes a movable/slidable latch member 2406 having a projection 2408. The latch member 2406 is biased, such as by a compression spring 2408 into an extended position. To couple the button plate 2400 to the housing 740, the operator retracts the latch member 2406, such as by applying a force (e.g. with their thumb) on the projection 2408. After placing the button plate 2400 in the opening of the housing 740, the latch member 2406 is released, allowing the latch member 2406 to slide under and engage a rear edge 744 of the housing 740 opening to couple the button plate 2400 to the housing 740.

Figure 19C:
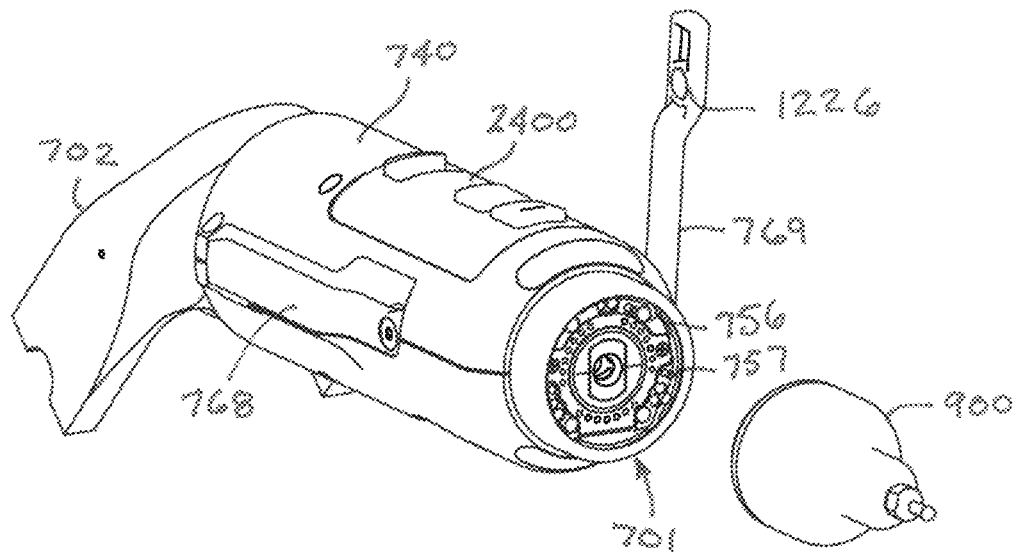
FIGS. 19C, 19D are a first isometric view and a second isometric view, respectively, of a seventh-axis assembly and a detached tactile probe assembly according to an embodiment.
Figure 19D:
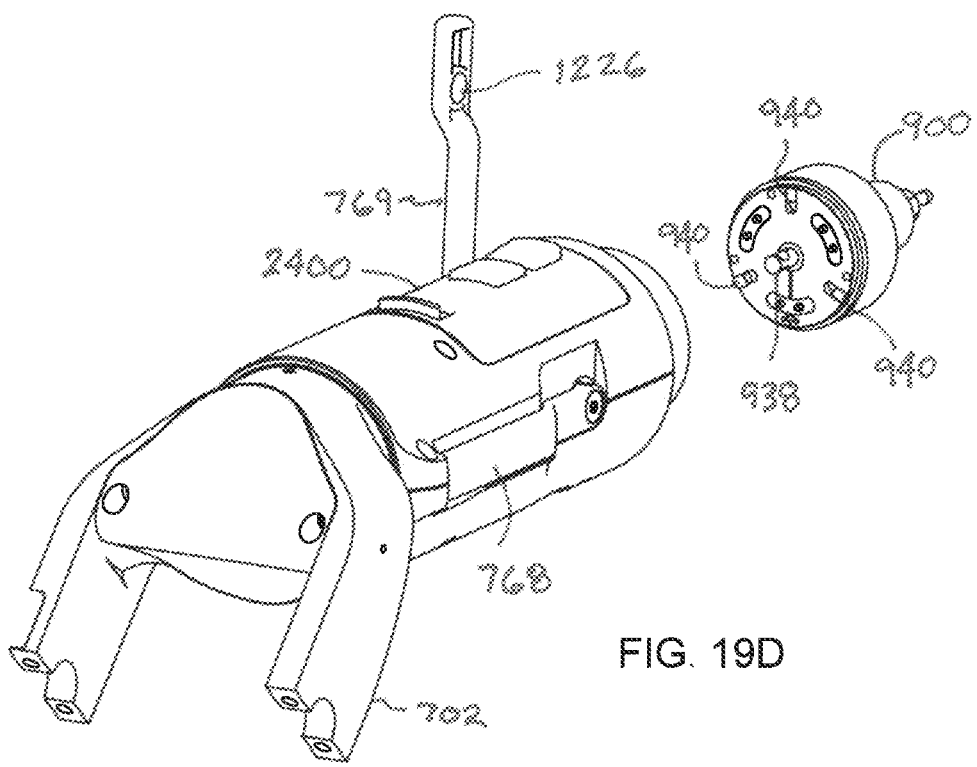
Figure 19E:
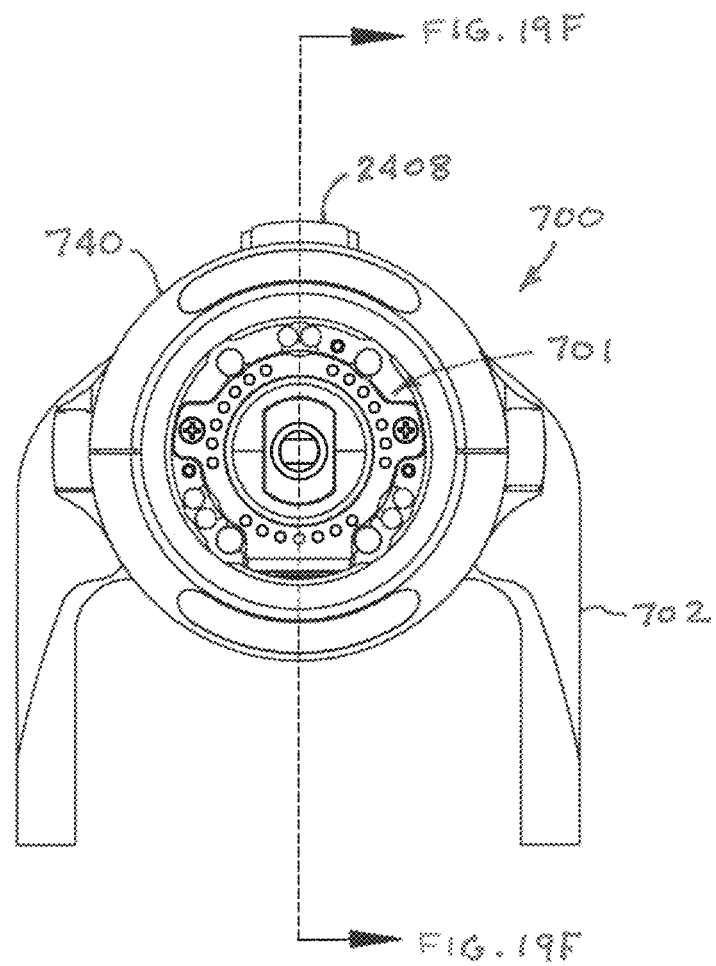
FIGS. 19E, 19F are front and section views of a seventh-axis assembly according to an embodiment.
Figure 19F:
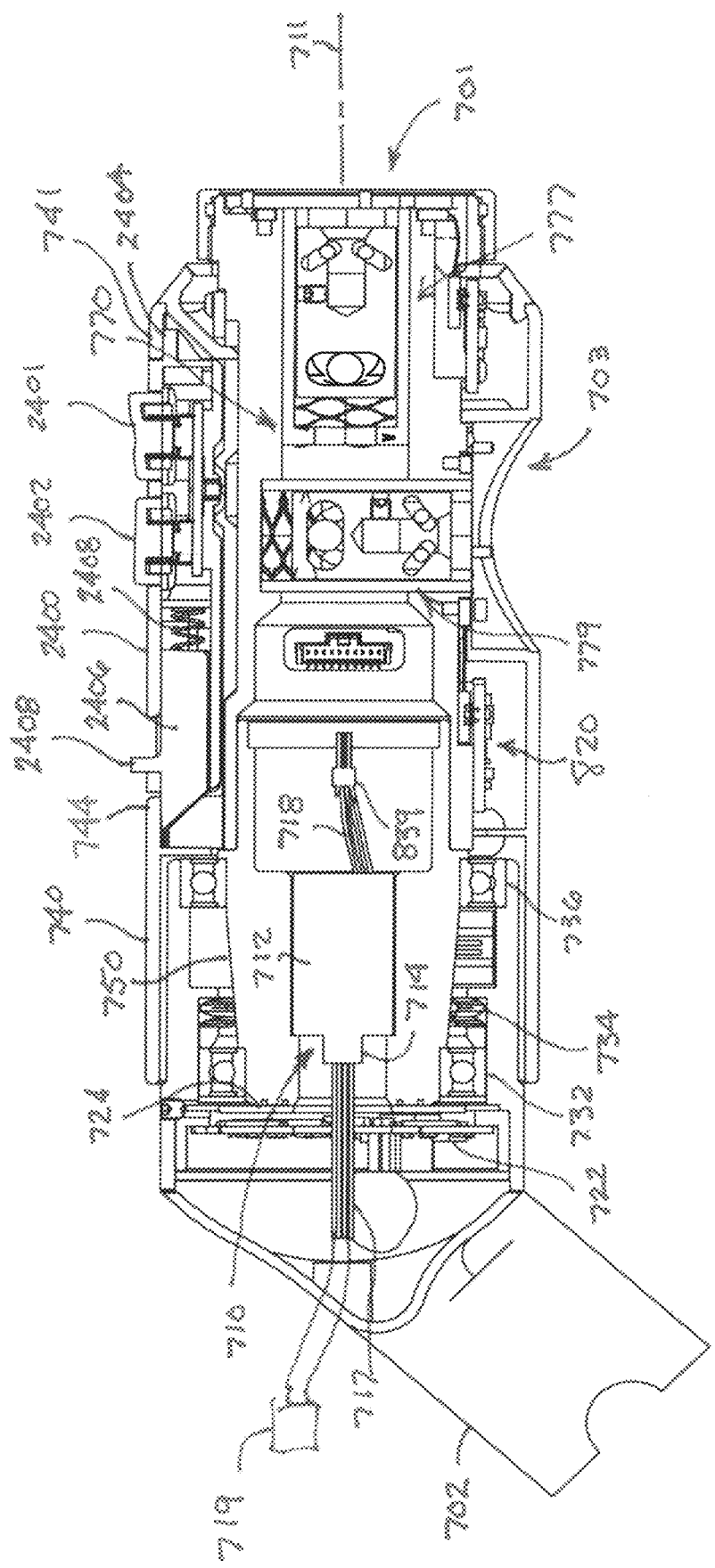
Figure 19G:
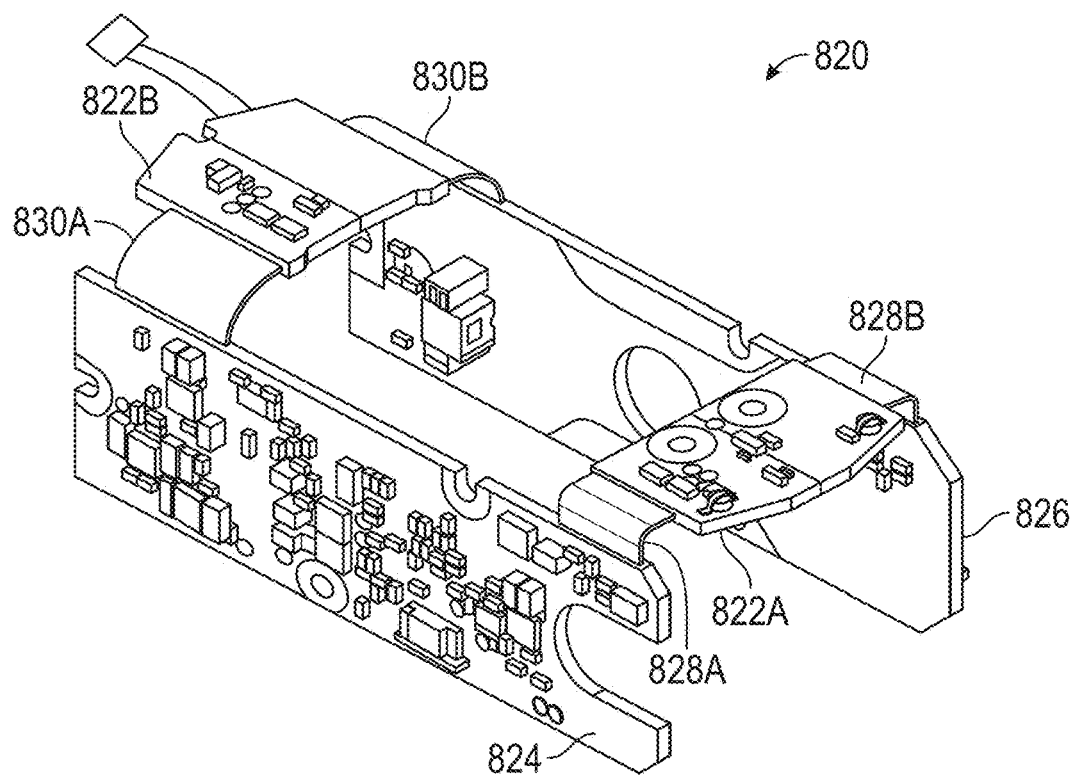
FIGS. 19G, 19H are first and second isometric views of a seventh-axis circuit board according to an embodiment.
Figure 19H:
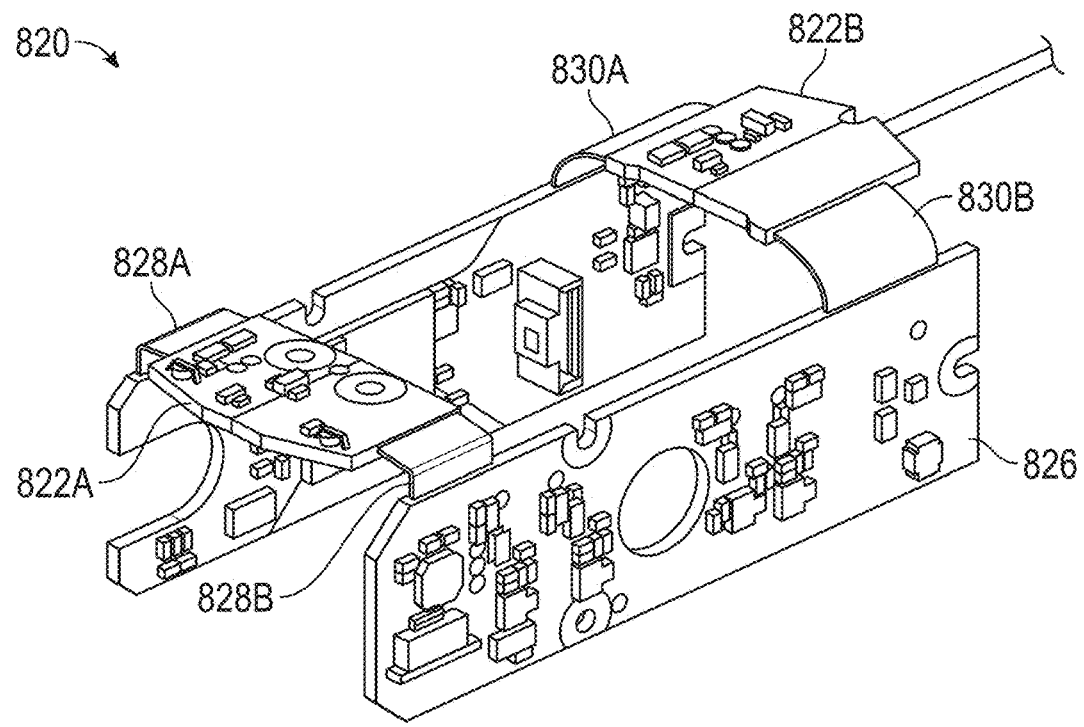

A seventh-axis circuit board 820 is shown in FIGS. 19G, 19H. In an embodiment, the seventh-axis circuit board 820 includes a left circuit board 824, a pair of upper circuit boards 822A/822B, and a right circuit board 826. In an embodiment, first upper circuit board 822A is electrically and mechanically connected by a pair first flex connector 828A, 828B. The second upper circuit board 822B is electrically and mechanically connected by a pair of second flex connectors 830A/830B. In an embodiment illustrated in FIG. 20A, the seventh-axis circuit board 820 wraps around a shaft circuit-board support 752.

The button plate 2400 may be removed and replaced with a handle 1000 (FIG. 18C) may be attached to the end assembly 700. The handle 1000 includes a latching mechanism 1001 that couples the handle 1000 to the housing 740 in a similar manner as the latch member 2406. In this embodiment, the latching mechanism 1001 includes a slidable actuator 1003 having a contact surface 1005, the actuator 1003 translates longitudinally within the handle 1000 in response to the operator pressing the contact surface 1005, such as with their thumb for example. The actuator 1003 is coupled to a latch member 1007 that moves from an extended position to a retracted position in response to the operator pressing the contact surface 1005. The latch member 1007 is biased towards the extended position, such as with the compression spring 1009 for example. To couple or uncouple the handle 1000 from the housing 740, the operator presses the contact surface 1005 causing the latch member 1007 to move to the retracted position. This movement engages/disengages the latch member 1007 from the edge 744.

The handle/button-plate connector 832 makes electrical connection with the handle-to-arm connector 1022 (FIG. 18E) of the handle 1000. In an embodiment, an arm-end processor 2220 (FIG. 5) is included on the seventh-axis circuit board 820. The hard-probe assembly 900 is one type of tactile probe. Other types of tactile probes are discussed herein below.

FIG. 19A shows a hard-probe assembly 900 coupled to the first accessory interface 701 of the end assembly 700. In the illustrated embodiment, the first interface 701 is positioned co-axially with the axis 711 on the end of the end assembly 700. As discussed in more detail herein, the hard-probe assembly 900 may further be interchangeably coupled with the second accessory interface 703. FIG. 19B shows the hard-probe assembly 900 released from the first accessory interface 701. In an embodiment, the release is obtained by moving a first latch 768 to release an extension element, such as a pull stud 938, of the hard-probe assembly 900. It should be appreciated that when the hard-probe assembly 900 is coupled to the second accessory interface 703, the release is obtained by moving the second latch 769. The hard-probe assembly 900 includes a probe tip 904 that an operator holds in contact with an object to be measured. When a designated actuator, such as button 2401 or button 2402 for example, is pressed, the encoders in the seven-axis assemblies 100, 200, 300, 400, 500, 600, 700 send synchronized encoder readings to the base processor electronics 2040, the encoder readings being synchronized to the capture signal generated by the trigger and capture circuit 2058 of the base processor electronics 2040. These encoder readings are combined with other recorded characteristics of the AACMM 10 to calculate 3D coordinates corresponding to a center of the probe tip 904. By measuring a number of points on the surface of an object with the probe tip 904, and by knowing the radius of the probe tip, the 3D coordinates of the object surface can be determined.

The first latch 768 and second latch 769 each may include a magnet 1226 near an end of the latch arm as shown in FIG. 19D. The magnet 1226 is attracted to the magnet embedded in the cover 740. The magnets 1226 hold the latches 768, 769 against the cover 740 unless moved/pulled away from the cover 740 by an operator. The latches 768, 769 each include coupling assemblies 777, 779 respectively that cooperate with the first accessory interface 701 and the second accessory interface 703 to couple accessories such as hard-probe 900 to the end assembly 700.

Figure 20A:
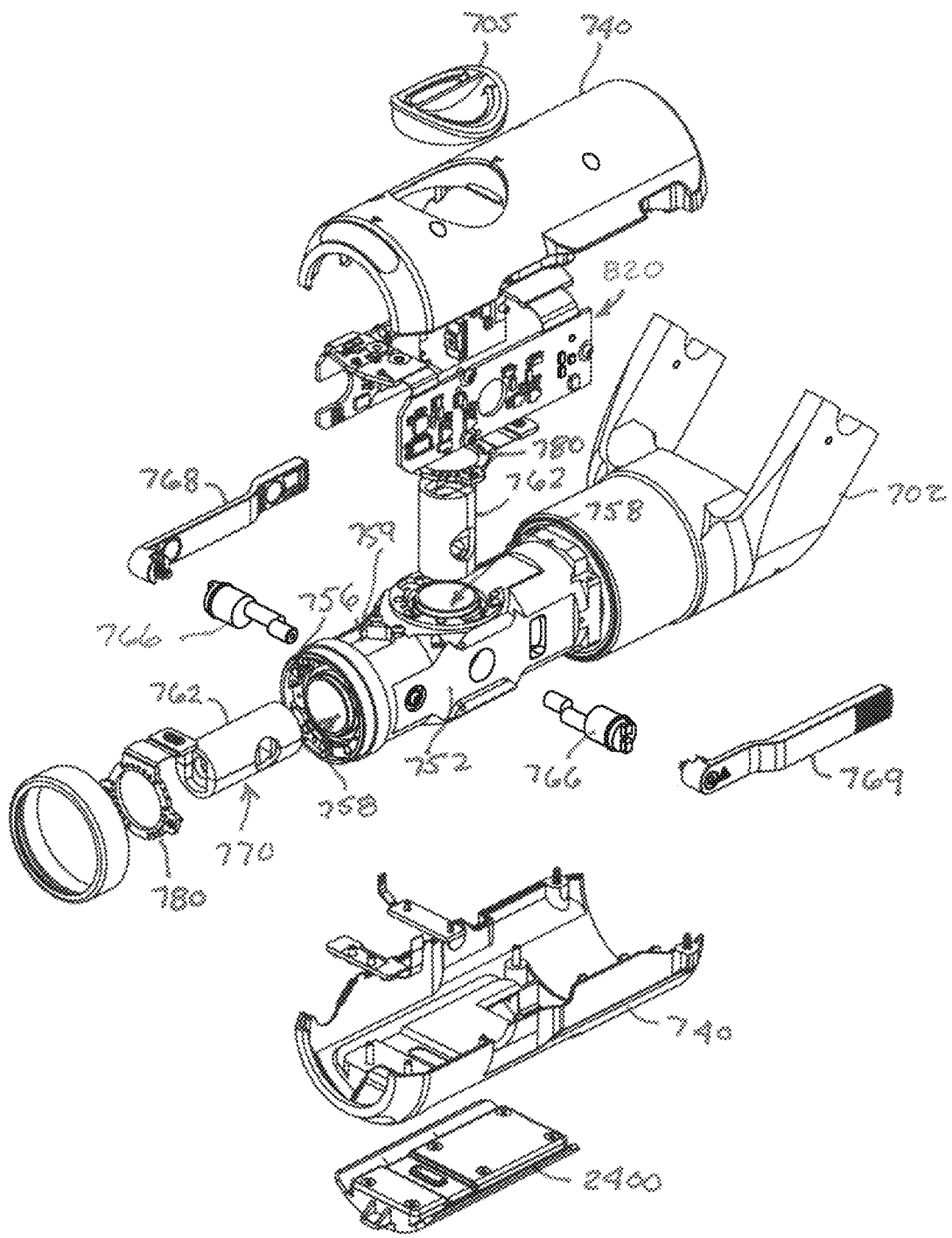
FIG. 20A is an exploded view of a seventh-axis assembly according to an embodiment.
Figure 20B:
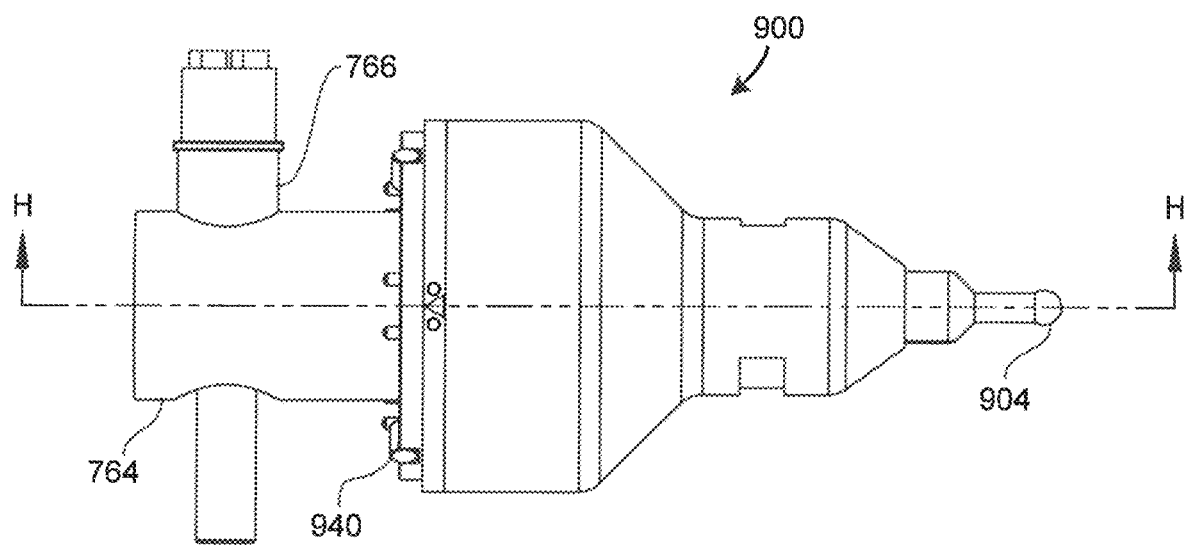
FIGS. 20B, 20C are top and section views, respectively, of a tactile probe assembly and coupling elements in an open position according to an embodiment.
Figure 20C:
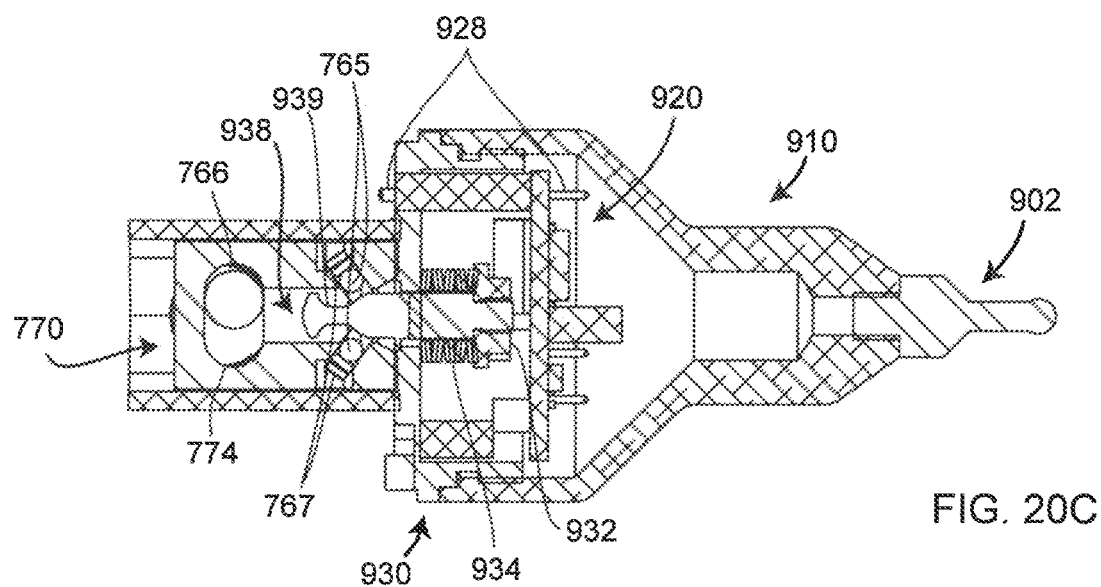
Figure 20D:
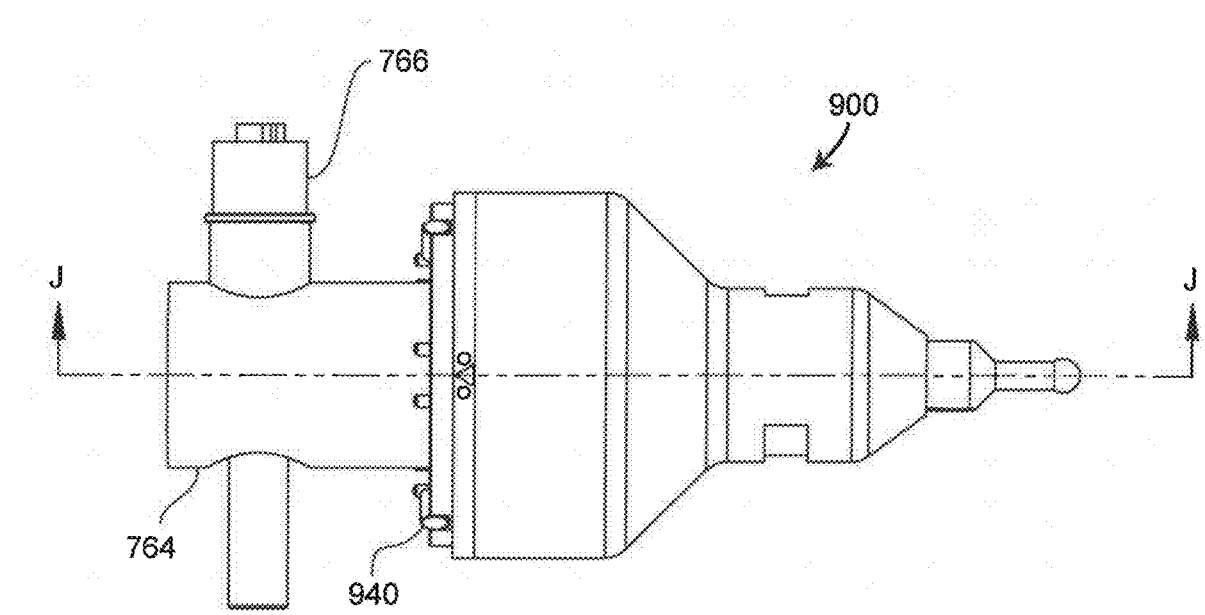
FIGS. 20D, 20E are top and section views, respectively, of a tactile probe assembly and coupling elements in an closed position according to an embodiment.
Figure 20E:
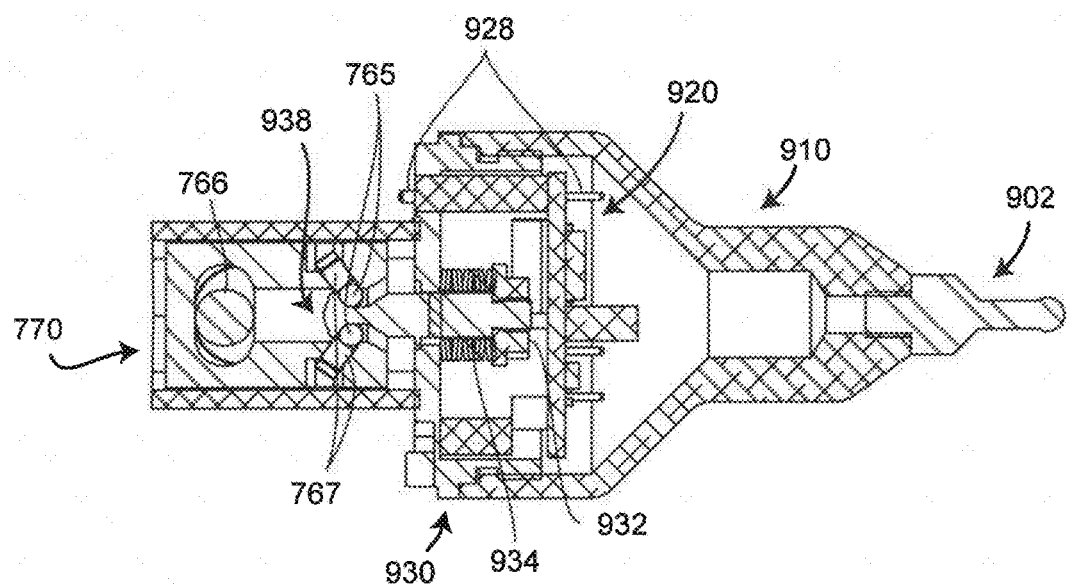
Figure 20F:
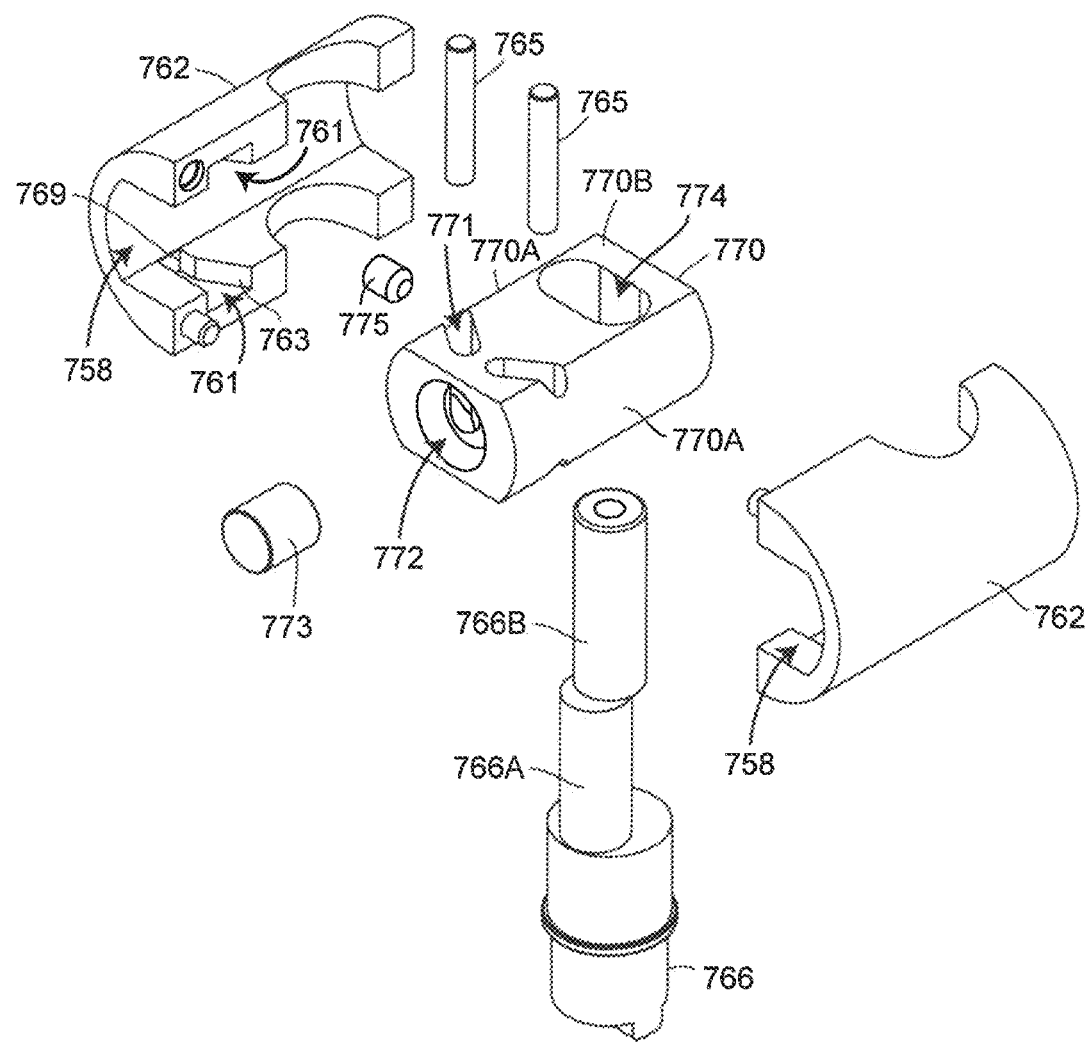
FIGS. 20F, 20G, 20H are various views of a tactile probe assembly and coupling elements according to another embodiment.
Figure 21A:
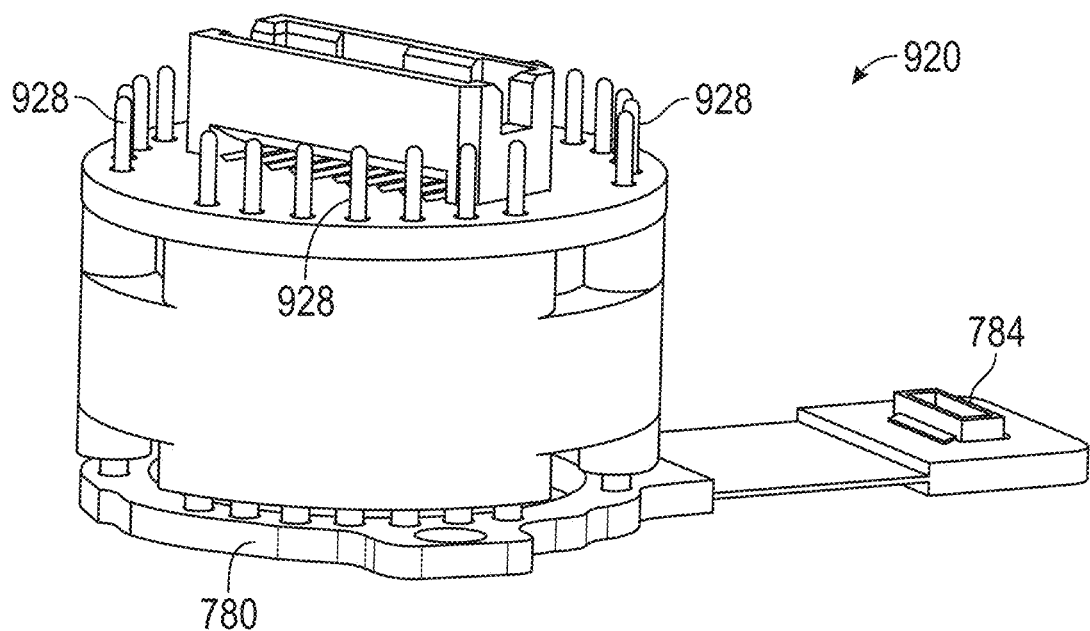
FIG. 21A is an isometric view of a probe electrical interface and an interface board according to an embodiment.
Figure 21B:
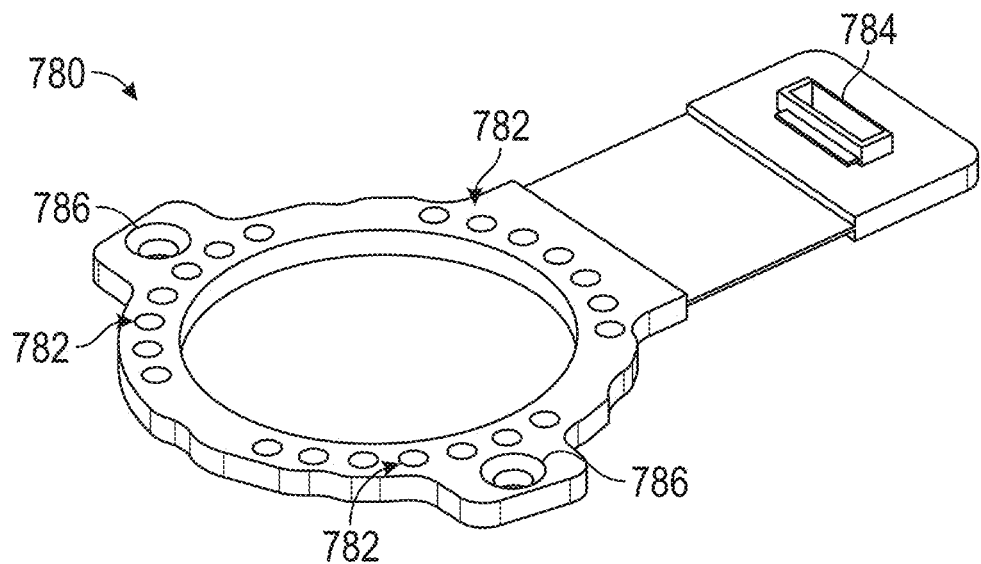
FIG. 21B is an isometric view of an interface board according to an embodiment.
Figure 22E:
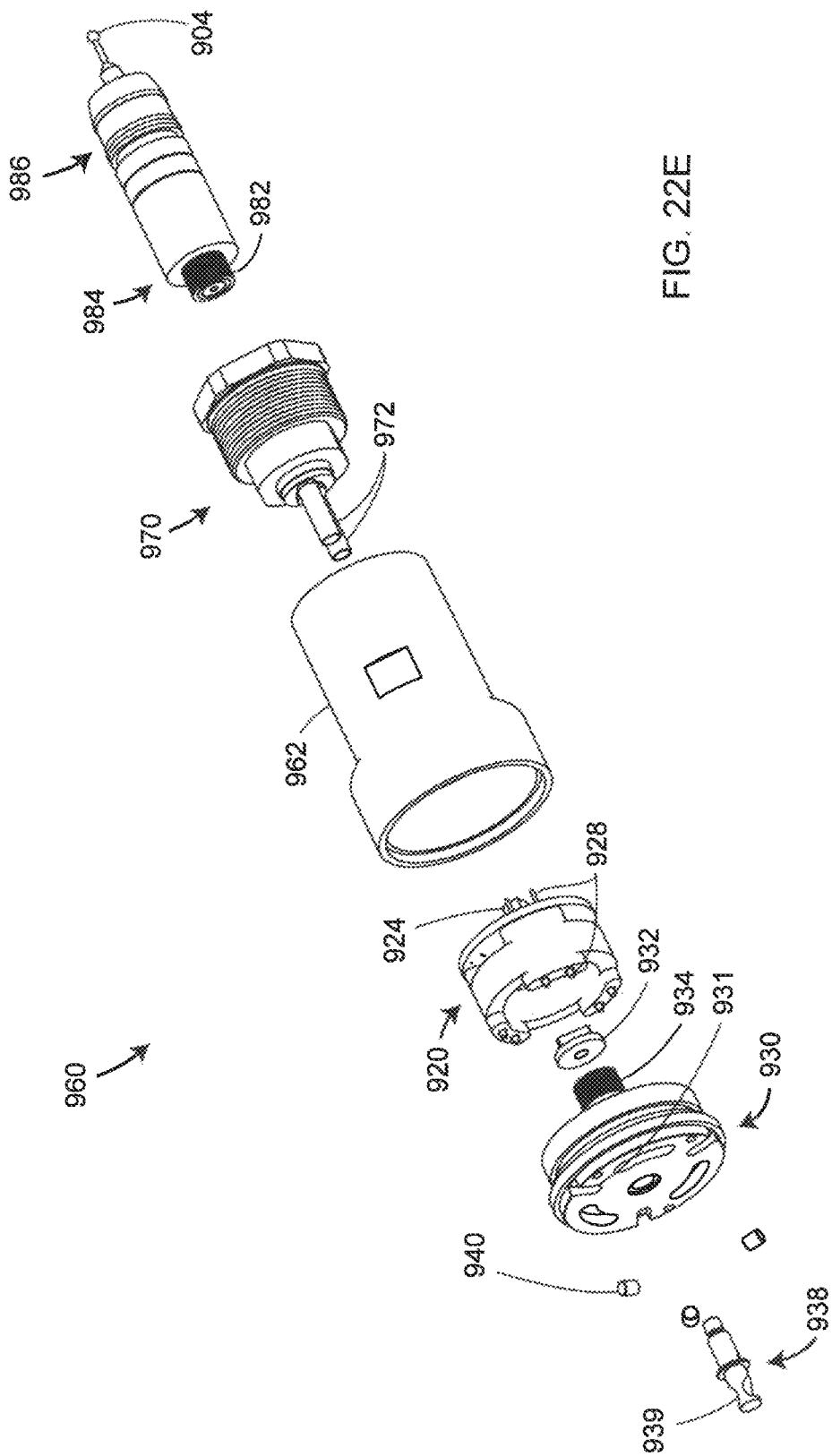

Referring now to FIGS. 19F, 20A, 20F an embodiment of the first coupling assembly 777 is shown and described. It should be appreciated that while only the first coupling assembly 777 and first accessory interface 701 are described herein, the second coupling assembly 779 and the second accessory interface 703 are configured the same. In an embodiment, the second coupling assembly 779 and the second accessory interface 703 are oriented 90 degrees relative to the first accessory interface 701. In the first coupling assembly 777, the ends of the latch 768 are attached to a camshaft 766 (FIG. 20A) by camshaft fasteners 765 (FIG. 20F). The camshaft 766 passes through a camshaft hole 774 of the carrier 770 as illustrated in FIGS. 19F, 20A. The carrier 770 is surrounded by two guides 762 that slide, together with the carrier 770, into a guide cavity 758 shown in FIGS. 20A, 20F. Outside the guide cavity 758, there are three pairs of kinematic balls 756 and three alignment pins 757. When the three pairs of kinematic balls 756 are brought into contact with three kinematic cylinders 940, the resulting contact between the kinematic cylinders 940 and the kinematic balls 756 provides that the hard probe 900 may be removed and repositioned repeatably. The three kinematic cylinders 940 fit into kinematic cylinder sockets 931 as shown in FIG. 22E. The three alignment pins 757 are positioned to provide that each of the kinematic cylinders 940 is matched to the corresponding pair of kinematic balls 756. The alignment pins 757 fit loosely into alignment holes 941 (FIG. 22C) without touching the sides of the alignment holes 941. An interface board 780 shown in FIGS. 20A, 21B is attached by screw holes 786 to the front of the end assembly 700. The interface board 780 includes electrical contact pads 782 that make electrical contact with spring loaded pins 928 in the probe electrical interface 920 shown in FIG. 21A. Electrical signals and power are routed through the interface board 780 to a connector adapter 784 shown in FIGS. 19F, 21B. A space for the connector adapter 784 is provided in the connector cutout 759 of FIG. 20A.

In the carrier 770, an adapter hole 772 (FIG. 20A, 20F) is sized to accept the extension element or pull stud 938. When the latch 768 is lifted away from the cover 801, the pull stud 938 is released, enabling the hard-probe assembly 900 to be freely moved away from the end assembly 700. When the latch 768 is moved to contact the cover 801, the pull stud 938 is held firmly in place within the adapter hole 772. The open (released) and locked cases are illustrated in FIGS. 20B, 20C, 20D, 20E. FIGS. 20B, 20C illustrate a position of the components in which the hard-probe assembly 900 is not locked in place against the end assembly 700 in the first accessory interface 701. In this position, the camshaft 766 moves the carrier 770 toward the front of the end assembly 700. This causes leaf springs 767 to collapse, removing force from preload pins 765. In this state, the pull stud 938 is not constrained. FIGS. 20D, 20E illustrate a position of the components in which the hard-probe assembly 900 is locked in place with the hard-probe assembly 900 held firmly against the end assembly 700. In this position, the camshaft 766 moves the carrier 770 away from the front of the end assembly 700. This causes the leaf springs 767 to expand, pressing the preload pins 765 into a pull stud notch 939 of the pull stud 938.

Figure 20G:
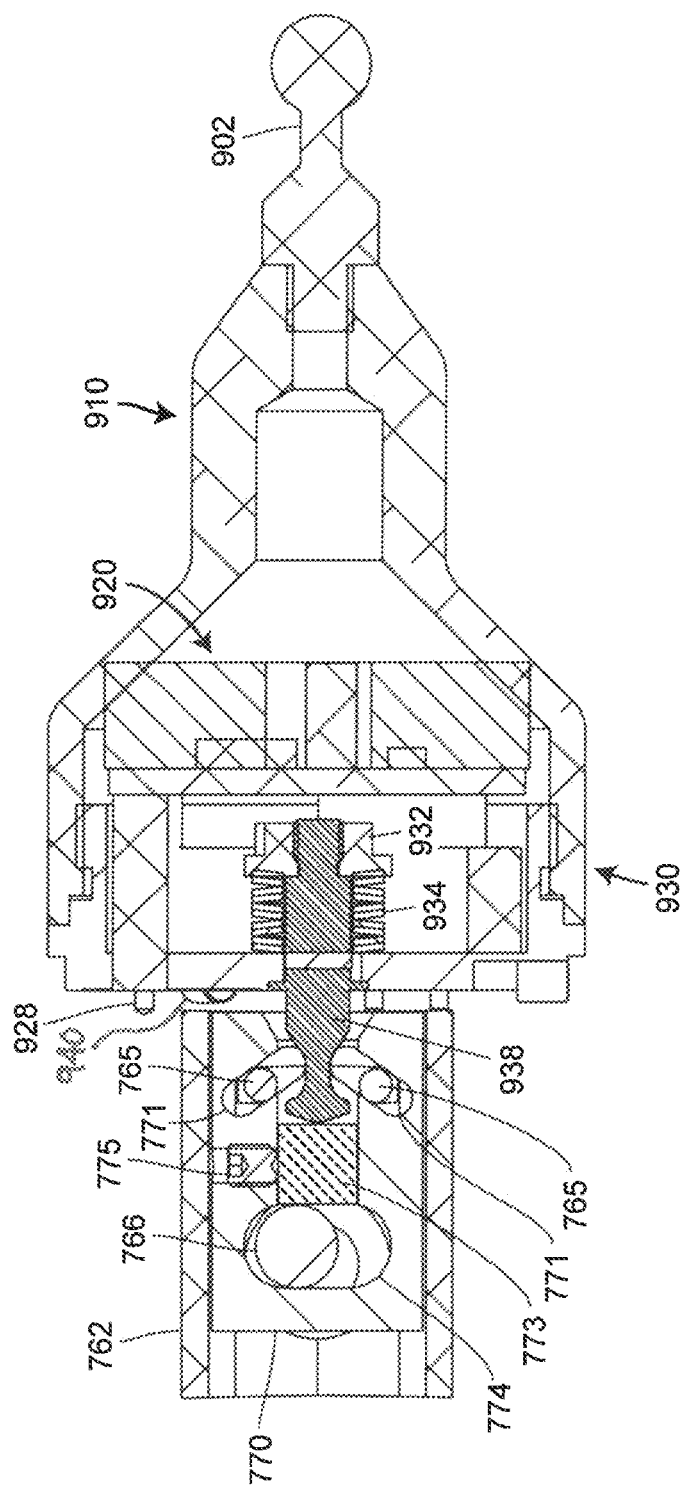
Figure 20H:
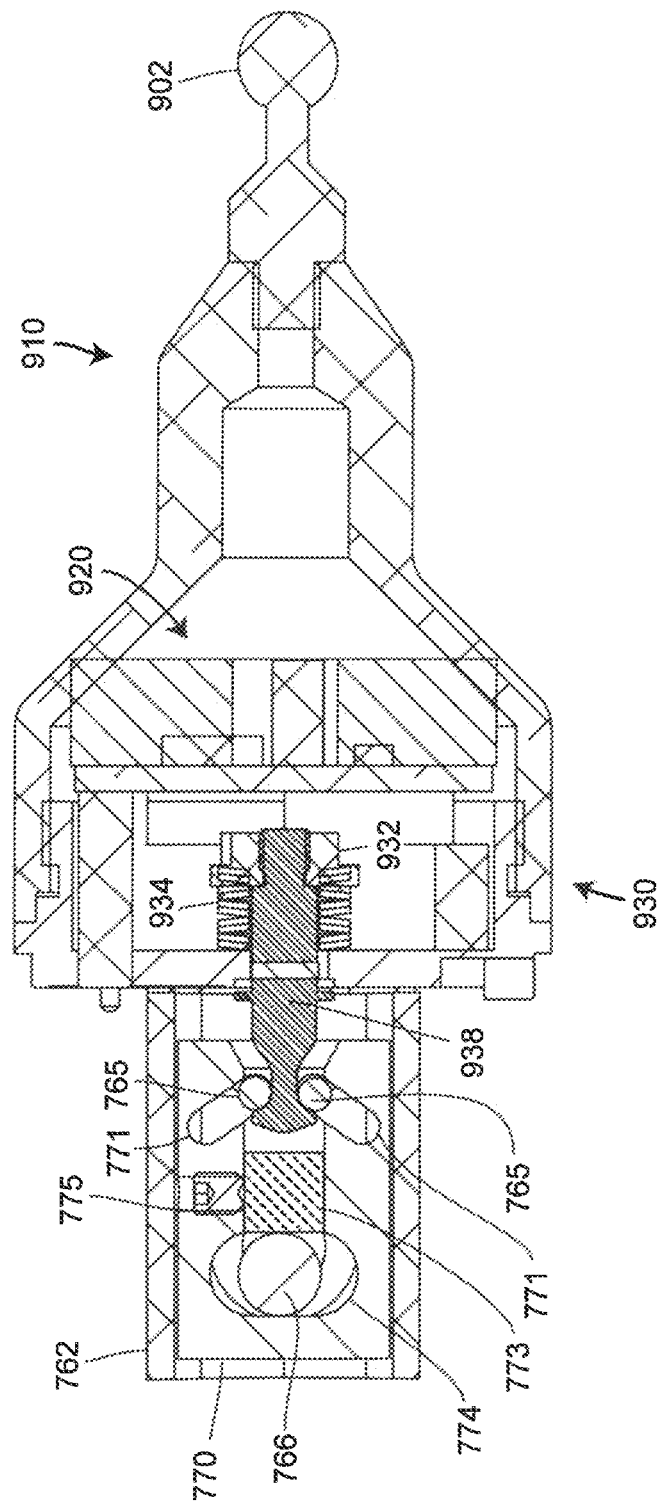

Referring now to FIGS. 20F, 20G, 20H, another embodiment is shown of an assembly for retaining the probe assembly 900 to the carrier 770. The guides 762 are coupled together to define a cavity 758. The cavity 758 is sized and shaped to receive the carrier member 770. In the illustrated embodiment, the carrier member 770 has a pair of opposing cylindrical surfaces 770A and a pair of opposing planar surfaces 770B. As discussed herein with reference to FIGS. 20A-20E, the carrier member 770 includes a slot or elongated hole 774 that receives cam lobes 766A, 766B. The carrier member 770 also includes a pair of opposing slots 771 that extend through the carrier member 770 and are sized to receive the preload pins 765. The preload pins 765 move within slots 761 of guides 762 that have an angled surface 763 and notch 769.

The carrier 770 further includes an adapter hole 772 having a pull stud notch 939 extending therefrom. The adapter hole 772 is sized to accept the pull stud 938. The adapter hole 772 is further sized to receive a magnet member 773. In an embodiment, the magnet member 773 is retained in the adapter hole 772 by a set screw 775. As discussed in more detail herein, the magnet member 773 holds the pull stud 938 (and thus the probe assembly 900) in place when the preload pins 765 are in an unlocked position.

As discussed herein with reference to FIGS. 20A-20E, when the latch 768 is moved from the unlocked to the locked position, the cam shaft 766 moves the carrier 770 within the cavity 758. As a result, the preload pins 765 move from an unlocked position (FIG. 20G) to a locked position (FIG. 20H). It should be appreciated that when in the locked position, the preload pins 765 engage the pull stud 938 to retain the probe assembly 900. Unlike the embodiment of FIGS. 20A-20E, there are no leaf springs to bias the preload pins 765. In this embodiment, when the latch 768 is in the unlocked position, the carrier member 770 is positioned to place the magnet member 773 in a position to magnetically engage the pull stud 938 with sufficient force to retain the probe assembly 900 (FIG. 20G). As the latch 768 is moved to the locked position, the carrier member 770 moves in a direction away from the probe assembly 900, causing the preload pins 765 to engage the pull stud 938.

It should be appreciated that the engagement of the pull stud 938 by the magnet member 773 allows the probe assembly 900 to be removably coupled to the carrier 770. It further provides advantages in allowing the probe assembly 900 to be retained until the latch 768 is engaged, thus preventing or reducing the risk of the probe assembly accidentally falling out or off of the carrier 770.

As discussed previously, the second accessory interface 703 is configured in the same manner as the first accessory interface 701 such that accessories may be mounted to either interface 701, 703 or each interface 701, 703 may include an accessory simultaneously. The coupling or uncoupling of the accessory from the second accessory interface 703 is performed by moving/rotating the latch 769.

In an embodiment, the second accessory interface 703 may be enclosed by a cover member 705 as shown in FIG. 18A, 23E, 23F, 23G, 23H when an accessory is not attached. In an embodiment, the cover member 705 has a contoured or curved shape to conform with the shape of the housing 740. The cover member 705 may include a rib or handle 707 such that when the operator twists or rotates the cover member 705, the outer edge of the cover member slides along the edge of the opening 709 of the housing 740 allowing the operator to remove the cover member 705. In an embodiment, the cover member 705 includes at least one magnet 713. The at least one magnet 713 cooperates with at least one magnet 715 of the second accessory interface 703 to retain the cover member 705 on the cover 740.

With reference to FIG. 18B, 18C, and FIG. 24A-24K illustrate an embodiment of a method in which button plate 2400 and handle 1000 are attached to the end assembly 700. In this embodiment, to couple the button-plate 2400, the operator engages the lip 2404 with the edge 741 of housing 740. The button-plate 2400 is then rotated to engage an angled surface 2406 of latch member 2406 into contact with the edge 744 of the housing 740. By pressing the button-plate 2400 towards the housing 740, the latch member slides towards a retracted position causing the spring 2408 to compress. When the edge of the angled surface 2406 moves past the edge 744 of housing 740, the spring 2408 biases the latch member 2406 to an extended position that engages the latch member 2406 against the inner surface of the housing 740 near edge 744. To remove the button-plate, the operator applies a force to projection 2408 to retract the latch member 2406 and disengage it from the housing 740.

The button-plate includes a connector, similar to connector 1022, that engages connector 832 (FIG. 5) to allow the buttons 2401, 2402 to transmit electrical signals to the arm-end processor 2220.

Figure 24A:
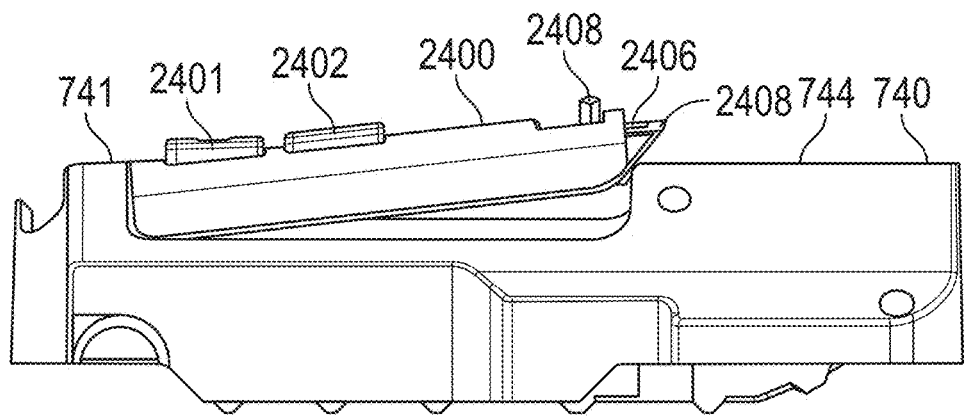
FIG. 24A-24K are various views of a button-plate being coupled or uncoupled from the seventh-axis assembly in accordance with an embodiment.
Figure 24B:
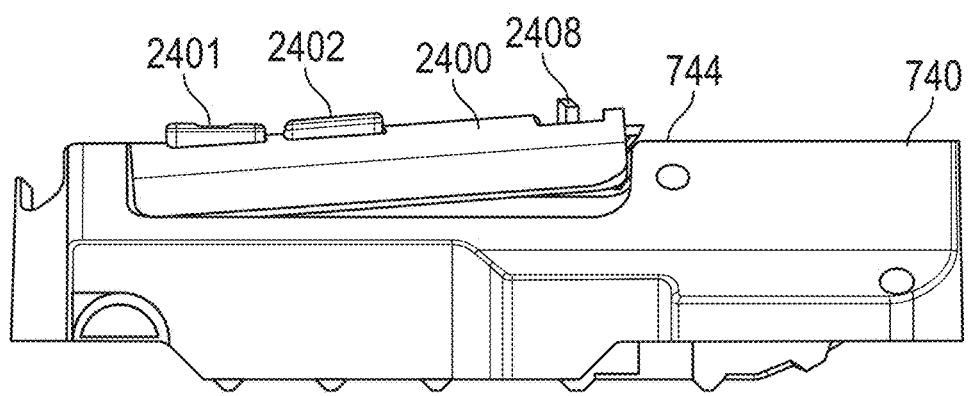
Figure 24C:
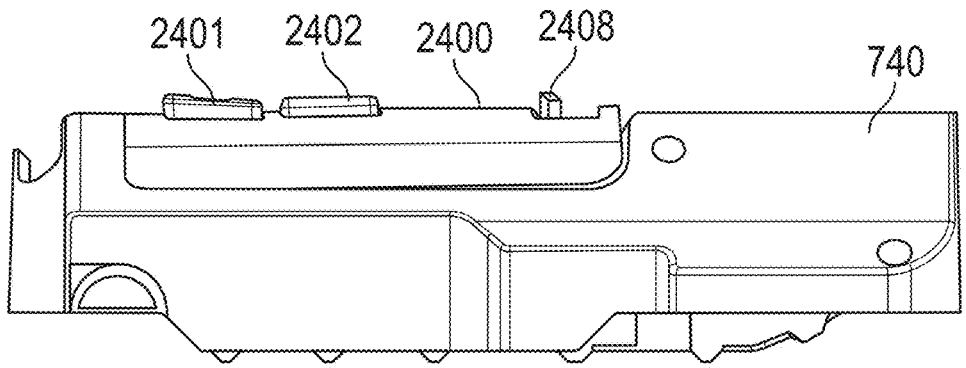
Figure 24D:
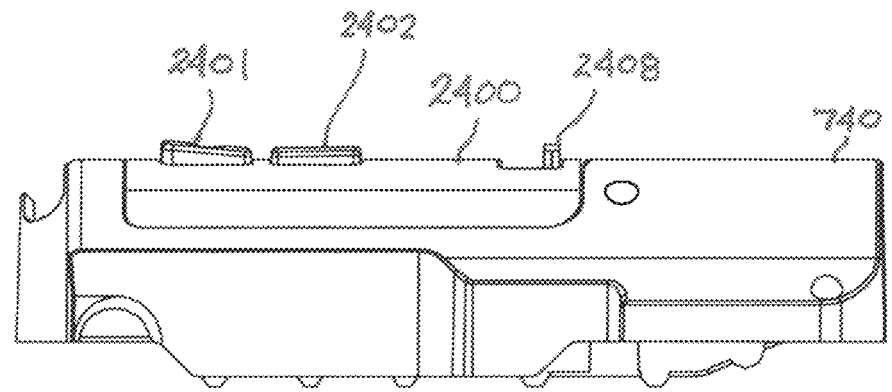
Figure 24E:
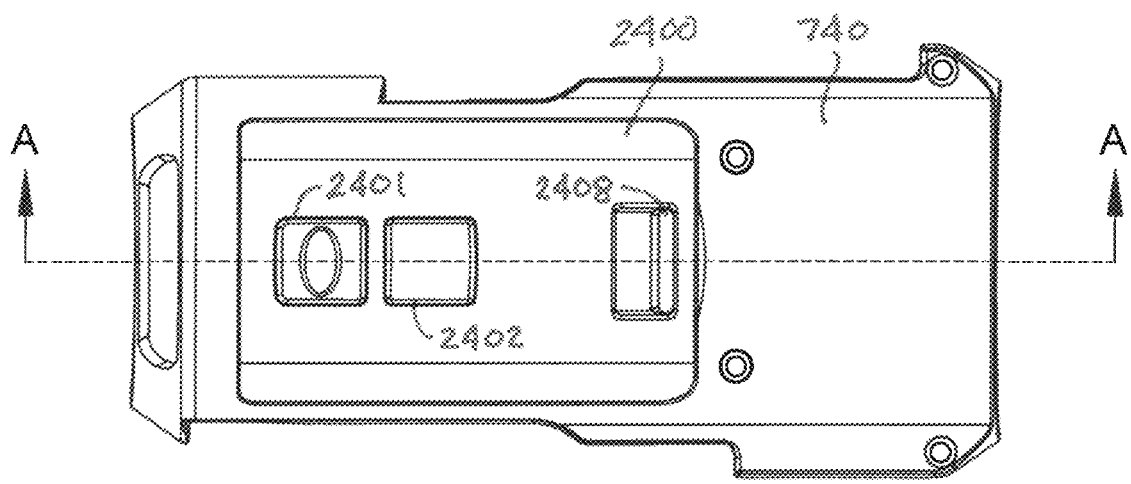
Figure 24F:
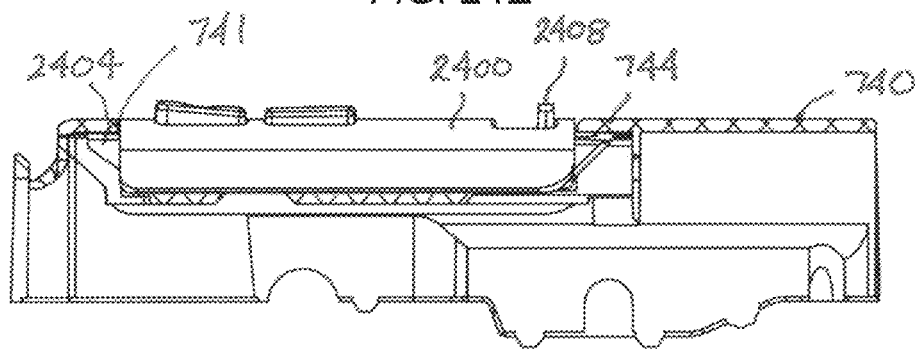
Figure 24G:
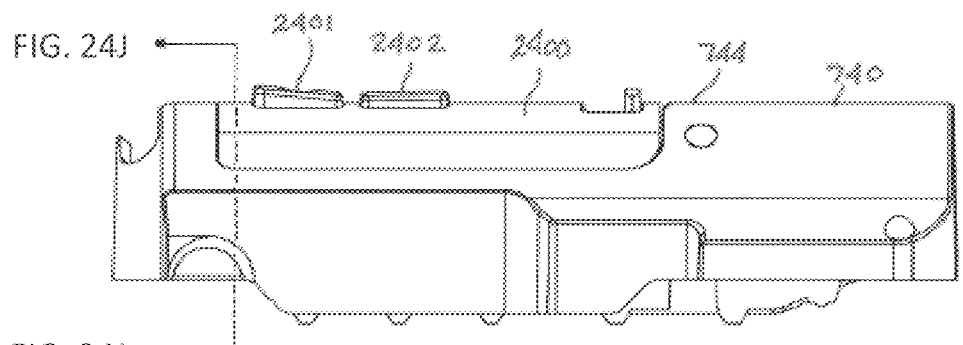
Figure 24H:
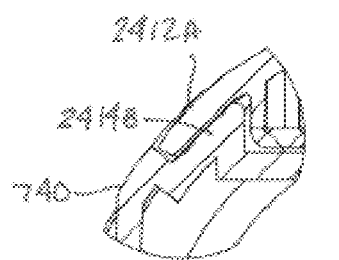
Figure 24I:
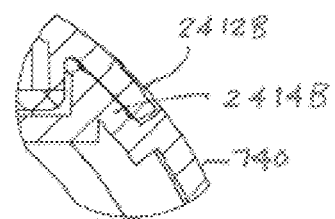
Figure 24J:
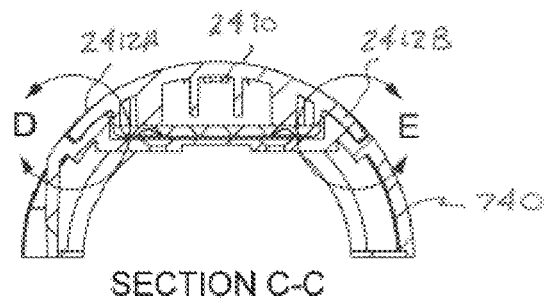
Figure 24K:
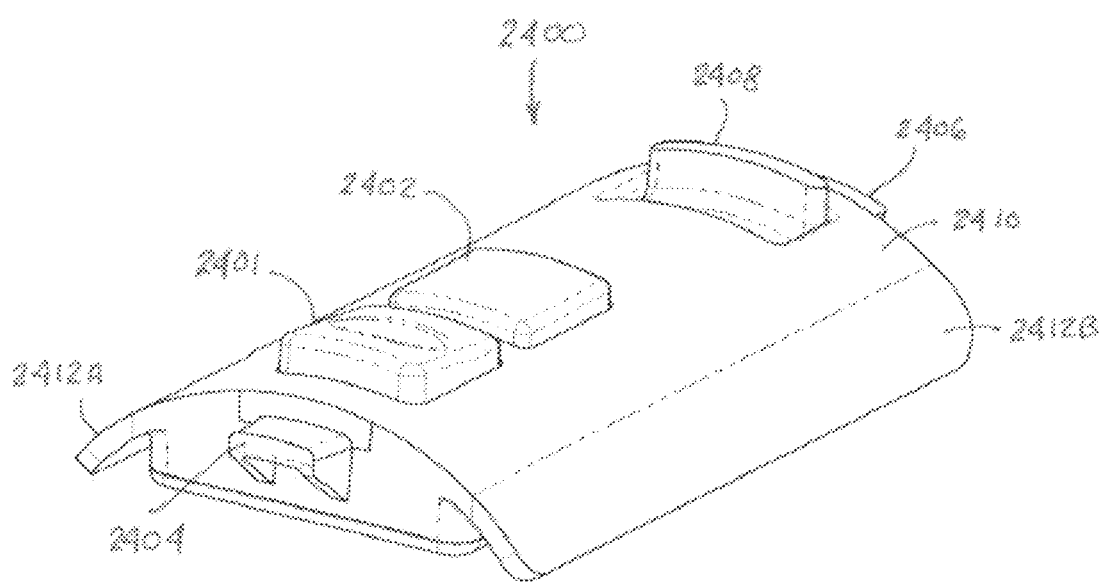

Referring now to FIGS. 24I, 24J, 24K, an embodiment is shown of an actuator-plate, such as button-plate 2400, that is configured to couple with the end assembly 700 and includes a self-disengagement feature. In this embodiment, the button-plate 2400 includes a top wall 2410 having a pair of opposing flanges or walls 2412A, 2312B extending along each side. The top wall 2410 is generally shaped (e.g. curved) to conform with the shape of the housing 740 (e.g. generally cylindrical), such that when the button-plate 2400 is installed, the end assembly 700 will be comfortable to hold. In this embodiment, the flanges 2412A, 2412B are shaped to have an interference fit with a wall 2414A, 2414B of the housing 740. In other words, the radius of the flanges 2412A, 2412B is shaped to contact the walls 2414A, 2414B before then latch member 2406 is clear of the edge 744. Thus, as the operator presses on the button-plate 2400, the ends of flanges 2412A, 2412B will deflect. It should be appreciated that the flanges 2412A, 2412B will bias the button-plate 2400 in a direction away from the housing 740 when the latch member 2406 is in the extended position. As a result, when the operator disengages the latch member 2406, the button-plate 2400 will move away from the housing 740. This provides the technical effect of assisting the operator in removing of the button-plate 2400 from the end assembly 700.

Figure 18C:
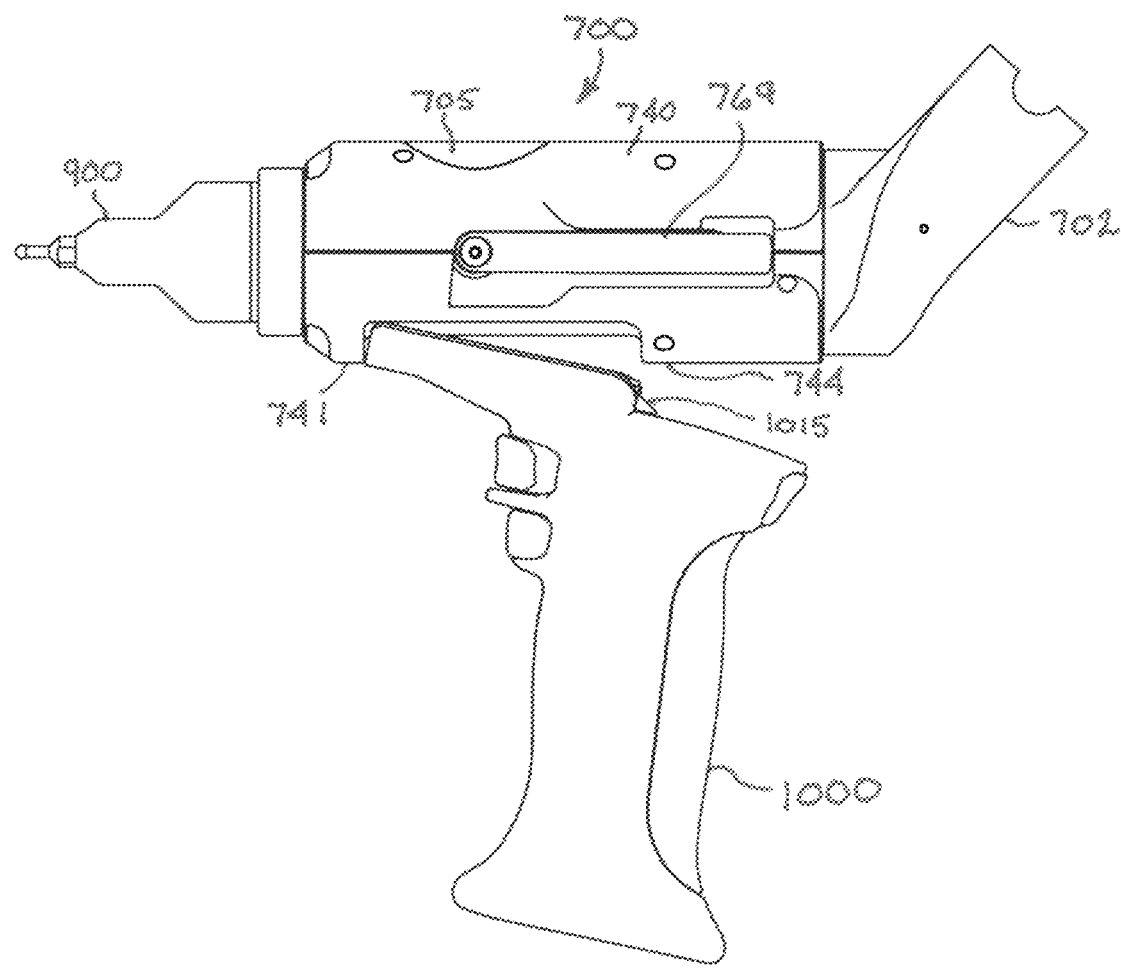
FIG. 18C is a side view of a seventh-axis assembly showing a removable handle being attached according to an embodiment.
Figures 18D, 18E:
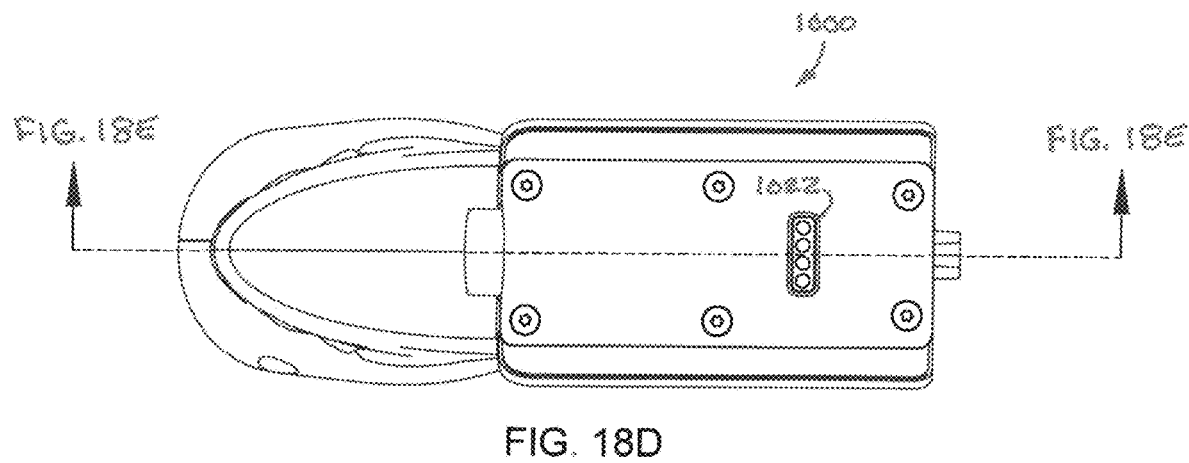
FIGS. 18D, 18E are a top view and a section view, respectively, of a removable handle according to an embodiment.

The handle 1000 couples to the housing in a similar manner as shown in FIG. 18C, 18D, 18E. The handle 1000 includes a latching mechanism 1001 that couples the handle 1000 to the housing 740 in a similar manner as the latch member 2406. In this embodiment, the latching mechanism 1001 includes a slidable actuator 1003 having a contact surface 1005, the actuator 1003 translates longitudinally within the handle 1000 in response to the operator pressing the contact surface 1005, such as with their thumb for example. The actuator 1003 is coupled to a latch member 1007 that moves from an extended position to a retracted position in response to the operator pressing the contact surface 1005. The latch member 1007 is biased towards the extended position, such as with the compression spring 1009 for example.

To couple the handle 1000 from the housing 740, the operator inserts a lip 1013 into the opening in the housing 740 (FIG. 18C) to engage the inner surface of the edge 741. As the handle 1000 is rotated towards the housing 740, an angled surface 1015 engages the edge 744 causing the latch member 1007 to compress the spring 1009. When the latch member 1007 clears the edge 744, the spring 1009 moves the latch member 1007 in the opposite direction to engage the inner surface of edge 744. To remove the handle 1000, the operator presses the contact surface 1005 causing the latch member 1007 to move to the retracted position. This movement engages/disengages the latch member 1007 from the edge 744.

In an embodiment illustrated in the handle buttons 1010, 1011 send electrical signals through the handle-to-arm connector 1022 to the arm-to-handle connector 832 to the seven-axis arm-end electronics 2210 shown in FIG. 5.

Referring now to FIGS. 23A, 23B, 23C, 23D an embodiment is shown of a line scanner or laser line probe (LLP) 1100. In an embodiment, the LLP 1100 includes an interface 1020 that provides mechanical and electrical connection to the first accessory interface 701 or the second accessory interface 703. In an embodiment, the interface 1020 includes a pull stud 1024, a kinematic interface 1026, and an LLP interface 1027. In the illustrated embodiment, the pull stud 1024 and interfaces 1026, 2027 connect with the first accessory interface 701 and second accessory interface in the same manner as is described herein, such as in reference to FIGS. 20A-20H and FIG. 21A and FIG. 21B.

In an embodiment, the LLP 1100 includes a projector 1110 and a camera 1120 separated by a baseline distance and operable to perform a triangulation measurement to determine 3D coordinates of points illuminated by a line of laser light or a pattern of light, which might be laser light or another type of light. In an embodiment, the LLP 1100 further includes a marker light source 1125 that projects a beam of light that intersects a projected line of light in a spot, thereby indicating to a user a recommended position for locating an object to be measured. In an embodiment, the LLP 1100 includes a color camera 1121 that further enhances measured 3D coordinates with color. The camera 1120 and projector 1110 are included in a camera-projector portion 1106 that further includes an outer shell 1108. In an embodiment, the elements of the LLP 1100, including the camera 1120 and the projector 1110 are supported by electronics, including a controller 1040. In an embodiment, some electronics that support processing of collected LLP data is included in the seventh axis circuit board 1104.

In an embodiment, the outer shell 1108 includes an inlet 1115 (FIG. 23J) opening on a rear wall 1112 that is in fluid communication with a channel 1114. In an embodiment, the channel 1114 extends along the length of the rear wall 1112 and has an outlet on an end opposite the inlet 1115. A fan (not shown) may be operably disposed in the channel 1114 to move air from the inlet 1115 to the outlet. The channel 1114 is at least partially defined between the rear wall 1112 and an inner wall 1116. In an embodiment, the inner wall 1116 is in direct thermal communication with the controller 1040. In an embodiment, a side of the inner wall 1116 opposite the channel 1114 may include a heat sink.

Referring now to FIGS. 20B, 20C, 20D, 20E, 21A, 21B another accessory shown, sometimes referred to as a hard-probe 900. Elements of the hard-probe assembly 900 include a probe stylus assembly 902, a probe body 910, a probe electrical interface 920, a lock nut 932, a spring stack 934, a probe cap 930, a pull stud 938, and kinematic cylinders 940. In an embodiment, the probe stylus assembly 902 is threaded to screw into the probe body 910. In an embodiment, the probe stylus assembly 902 includes a spherical probe tip 904. In an embodiment, the probe body 910 includes a hollow portion sized to accept the probe electrical interface 920. In an embodiment, the probe electrical interface 920 includes a probe electrical interface circuit board 922, a probe interface body 926, and spring-loaded pins 928 that pass through the probe interface body 926. In an embodiment, the probe electrical interface board 922 includes a processor 923, a memory 925, and a touch-probe connector adapter 924. In an embodiment, the hard-probe assembly 900 further includes a lock nut 932, a spring stack 934, a probe cap 930, a pull stud 938 and kinematic cylinders 940. The lock nut 932 and spring stack 934 hold the pull stud 938 against the probe cap 930. The kinematic cylinders 940 are affixed to the probe cap 930.

The hard-probe assembly 900 discussed above is an example of a tactile probe, so named because a tactile probe includes an element (such as the probe tip 904) that makes physical contact with an object under test. Besides the hard-probe assembly 900, another type of tactile probe accessory is a touch-trigger probe assembly 960 illustrated in FIGS. 22A, 22B, 22C, 22D, 22E. Unlike the hard-probe assembly 900 that returns electrical signals from encoders in each of the axis assemblies 100, 200, 300, 400, 500, 600, 700 in synchrony with the capture signal produced by the base processor electronics 2040, the touch-trigger probe assembly 960 generates a trigger signal in response to the probe tip 904 lightly touching an object under test. The trigger signal is sent from the touch-trigger probe assembly 960 to each of the encoders, which respond by immediately measuring an angle. Afterwards, the encoders return the measured values over the first bus 2182 (FIG. 2). Touch-trigger probes are popular to use on Cartesian coordinate measuring machines (CMMs), which often include a probe stylus that is relatively long and thin. Such a stylus is susceptible to bending when pressed against an object, which may result in a relatively large error in measured 3D values. By generating a trigger signal when the probe tip first lightly touches the object, the bending of the stylus is minimized. In most cases, the stylus on a tactile probe of an AACMM 10 is relatively short and thick, resulting in relatively small bending errors. However, in some cases, bending of a stylus is an important consideration when making AACMM measurements. In these cases, the touch-trigger probe assembly 960 is advantageously used.

In an embodiment, a touch-trigger probe assembly 960 includes a touch-trigger probe module 986, a touch-trigger probe body 984, a touch-trigger probe adapter 970, a probe body 962, a probe electrical interface 920, a lock nut 932, a spring stack 934, a probe cap 930, and a pull stud 938. In an embodiment, the touch-trigger probe module 986 includes a probe tip 904. Touch-trigger probe modules are commercially available from many manufacturers. In an embodiment, the touch-trigger probe body 984 is selected to have a desired length. The touch-trigger probe body 984 includes a screw connector mount 982 that screws into the touch-trigger probe adapter 970. The touch-trigger probe adapter 970 sends electrical signals, including trigger signals, down interface wires 972 to a touch-probe connector adapter 924, which is part of a probe electrical interface 920. The touch-trigger probe adapter 970 and the probe electrical interface 920 fit in a probe body 962. The remaining elements of the touch-trigger probe assembly 960 are the same as for the hard-probe assembly 900 and were described herein above with respect to FIGS. 20A, 20B, 20C, 20D, 20E, 21A, 21B.

In an embodiment, a short jumper cable is run from a tactile probe transfer connector 836 (FIG. 19G) from the connector adapter 784 in the connector cutout 757 (FIGS. 20A, 21B). This jumper cable transfers trigger signals from touch-trigger probes. It also transfers signals indicating that particular button has been pressed. The tactile probe transfer connector 836 and the arm-to-handle connector 832 send signals to cable transfer connectors 837 on the bottom of the upper circuit board 822. End cable wires 838 attach on one end to the cable transfer connectors 837 and on the other end to bus connectors 839. As shown in FIG. 19F, the bus connectors 839 attach to on matching bus connectors 839 that lead through front slip-ring cable 718, seventh-axis slip ring 710, and rear slip-ring cable 717 to bus connectors 719. In an embodiment, the electrical links between the bus connectors 719, the arm-to-handle connector 832 and electronics in the electronics 2210 are as shown in FIG. 5.

Referring now to FIGS. 23I-23O different embodiments are illustrated of combinations of accessories coupled to the end assembly 700. As discussed herein, the accessories are coupled to the end assembly 700 via the accessory interfaces 701, 703 and the coupling assemblies 777, 779. The interfaces 701, 703 and coupling assemblies 777, 779 cooperate to mechanically and electrically couple the accessory to the AACMM 10. The interfaces 701, 703 and coupling assemblies 777, 779 provide both electrical power (when needed) and communication/electrical-signal connections between the accessory and the base electronics 2000 (FIG. 2A). As discussed herein, in some embodiments the kinematic interface board 780 and switch 781 (FIG. 5) regulate the flow of electrical signals and power to the accessories via the interfaces 701, 703. In an embodiment, when accessories are coupled to both interfaces 701, 703, the kinematic interface board 780 and switch 781 provide power and electrical signals to both interfaces 701, 703, either synchronously or asynchronously. In another embodiment, when accessories are coupled to both interfaces 701, 703, the kinematic interface board 780 and switch 781 are configured to provide power and electrical signals to one of the interfaces 701, 703.

Figure 23A:
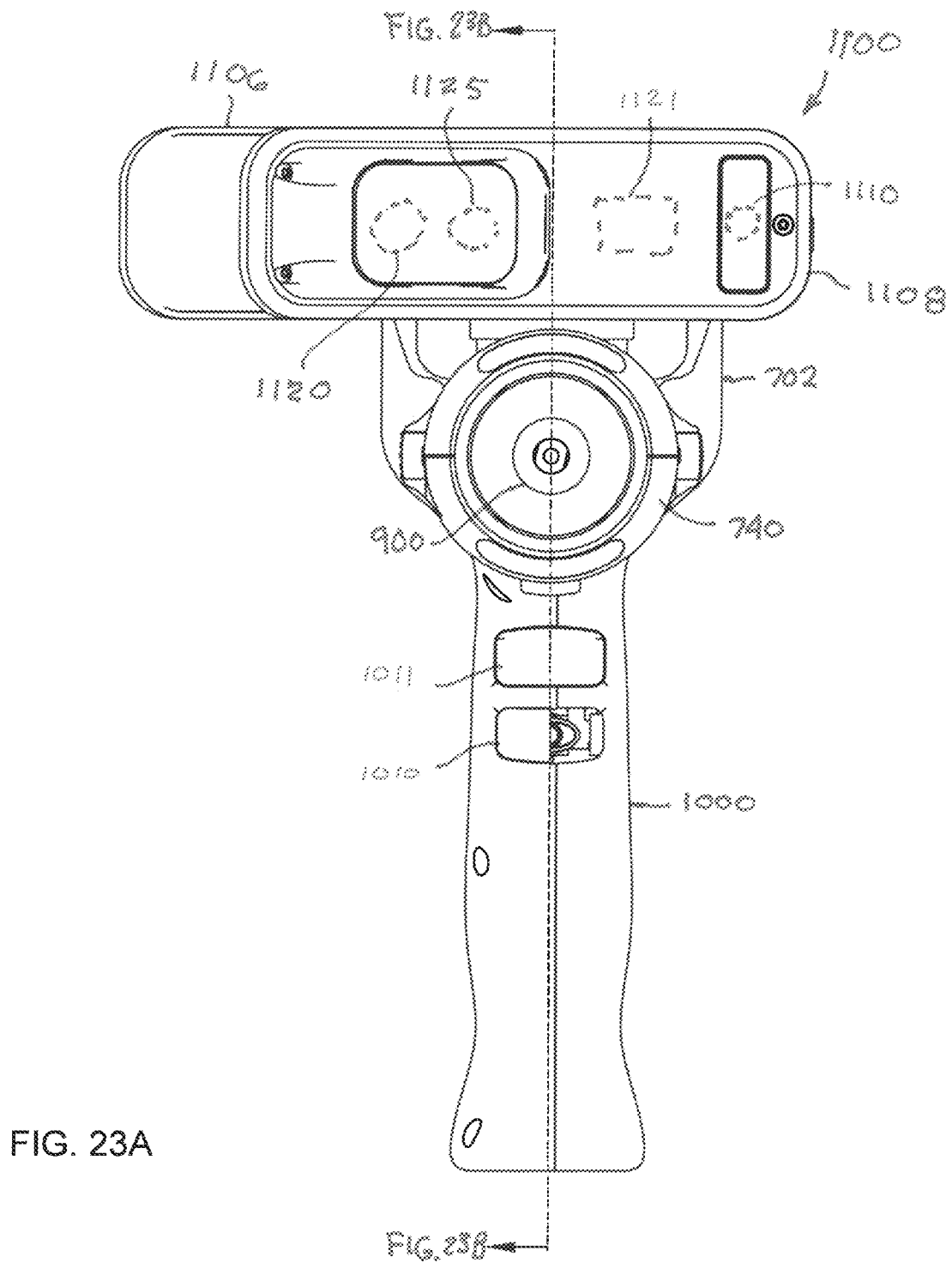
FIG. 23A FIG. 23B are front, and section view, respectively, of a laser line probe coupled to a seventh-axis assembly according to an embodiment.
Figure 23B:
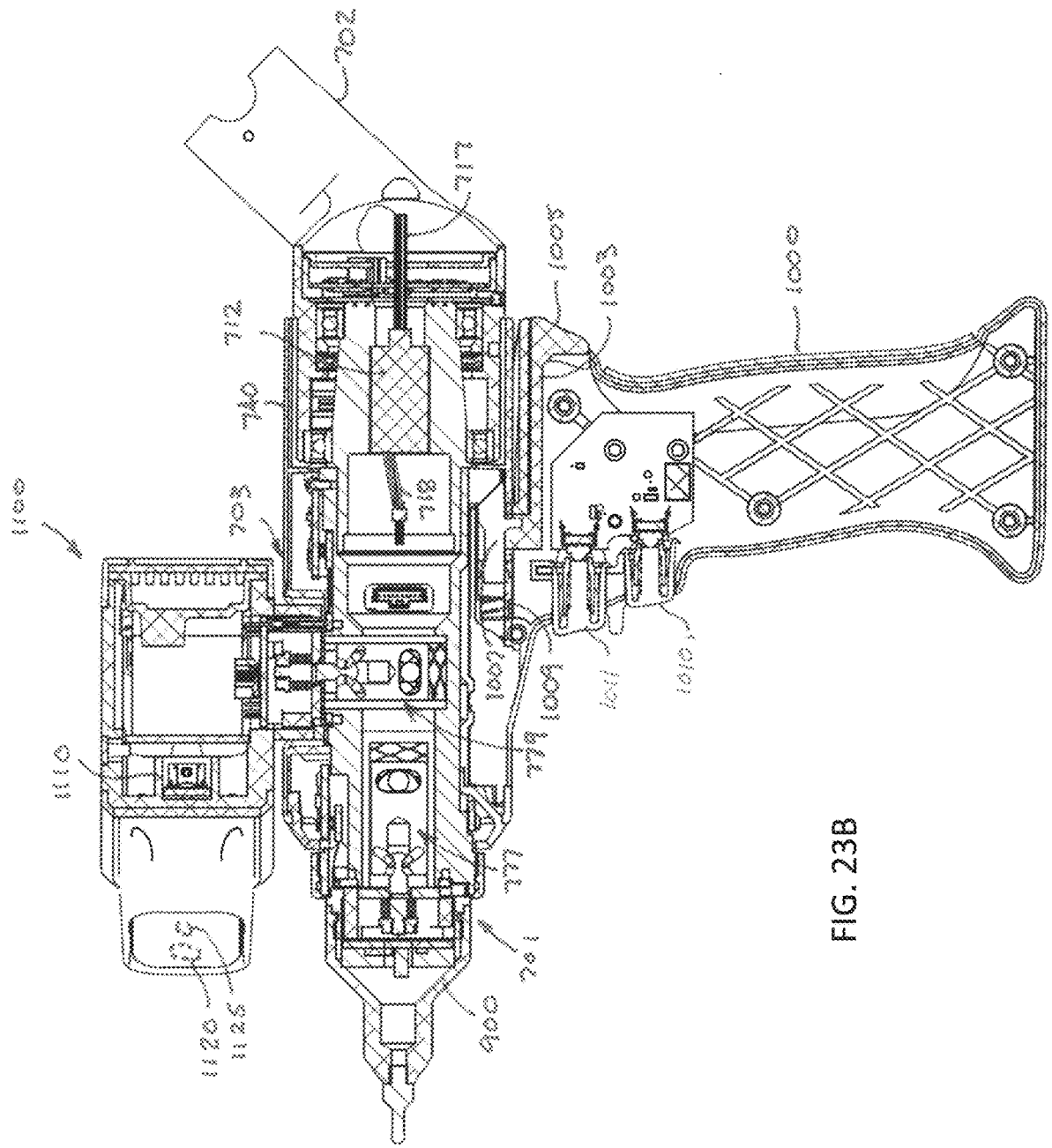
Figure 23C:
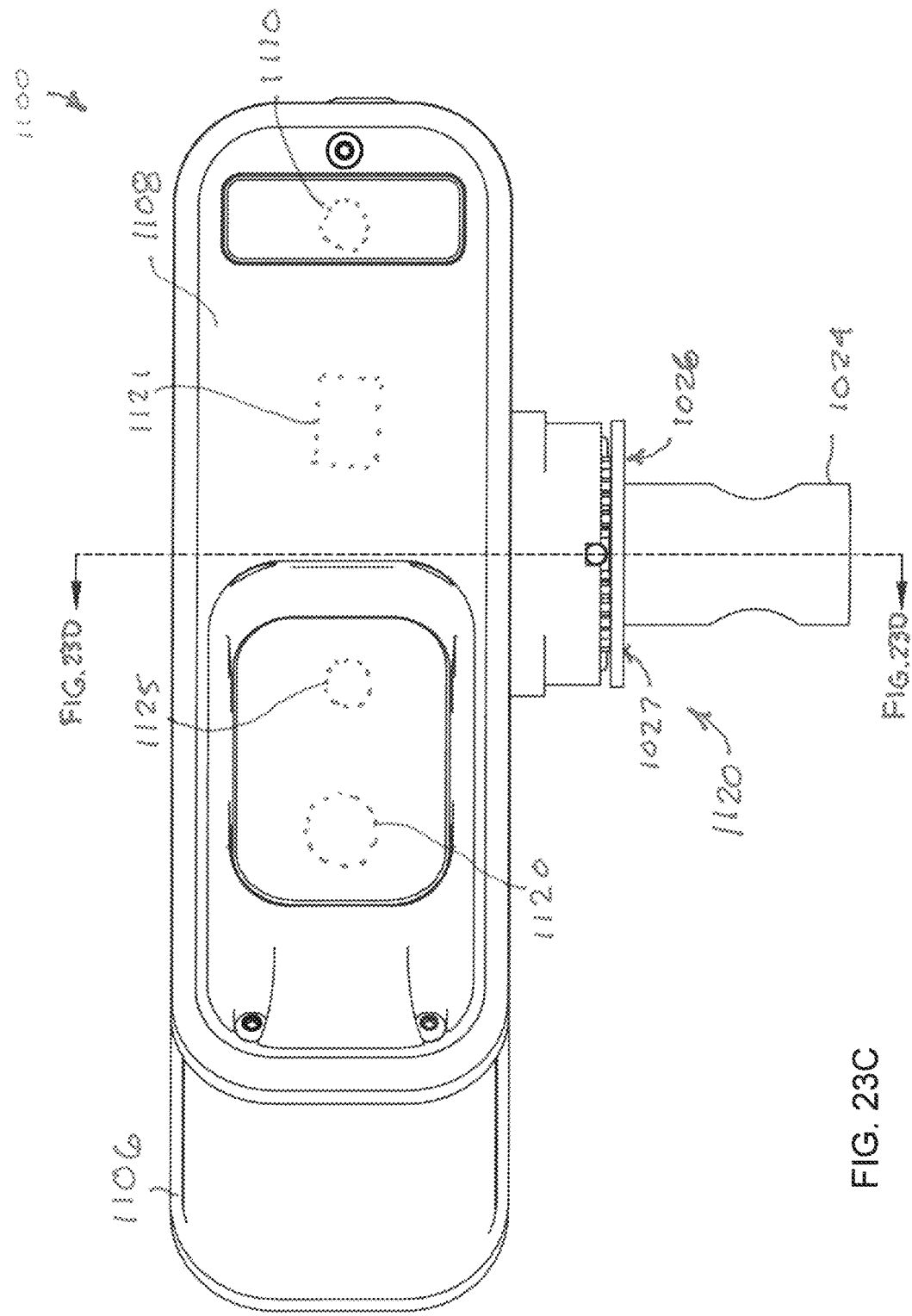
FIG. 23C and FIG. 23D are front and section views, respectively, of a laser line probe according to an embodiment.
Figure 23D:
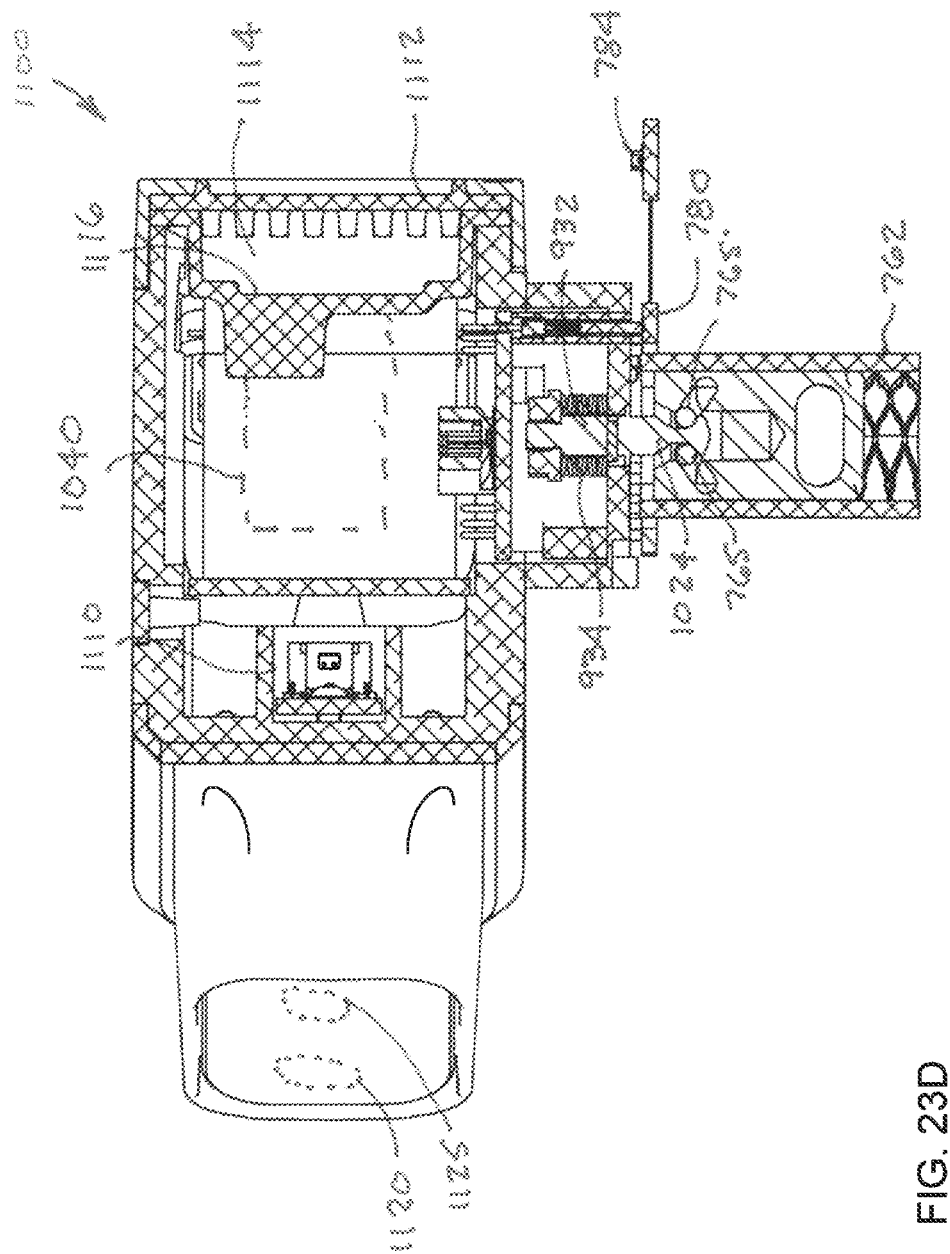
Figure 23F:
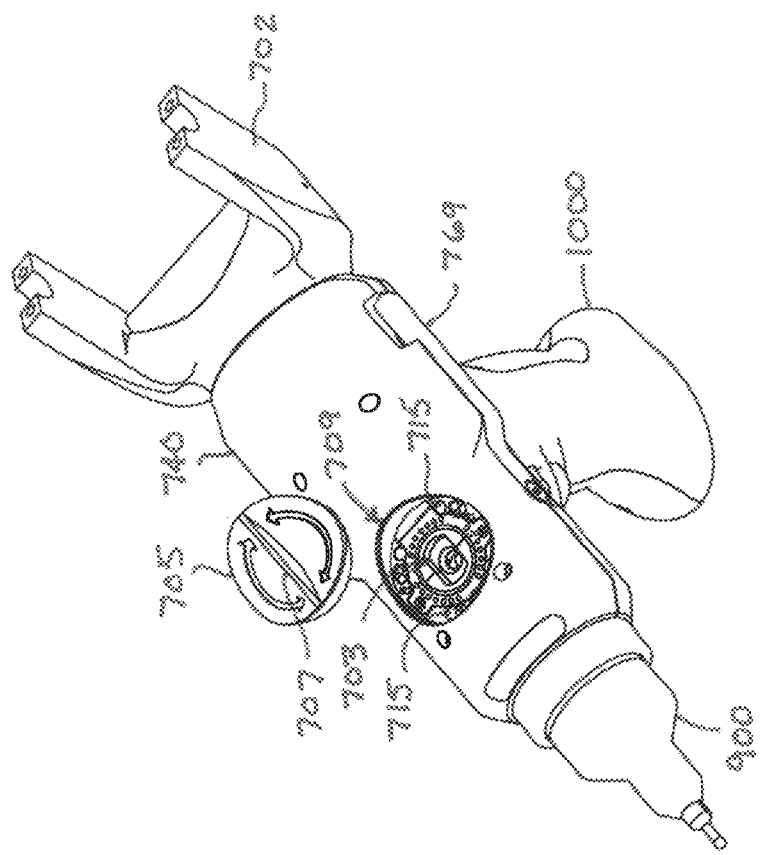
FIGS. 23E, 23F, 23G, 23H are various views of the seventh-axis assembly of a seventh-axis assembly with the second accessory interface being coupled or uncoupled, in accordance with an embodiment.
Figure 23E:
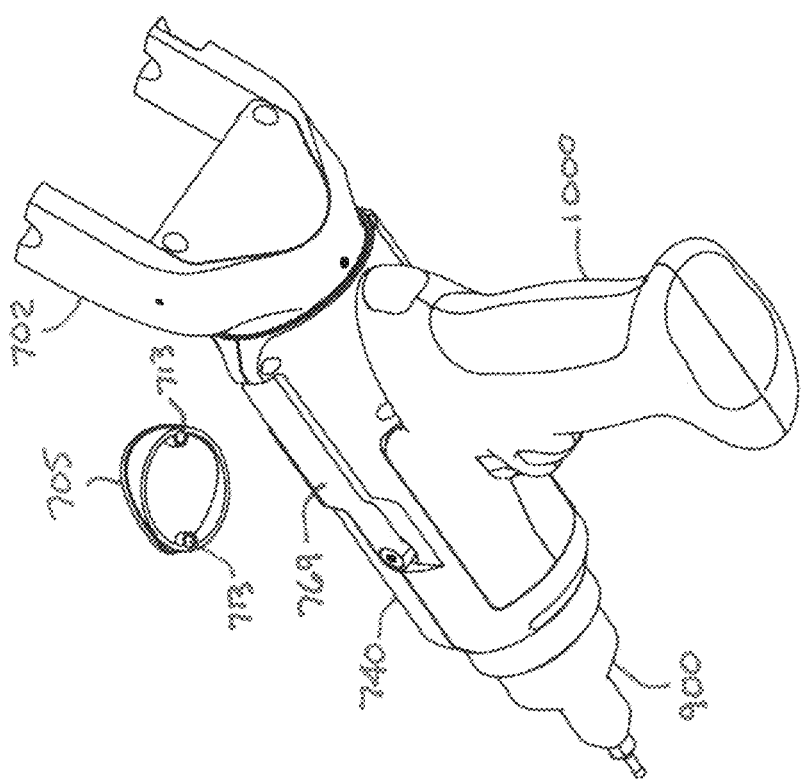
Figure 23G:
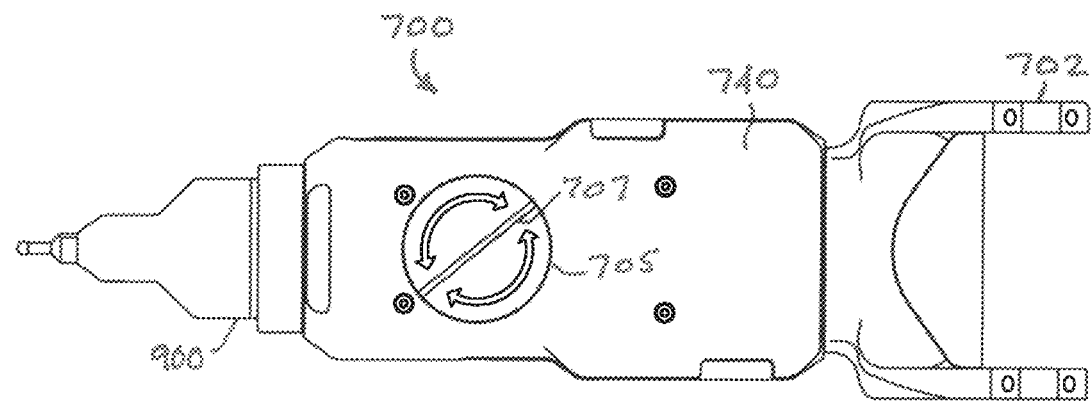
Figure 23H:
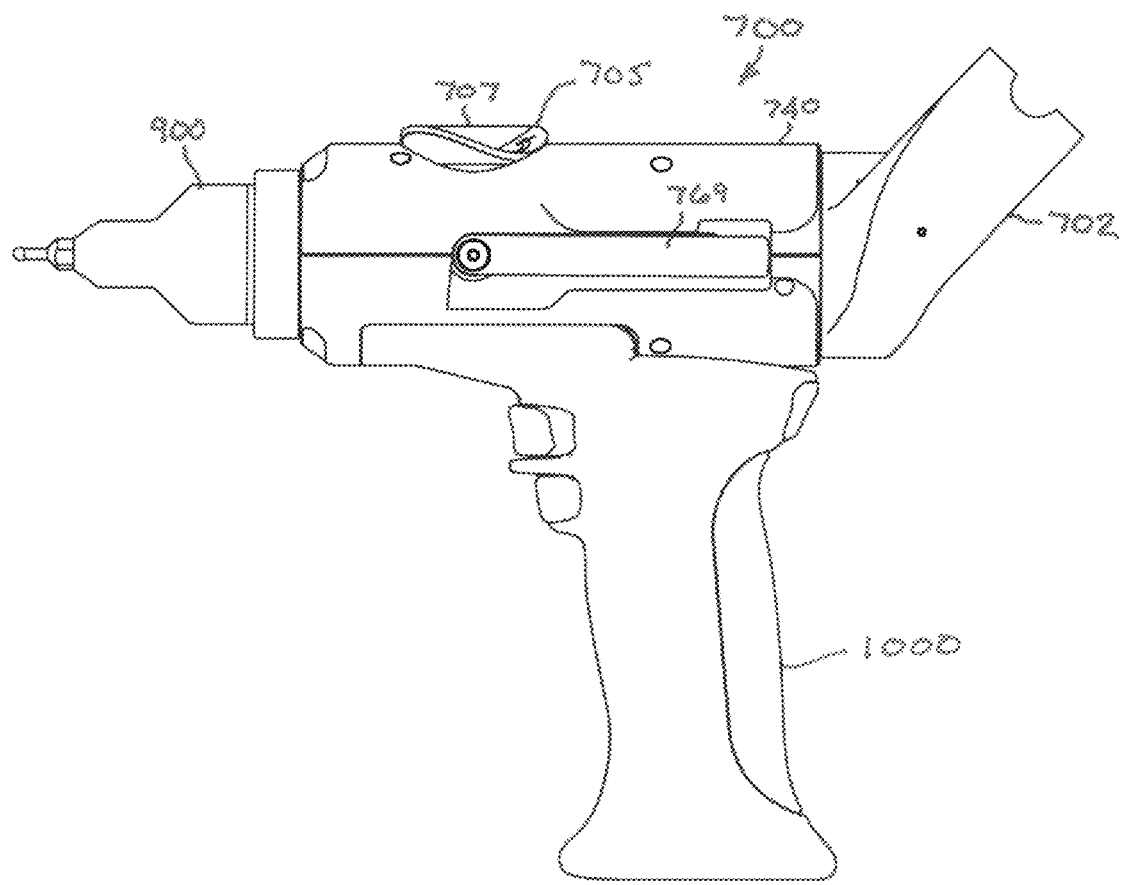
Figure 23I:
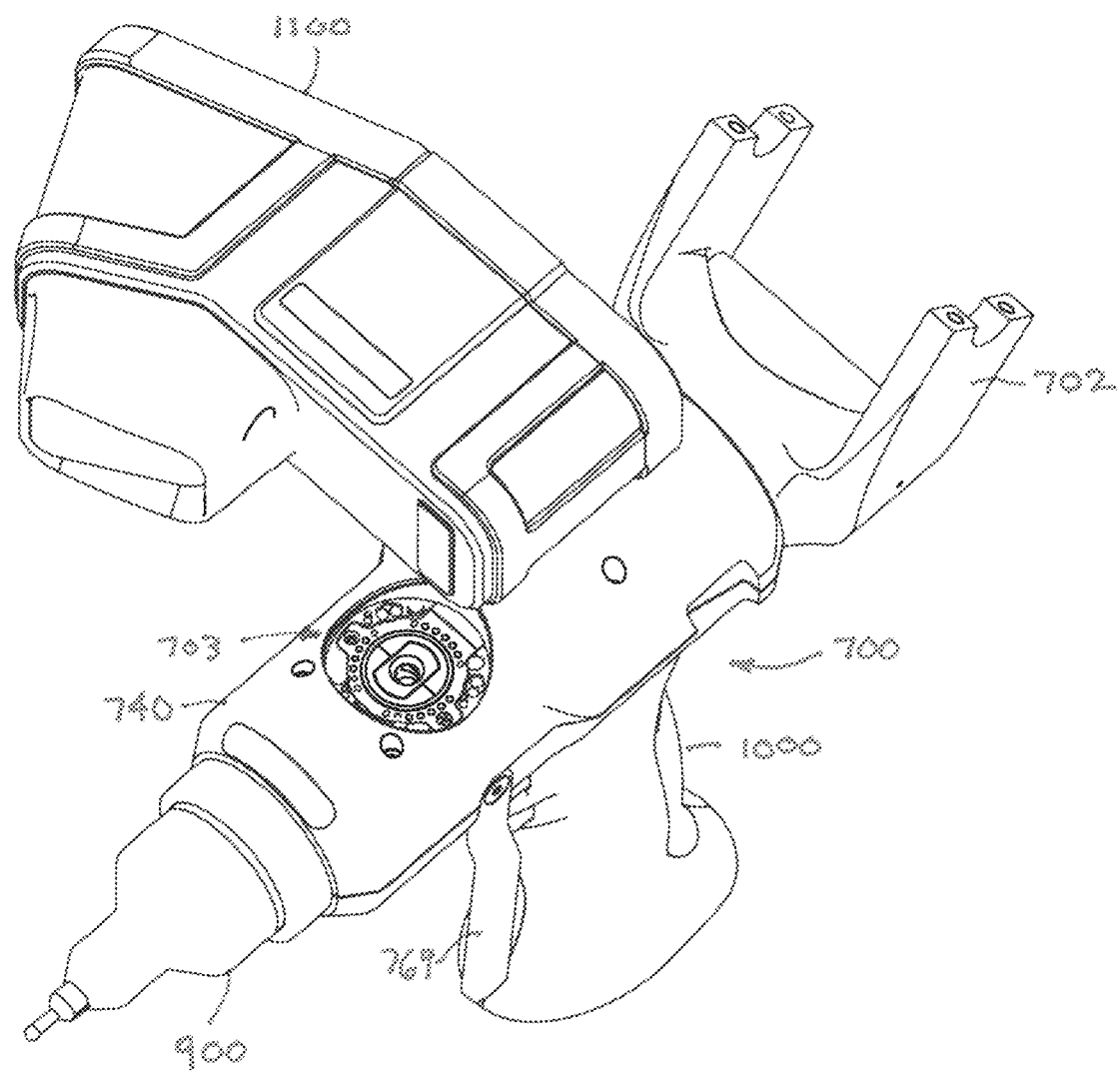
FIG. 23I, 23J, 23K are various views of the seventh-axis assembly with the laser line probe being coupled to the second accessory interface in accordance with an embodiment.
Figure 23J:
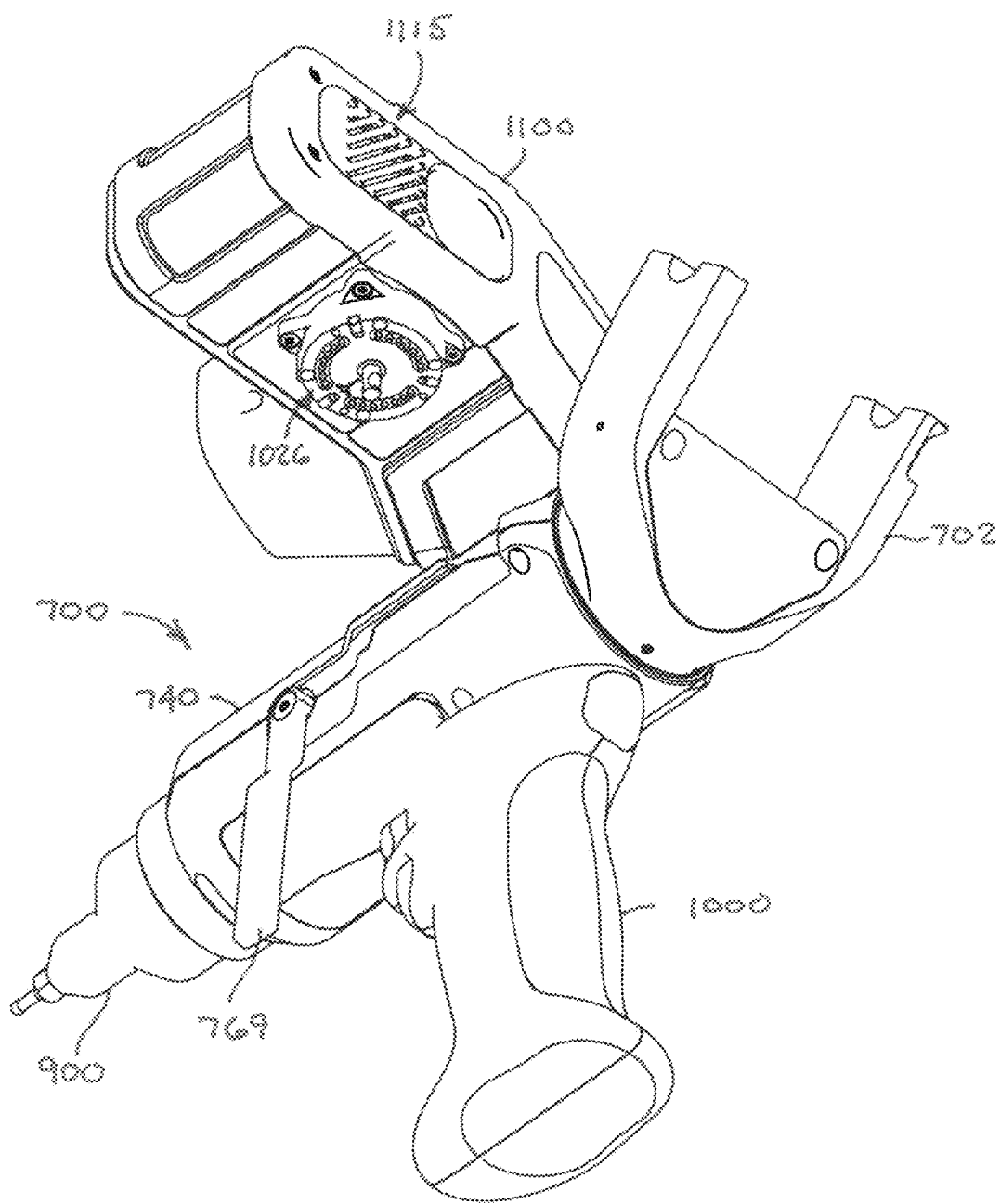
Figure 23K:
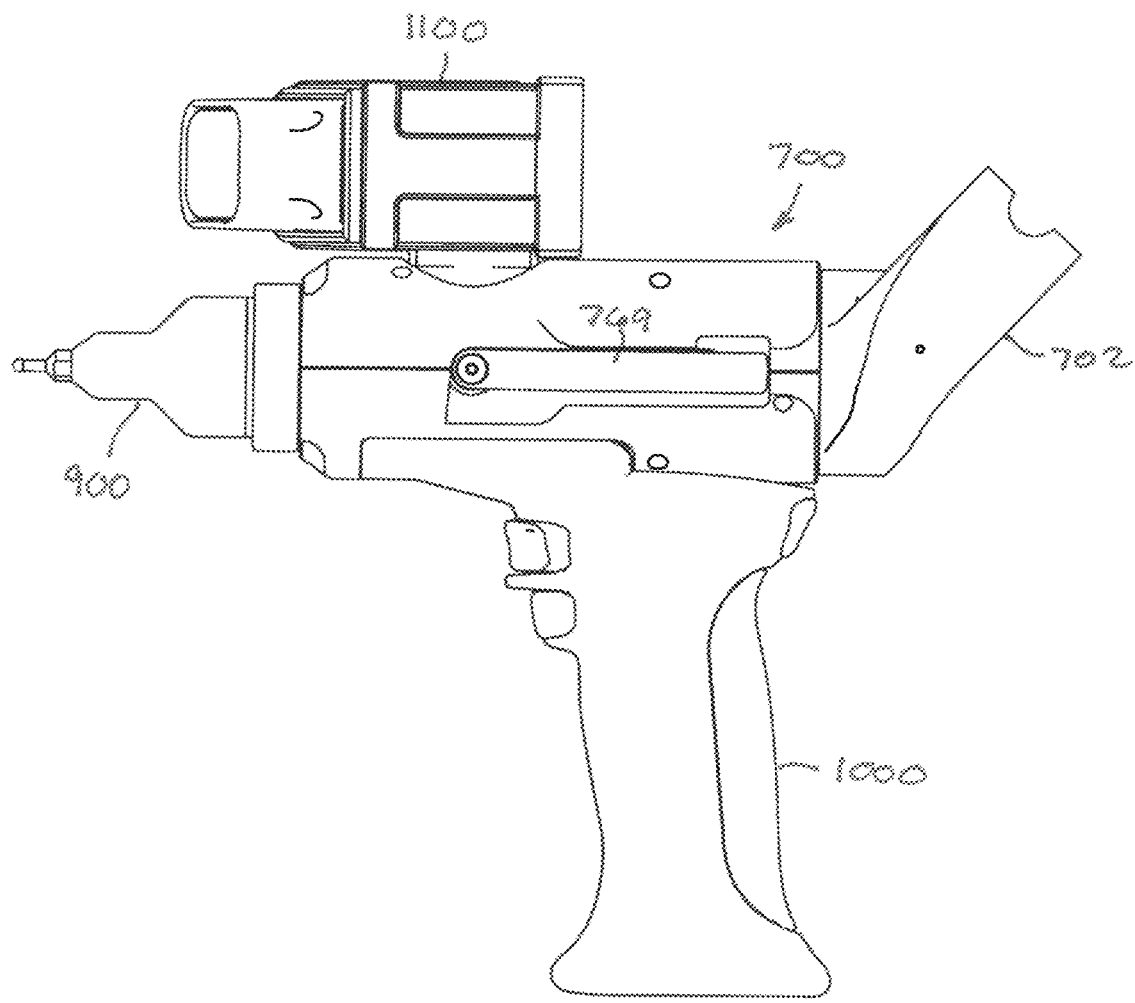

In the embodiment of FIG. 23I-23K, the end assembly 700 includes a probe 900 coupled to the first accessory interface 701 and an LLP 1100 being coupled to the second accessory interface 703. In this embodiment, the latch arm is rotated to allow the coupling assembly 779 to accept the pull stud 1024. When the LLP 1100 is inserted into the second accessory interface 703 and the pull stud 1024 inserted into the adapter hole 772 (FIG. 20A). By rotating the latch arm 769 back to the original position (e.g. against or aligned with the housing 740), the LLP 1100 is electrically and mechanically coupled to the end assembly 700 (FIG. 23K)

Figure 23L:
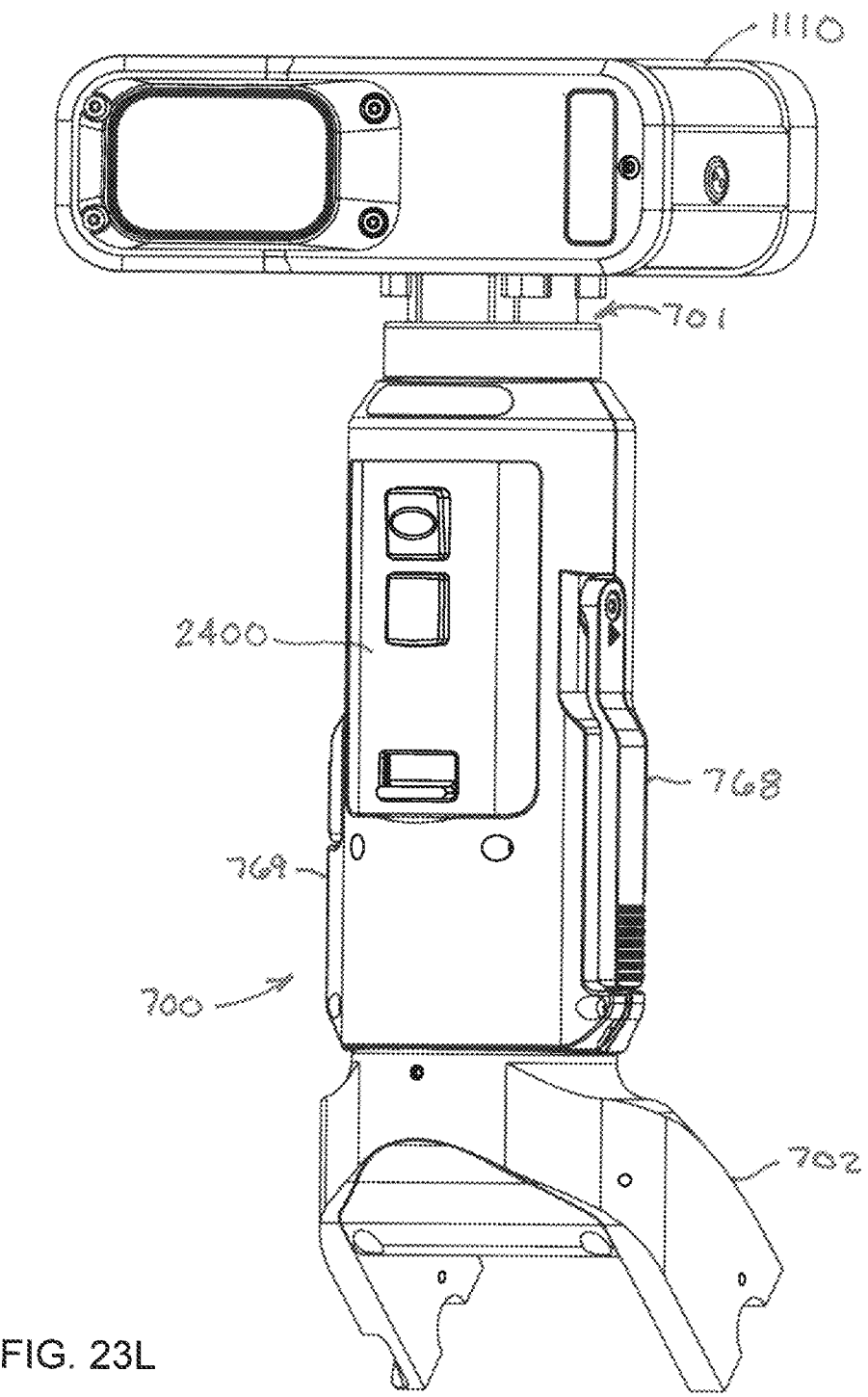
FIG. 23L is a side view of the seventh-axis assembly with the laser line probe coupled to the first accessory interface in accordance with an embodiment.

Referring now to FIG. 23L, an embodiment is shown of an LLP being coupled to the first accessory interface 701. In this configuration the plane of light from the LLP 1110 is substantially perpendicular to the axis 711 of the end assembly 700. It should be appreciated that depending on the surface being measured/scanned, the positioning of the LLP 1110 on the end of the end assembly 700 may provide for a more comfortable or ergonomic grip for the operator. It should be appreciated that while the embodiment of FIG. 23L is shown with the button-plate 2400, this is for exemplary purposes and the handle 1000 may be used interchangeably with the button-plate 2400.

Figure 23M:
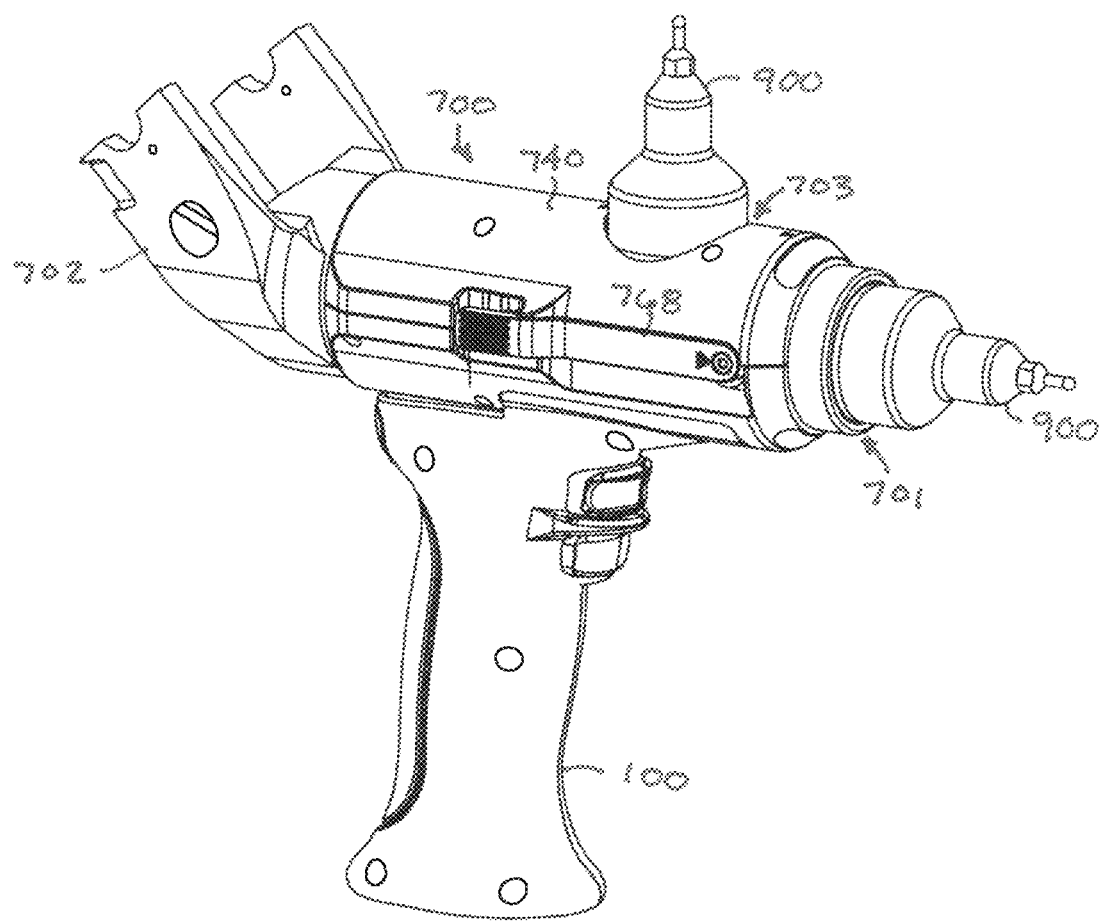
FIG. 23M and FIG. 23N are perspective views of the seventh-axis assembly having two hard-probes coupled to the first accessory interface and the second accessory interface in accordance with an embodiment.
Figure 23N:
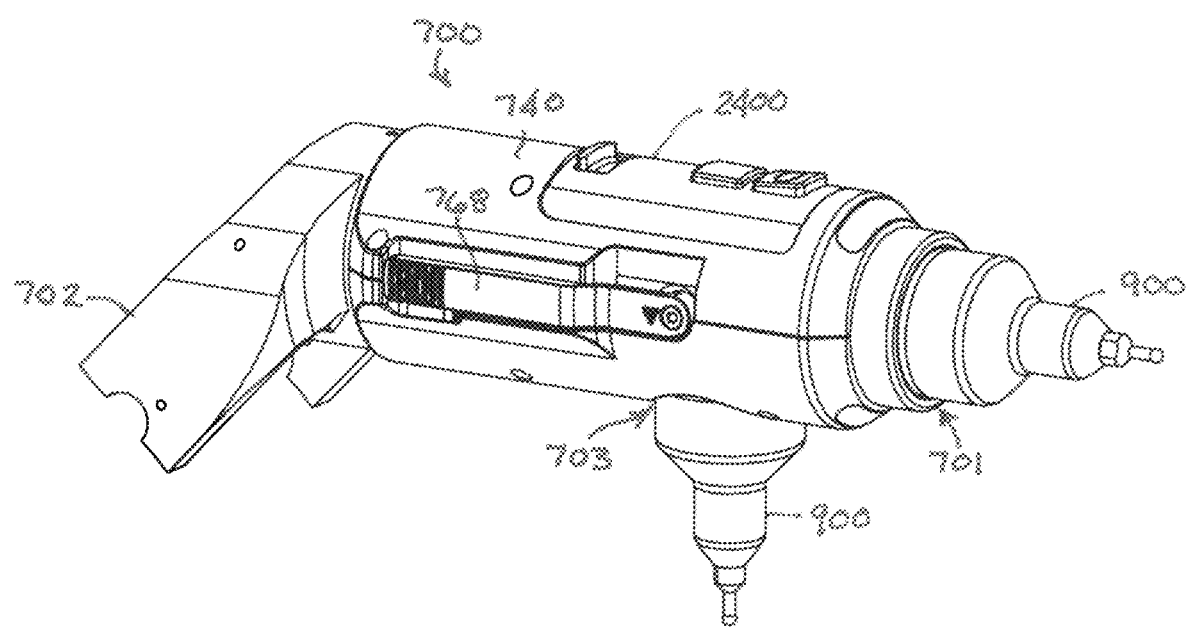

Referring now to FIG. 23M and FIG. 23N, embodiments are illustrated of the end assembly 700 with two hard-probes 900 coupled to the first accessory interface 701 and the second accessory interface 703. In the embodiment of FIG. 23M, the end assembly 700 includes the two hard-probes 900 and the handle 1000. In the embodiment of FIG. 23N, the end assembly 700 includes the two hard-probes 900 and the button-plate 2400.

Figure 23O:
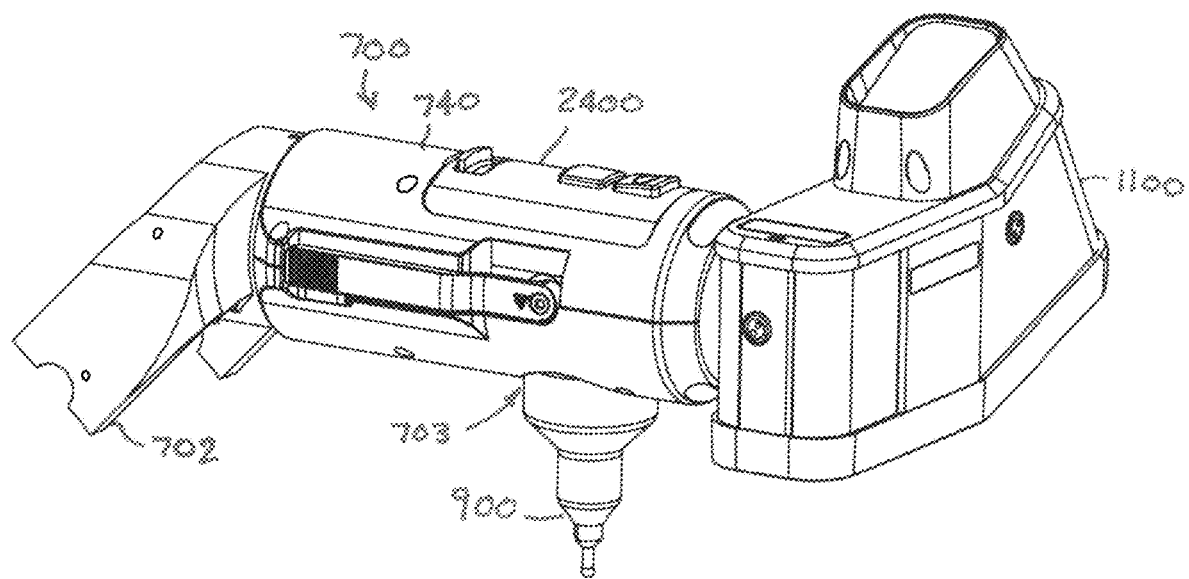
FIG. 23O is a perspective view of the seventh-axis assembly having a laser line probe coupled to the first accessory interface and a hard-probe coupled to the second accessory interface in accordance with an embodiment.

Referring now to FIG. 23O, an embodiment is shown of the end assembly 700 having an LLP 1100 coupled to the first accessory interface 701 and a hard-probe 900 coupled to the second accessory interface 703. As discussed above, depending on the surface being measured/scanned, the configuration of these accessories 900, 1100 may provide the technical effect of improving operator comfort or ergonomics. It should be appreciated that while the embodiment of FIG. 23O shows the accessories 900, 1100 being used with the button-plate 2400, this configuration could be arranged using the handle 1000.

It should be appreciated that configurations of the accessories and the types of accessories shown in FIGS. 23I-23O are not intended to be limiting and other accessories or other combinations of accessories, including but not limited to the touch-trigger probe assembly 960, may be coupled to the end assembly 700.

Referring now to FIGS. 25A-25E, an embodiment is shown of an extension accessory 2500 having a hard-probe 900 coupled to one end. The extension 2500 includes a body 2502 that may be in the shape of an elongated cylindrical tube. In an embodiment, the body 2502 is formed from a carbon-fiber composite material. In an embodiment, the body 2502 is made from the same material as the segment tubes 290, 590. In the illustrated embodiment, the body 2502 is about 12 inches (30.48 centimeters) long. It should be appreciated that the extension 2500 may be made from bodies 2500 having different lengths.

Coupled to an end of the body 2502 opposite the probe 900 is an interface 2504 that is configured to electrically and mechanically couple with the accessory interfaces 701, 703 (FIG. 19F). The interface 2504 includes an electrical interface 2520, a lock nut 2532, a spring stack 2534, a probe cap 2530, an extension element or a pull stud 2538, and kinematic cylinders 2540. In the illustrated embodiment the interface 2504 is configured and operates in a similar manner to the a probe electrical interface 920, a lock nut 932, a spring stack 934, a probe cap 930, a pull stud 938, and kinematic cylinders 940 of FIGS. 20B, 20C, 20D, 20E, 21A, 21B. In other words, the interface 2504 will operably couple to the accessory interfaces 701, 703 in response to the actuation of the accessory latches 768, 769.

On an end of the body 2502 opposite the interface 2504 is a third accessory interface 2506. The third accessory interface 2506 is configured to couple accessories, such as the hard-probe 900, the touch-trigger probe 960, or the LLP 1100 for example, to the extension 2500. In an embodiment, the accessory interface 2506 is configured in the same manner as the accessory interfaces 701, 703 of the end assembly 700.

The third interface 2506 includes a coupling assembly 2577 and an electrical interface 2580. In the first coupling assembly 2577, the ends of a latch 2568 are attached to a camshaft 2566. The camshaft 2566 passes through a camshaft hole 2574 of a carrier 2570. The carrier 2570 is surrounded by two guides 2562 that slide, together with the carrier 2570, into a guide cavity 2558 of an interface body 2508. The body 2508 couples to the end of the body 2502, such as through adhesive bonding for example. Outside the guide cavity 2558, there are three pairs of kinematic balls and three alignment pins arranged on the end of the body 2508 in the same manner as kinematic balls 756 and pins 757 (FIG. 20A). When the three pairs of kinematic balls are brought into contact with three kinematic cylinders 940 of the accessory being attached, the resulting contact between the kinematic cylinders 940 and the kinematic balls provides that the accessory (e.g. hard probe 900) may be removed and repositioned repeatably.

The interface board 2580 is attached to the end of the interface body 2508. The interface board 2580 includes electrical contact pads arranged and configured in the same manner as interface board 780 (FIG. 20A). These contact pads make electrical contact with spring loaded pins 928 in the probe electrical interface 920 of the accessory being coupled (e.g. the hard-probe 900). A conductor 2510 electrically couples the interface board 2580 to the electrical interface 2520. Electrical signals and power are routed between the attached accessory and the base electronics 2000 through the interface board 2580 and electrical interface 2520. In the illustrated embodiment, the conductor 2510 extends through the central portion of the tubular body 2502.

In the carrier 2570, an adapter hole 2572 is sized to accept the extension element or pull stud (e.g. pull stud 938) of the accessory being attached. When the latch 2568 is rotated from a latched to an unlatched position, the pull stud 938 is released, enabling the accessory (e.g. hard-probe assembly 900) to be freely moved away from the extension 2500. When the latch 2568 is rotated to the latched position, the pull stud is held firmly in place within the adapter hole 2572. The operation of the coupling assembly 2577 is the same as that described herein in reference to FIGS. 20B-20H.

Referring now to FIGS. 25F-25J, another embodiment is shown of the extension 2500 having a laser line probe 1100 coupled to the third accessory interface 2506. The LLP 1100 is coupled to the third accessory interface by inserting the pull stud 1024 into the opening 2558 and rotating the latch 2568 from the open or unlatched position to the closed or latched position. It should be appreciated that in an embodiment, the plane of light emitted by the LLP 1100 is substantially perpendicular to a center axis 2512 of the extension 2500.

Referring now to FIG. 26A-26E, an embodiment is shown of another extension accessory 2600. The extension 2600 includes an body 2602 that may be in the shape of an elongated cylindrical tube having an axis 2612. In an embodiment, the body 2602 is formed from a carbon-fiber composite material. In an embodiment, the body 2602 is made from the same material as the segment tubes 290, 590. In the illustrated embodiment, the body 2602 is about 12 inches (30.48 centimeters) long. It should be appreciated that the extension 2600 may be made from bodies 2600 having different lengths.

Coupled to an end of the body 2602 opposite the probe 900 is an interface 2604 that is configured to electrically and mechanically couple with the accessory interfaces 701, 703 (FIG. 19F). The interface 2604 includes an electrical interface 2620, a lock nut 2632, a spring stack 2634, a probe cap 2630, an extension element or a pull stud 2638, and kinematic cylinders 2640. In the illustrated embodiment the interface 2604 is configured and operates in a similar manner to the a probe electrical interface 920, a lock nut 932, a spring stack 934, a probe cap 930, a pull stud 938, and kinematic cylinders 940 of FIGS. 20B, 20C, 20D, 20E, 21A, 21B.

Opposite the interface 2604 is a fourth accessory interface 2606. The fourth accessory interface 2606 is configured to couple accessories, such as the hard-probe 900, the touch-trigger probe 960, or the LLP 1100 for example, to the extension 2600. In an embodiment, the accessory interface 2606 is configured in the same manner as the accessory interfaces 701, 703 of the end assembly 700.

In this embodiment, the fourth accessory interface 2606 has a body 2608 that couples to the body 2602. The body 2068 includes an end 2614 arranged opposite the body 2602 having a guide cavity 2658. The guide cavity 2658 has an axis 2616 that is substantially perpendicular to the axis 2612.

The third interface 2606 includes a coupling assembly 2677 and an electrical interface 2680. In the first coupling assembly 2677, the ends of a latch 2668 are attached to a camshaft 2666. The camshaft 2666 passes through a camshaft hole 2674 of a carrier 2670. The carrier 2670 is surrounded by two guides 2662 that slide, together with the carrier 2670, into the guide cavity 2658. Outside the guide cavity 2658, there are three pairs of kinematic balls and three alignment pins arranged on the end of the body 2608 in the same manner as kinematic balls 756 and pins 757 (FIG. 20A). When the three pairs of kinematic balls are brought into contact with three kinematic cylinders 940 of the accessory being attached, the resulting contact between the kinematic cylinders 940 and the kinematic balls provides that the accessory (e.g. hard probe 900) may be removed and repositioned repeatably.

The interface board 2680 is attached to the end of the interface body 2608. The interface board 2680 includes electrical contact pads arranged and configured in the same manner as interface board 780 (FIG. 20A). These contact pads make electrical contact with spring loaded pins 928 in the probe electrical interface 920 of the accessory being coupled (e.g. the hard-probe 900). A conductor electrically couples the interface board 2680 to the electrical interface 2620. Electrical signals and power are routed between the attached accessory and the base electronics 2000 through the interface board 2680 and electrical interface 2620. In the illustrated embodiment, the conductor extends through the central portion of the tubular body 2602.

In the carrier 2570, an adapter hole 2572 is sized to accept the extension element or pull stud (e.g. pull stud 938) of the accessory being attached. When the latch 2568 is rotated from a latched to an unlatched position, the pull stud 938 is released, enabling the accessory (e.g. hard-probe assembly 900) to be freely moved away from the extension 2500.

When the latch 2568 is rotated to the latched position, the pull stud is held firmly in place within the adapter hole 2572. The operation of the coupling assembly 2577 is the same as that described herein in reference to FIGS. 20B-20H.

It should be appreciated that in the embodiment of FIGS. 26A-26E, the accessory when coupled to the fourth accessory interface 2606 is oriented in a direction substantially perpendicular to the axis 2612. Where the accessory coupled to the fourth accessory interface 2606 is a tactile probe, such as hard-probe 900 for example, this may provide the technical effect of facilitating the measurement of deep bores or holes for example.

Figure 26E:
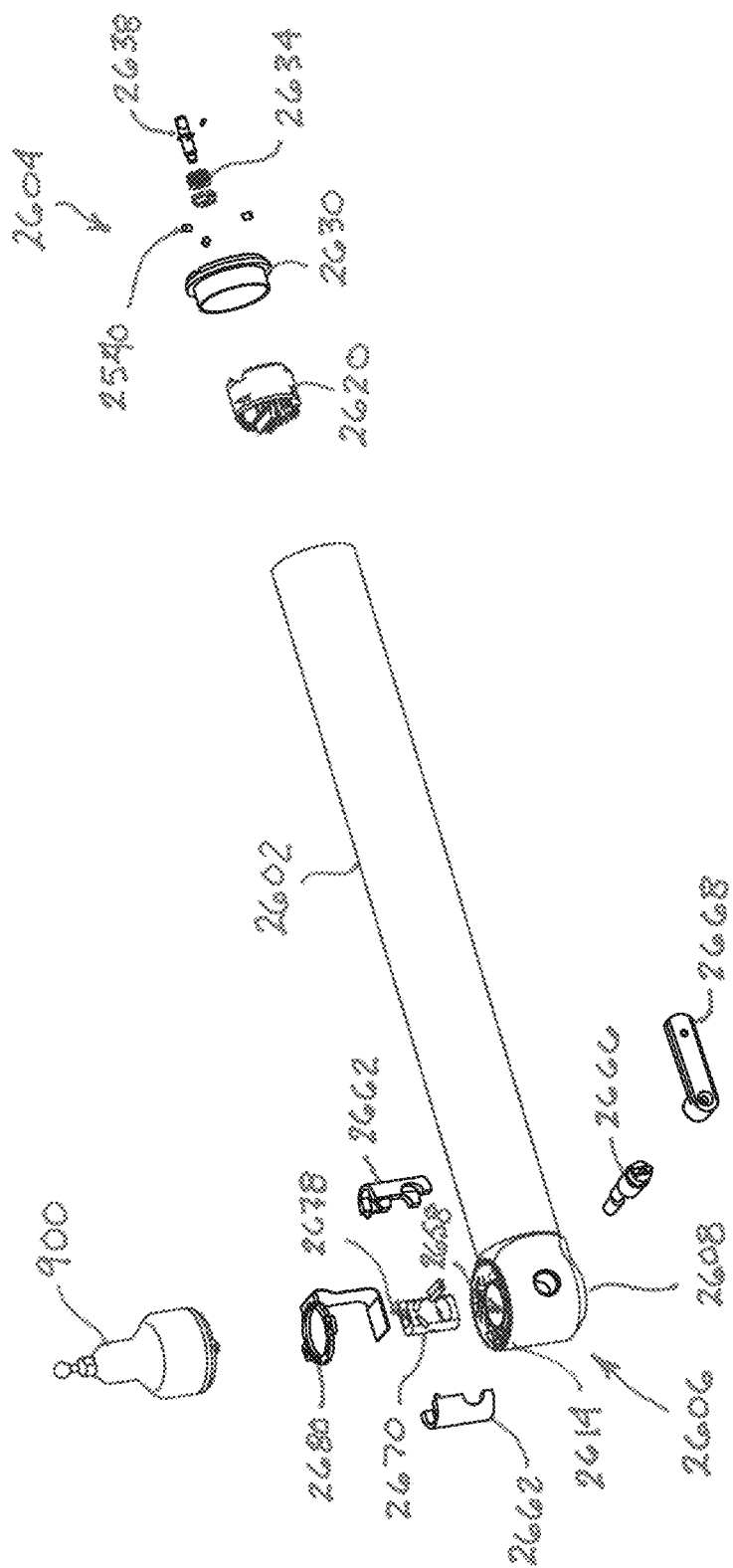
Figure 26G:
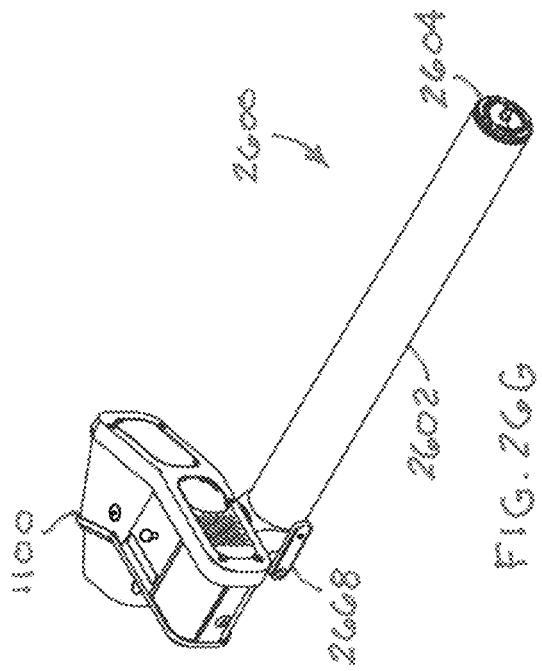
Figure 26I:
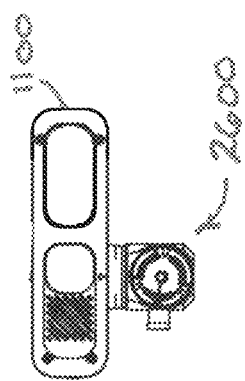
Figure 26F:
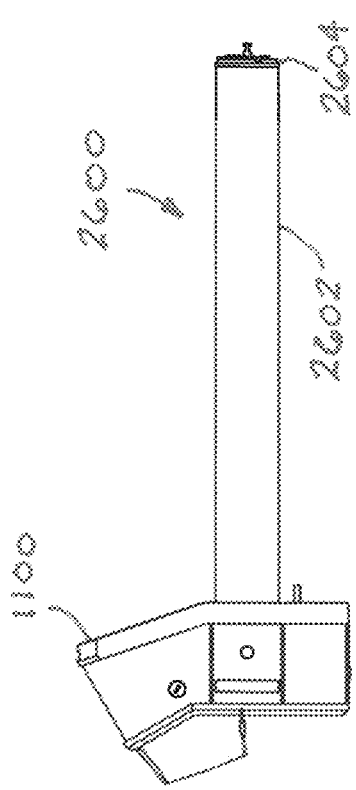
Figure 26H:
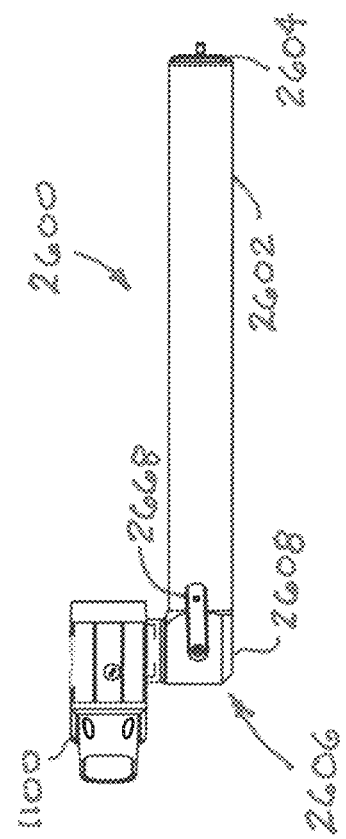

Referring now to FIGS. 26F-26H, another embodiment is shown of the extension 2600 having a laser line probe 1100 coupled to the fourth accessory interface 2606. The LLP 1100 is coupled to the fourth accessory interface by inserting the pull stud 1024 into the opening 2658 and rotating the latch 2668 from the open or unlatched position to the closed or latched position. It should be appreciated that in an embodiment, the plane of light emitted by the LLP 1100 is substantially perpendicular to a center axis 2616 and is parallel to the axis 2612 of the extension 2600.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A portable articulated arm coordinate measuring machine (AACMM) for measuring the coordinates of an object in space, comprising:
   a base;
   a manually positionable arm portion having an opposed first end and second end, the arm portion being rotationally coupled to the base, the arm portion including a plurality of connected arm segments, each arm segment including at least one position transducer for producing a position signal;
   a probe end coupled to the first end, the probe end having a first accessory interface and a second accessory interface, the first accessory interface being positioned on an end of the probe end, the second accessory interface being positioned on a side of the probe end substantially perpendicular to the first accessory interface, the first accessory interface having a first latch, the second accessory interface having a second latch;
   a first accessory coupled to one of the first accessory interface or the second accessory interface, wherein the first accessory is configured to be removably coupled to both the first accessory interface and the second accessory interface; and
   a first electronic circuit that receives the position signal from the at least one position transducer of each arm segment and provides data corresponding to a position of the first accessory,
   wherein the first accessory interface and the second accessory interface are substantially identical.

2. The AACMM of claim 1, wherein the first accessory interface and the second accessory interface are integral with the probe end.

3. The AACMM of claim 1, further comprising a second accessory coupled to the other of the first accessory interface or the second accessory interface.

4. The AACMM of claim 3, wherein the first accessory is a hard probe and the second accessory is a laser line scanner, the hard probe being coupled to the first accessory interface and the laser line scanner being coupled to the second accessory interface.

5. The AACMM of claim 3, wherein the first accessory is a first laser line scanner and the second accessory is a second laser line scanner.

6. The AACMM of claim 3, wherein the first accessory is includes a first tactile probe or a first hard probe, and the second accessory includes a second tactile probe or a second hard probe.

7. The AACMM of claim 1, wherein the second accessory interface includes at least one first magnet.

8. The AACMM of claim 7, further comprising:
a cover member selectively couplable to the second accessory interface via the at least one magnet; and
wherein the first accessory interface includes at least one second magnet.

9. The AACMM of claim 1, further comprising an actuator plate selectively couplable to an actuator interface on the probe end, the actuator plate having at least one first switch element electrically coupled to the first electronic circuit.

10. The AACMM of claim 9, wherein the actuator plate has a curved wall, the curved wall being shaped to deflect and bias the actuator plate away from the probe end when the actuator plate is coupled to the probe end.

11. The AACMM of claim 10, wherein the actuator plate includes a lever coupled to a latch member, the lever extending through the curved wall, the latch member being movable between an extended position and a retracted position, the actuator plate further including a biasing member, the biasing member biasing the latch member into an extended position.

12. The AACMM of claim 9, further comprising a handle selectively couplable to the actuator interface, the handle having at least one second switch element electrically coupled to the first electronic circuit when the handle is coupled to the probe end.

13. The AACMM of claim 1, further comprising
a second electronic circuit disposed within the probe end, the second electronic circuit being electrically coupled between the first electronic circuit and the first accessory interface, the second electronic circuit further being electrically coupled between the first electronic circuit and the second accessory interface; and
wherein the second electronic circuit is configured to selectively flow electrical power to the first accessory interface and the second accessory interface.

14. The AACMM of claim 1, wherein the first accessory is an extension accessory, the extension accessory having an elongated body with a coupling interface on a first end and a third accessory interface on a second end, the coupling interface being configured to electrically and mechanically couple to the one of the first accessory interface or the second accessory interface, the third accessory interface having a third latch.

15. The AACMM of claim 14, wherein the elongated body has an axis and the third accessory interface is coaxial with the axis.

16. The AACMM of claim 14, wherein the elongated body has a first axis and the third accessory interface has second axis, the second axis being perpendicular to the first axis.

17. A portable articulated arm coordinate measuring machine (AACMM) for measuring the coordinates of an object in space, comprising: a base; a manually positionable arm portion having an opposed first end and second end, the arm portion being rotationally coupled to the base, the arm portion including a plurality of connected arm segments, each arm segment including at least one position transducer for producing a position signal; a probe end coupled to the first end, the probe end having a first accessory interface and a second accessory interface, the first accessory interface being positioned on an end of the probe end, the second accessory interface being positioned on a side of the probe end, the first accessory interface having a first latch, the second accessory interface having a second latch; a first accessory coupled to one of the first accessory interface or the second accessory interface, wherein the first accessory is configured to be removably coupled to both the first accessory interface and the second accessory interface; a first electronic circuit that receives the position signal from the at least one position transducer of each arm segment and provides data corresponding to a position of the first accessory, wherein the first accessory interface and the second accessory interface are substantially identical; and, wherein the first accessory includes a first extension element; the second accessory includes a second extension element; the first latch is configured to engage and couple to the first extension element and the second extension element; and the second latch is configured to engage and couple to the first extension element and the second extension element.

18. The AACMM of claim 17, wherein:
the first accessory interface includes first kinematic mechanical elements and the second accessory interface includes second kinematic mechanical elements;
the first accessory includes third kinematic mechanical elements and the second accessory includes fourth kinematic elements;
the first kinematic mechanical elements being brought into contact with one of the third kinematic elements and fourth kinematic elements when the first extension element is clamped to the one of the first accessory interface and the second accessory interface;
the second kinematic mechanical elements being brought into contact with the other of the third kinematic elements and the fourth kinematic elements is clamped to the other of the first accessory interface and the second accessory interface; and
the first kinematic elements and the second kinematic elements cooperating with the third kinematic elements and the fourth kinematic elements to repeatably positioning the first accessory and the second accessory to the probe end.

19. The AACMM of claim 17, wherein:
the first accessory interface includes a first plurality of pins;
the second accessory interface includes a second plurality of pins, the second plurality of pins being equal in number to the first plurality of pins;
the first accessory is a hard probe; and
the second accessory is a line scanner.

* * * * *